United States Patent
Heckmeier et al.

(10) Patent No.: US 6,781,664 B1
(45) Date of Patent: Aug. 24, 2004

(54) LIQUID-CRYSTAL SWITCHING ELEMENTS COMPRISING A LIQUID-CRYSTAL LAYER WHICH HAS EXTREMELY LOW OPTICAL RETARDATION AND LIQUID-CRYSTAL DISPLAYS CONTAINING THEM

(75) Inventors: Michael Heckmeier, Bensheim (DE); Brigitte Schuler, Haibach (DE); Achim Götz, Alsbach-Hahnlein (DE); Herbert Plach, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 214 days.

(21) Appl. No.: 10/031,494

(22) PCT Filed: Jul. 19, 2000

(86) PCT No.: PCT/EP00/06879

§ 371 (c)(1), (2), (4) Date: Jan. 22, 2002

(87) PCT Pub. No.: WO01/07962

PCT Pub. Date: Feb. 1, 2001

(30) Foreign Application Priority Data

Jul. 22, 1999 (DE) .......................................... 199 33 571

(51) Int. Cl.[7] .......................... C09K 19/02; G02F 1/1335
(52) U.S. Cl. ........................ 349/181; 349/117; 349/119; 349/178
(58) Field of Search ........................... 349/96, 117, 119, 349/178, 181

(56) References Cited

U.S. PATENT DOCUMENTS

| | | | | |
|---|---|---|---|---|
| 6,061,116 A | * | 5/2000 | Nishida et al. | 349/130 |
| 6,141,075 A | * | 10/2000 | Ohmuro et al. | 349/130 |
| 6,524,666 B1 | * | 2/2003 | Ichinose et al. | 428/1.3 |

FOREIGN PATENT DOCUMENTS

| | | |
|---|---|---|
| DE | 0727691 A | 8/1996 |
| EP | 0463816 A | 1/1992 |
| EP | 0803758 A | 10/1997 |

* cited by examiner

*Primary Examiner*—Tarifur R. Chowdhury
(74) *Attorney, Agent, or Firm*—Millen, White, Zelano, Branigan, P.C.

(57) ABSTRACT

The present invention relates to a liquid crystal electro-optical switching member that comprises at least one polariser and a liquid crystal layer having an initial orientation in which the liquid crystal molecules are oriented so as to be essentially parallel to the substrates and to each other. The change of orientation of the liquid crystals, from their initial orientation that is substantially parallel to the substrates, is induced by a corresponding electric field which is oriented so as to be practically parallel to the substrates in the case liquid crystal with a negative dielectric anisotropy and so as to be practically perpendicular to the substrates in the case liquid crystal with a positive dielectric anisotropy. The liquid crystal layer has an optical delay $[(d^{\Delta n}) LC?]$ of between 0.06 and 0.43 $\mu$m. The present invention also relates to a liquid crystal display system that comprises said liquid crystal switching members.

23 Claims, 13 Drawing Sheets

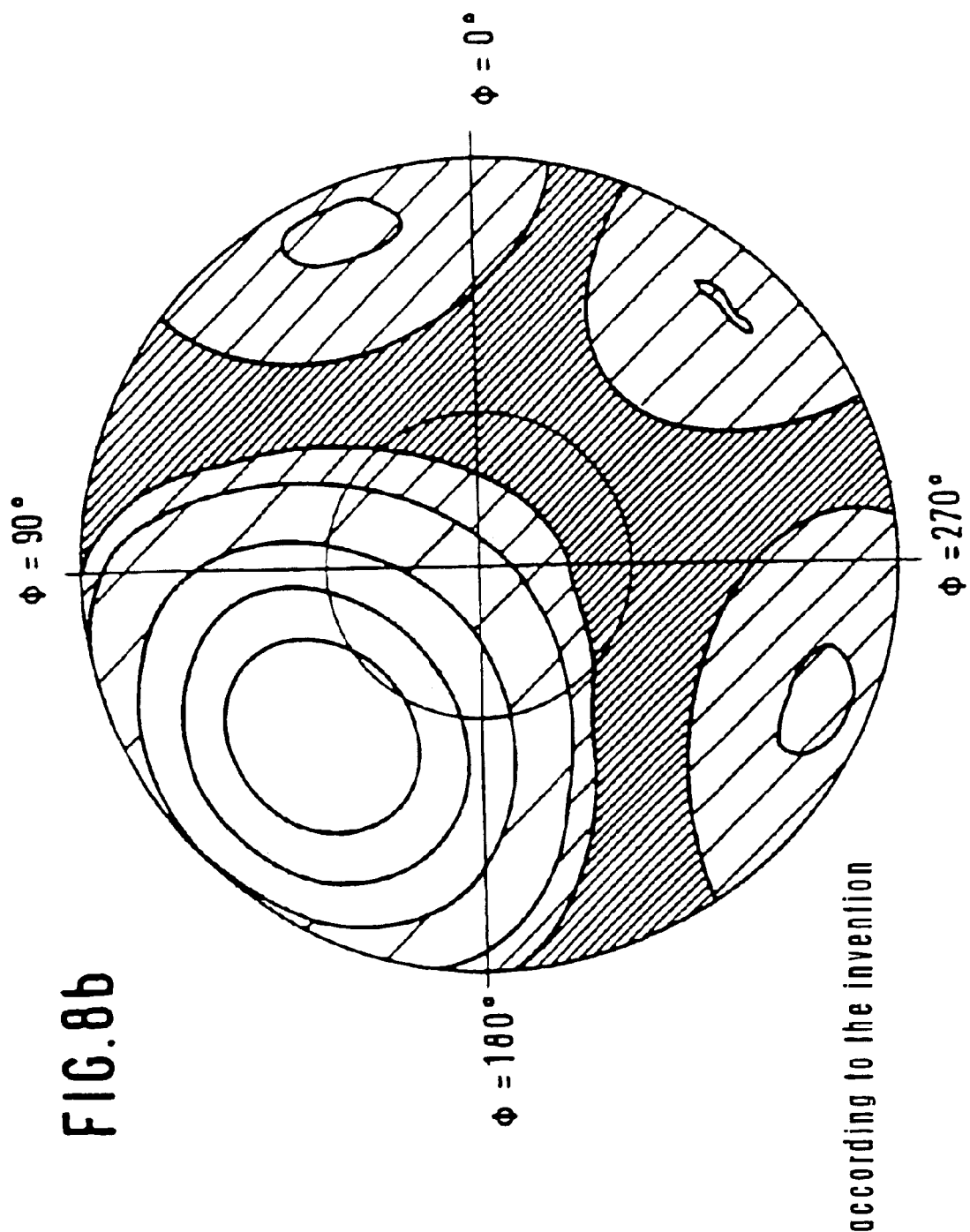
FIG. 8b  according to the invention

LIQUID-CRYSTAL SWITCHING ELEMENTS COMPRISING A LIQUID-CRYSTAL LAYER WHICH HAS EXTREMELY LOW OPTICAL RETARDATION AND LIQUID-CRYSTAL DISPLAYS CONTAINING THEM

The invention relates to an electro-optical liquid-crystal switching element comprising at least one polariser and a liquid-crystal layer which has an initial alignment in which the liquid-crystal molecules are aligned essentially parallel to the substrates and essentially parallel to one another, in which the realignment of the liquid crystals from their initial alignment essentially parallel to the substrates is caused by a corresponding electric field, which, in the case of liquid-crystal materials of negative dielectric anisotropy, is aligned essentially parallel to the substrates and, in the case of liquid-crystal materials of positive dielectric anisotropy, is aligned essentially perpendicular to the substrates, where the liquid-crystal layer has an extremely low optical retardation d-An in the range from 0.06 μm to 0.43 μm, and the liquid-crystal switching element preferably contains, in addition to the liquid-crystal layer, a further birefringent layer, preferably a λ/4 layer or two λ/4 layers or a λ/2 layer, and 2 liquid-crystal display systems containing liquid-crystal switching elements of this type.

The present invention furthermore relates to liquid-crystal media, in particular of low birefringence, for use in the liquid-crystal display systems. These liquid-crystal display systems containing the liquid-crystal switching elements are, inter alia, display screens of television sets, computers, such as, for example, notebook computers or desktop computers, central control units and of other equipment, for example gambling machines, electro-optical displays, such as displays of watches, pocket calculators, electronic (pocket) games, portable data banks, such as PDAs (personal digital assistants) or of mobile telephones.

In particular, the liquid-crystal display systems according to the invention are highly suitable for applications with display of grey shades, such as, for example, television sets, computer monitors and multimedia equipment. Both mains-independent operation and also operation on the mains are possible here. Mains operation is often preferred.

These liquid-crystal display devices are also known as liquid-crystal displays.

The liquid-crystal switching elements typically used in the liquid-crystal display devices of this type are the known TN (twisted nematic) switching elements, for example in accordance with Schadt, M. and Helfrich, W. Appl. Phys. Lett. 18, pp. 127 ff (1974) and in particular in their special form with low optical retardation d·Δn in the range from 150 nm to 600 nm in accordance with DE 30 22 818, STN (super twisted nematic) switching elements, such as, for example, in accordance with GB 2.123.163, Waters, C. M., Brimmel, V, and Raynes, E. Pproc. $3^{rd}$ Int. Display Research Conference, Kobe 1983, pp. 396 ff and Proc. SID 25/4, pp. 261 ff, 1984, Scheffer, T. J. and Nehring, J. Appl. Phys. Lett. 45, pp. 1021 ff, 1984 and J. Appl. Phys. 58, pp. 3022 ff, 1985, DE 34 31 871, DE 36 08 911 and EP 0 260 450, IPS (in-plane switching) switching elements, as described, for example, in DE 40 00 451 and EP 0 588 568, and VAN (vertically aligned nematic) switching elements, as described, for example, in Tanaka, Y. et al. Taniguchi, Y., Sasaki, T., Takeda, A., Koibe, Y., and Okamoto, K. SID 99 Digest pp. 206 ff (1999), Koma, N., Noritake, K., Kawabe, M., and Yoneda, K., International Display Workshop (IDW) '97 pp. 789 ff (1997) and Kim, K. H., Lee, K., Park, S. B., Song, J. K., Kim, S., and Suk, J. H., Asia Display 98, pp. 383 ff, (1998).

In these liquid-crystal display devices which were known hitherto and are for the most part already commercially available, the optical appearance is inadequate, at least for demanding applications. In particular the contrast, especially in the case of coloured displays, the brightness, the colour saturation and the viewing-angle dependence of these parameters are in clear need of improvement and have to be improved if the display devices are to compete with the performance features of the widespread CRTs (cathode ray tubes). Further disadvantages of the liquid-crystal display devices are often their poor spatial resolution and inadequate response times, in particular in the case of STN switching elements, but also in the case of TN switching elements or IPS ("in-plane switching") and VAN (vertically aligned nematic") switching elements, in the case of the latter especially if they are to be used for the reproduction of video, such as, for example, in multimedia applications on computer display screens or in the case of television sets. Particularly for this purpose, but also even for the display of rapid cursor movements, short response times, preferably of less than 32 ms, particularly preferably of less than 16 ms, are desired.

The requirements regarding the viewing-angle dependence of the contrast are highly dependent on the application of the display devices. Thus, for example, the horizontal viewing-angle range is the most important in television screens and computer monitors, whereas centrosymmetrical or at least approximately centrosymmetrical viewing-angle distributions are desired in other applications. Displays having virtually centrosymmetrical viewing-angle distributions are required, in particular, in projection displays in order to utilise the optical apertures as well as possible, but also in computer display screens having a swivel base. These display screens allow the display to be tilted through 90° in order to change from portrait mode to landscape mode while retaining the resolution of the display. Displays of this type obviously have to have similar horizontal and vertical viewing-angle ranges since these are interchanged on tilting.

In general, it should be noted that for practical acceptance of a display, it is not primarily its contrast or its maximum contrast ratio that is crucial, but instead the viewing-angle dependence of the contrast is frequently important. However, these properties should be weighted differently depending on the application.

TN switching elements having a d·Δn in the range from 0.2 μm to 0.6 μm, as described in DE 30 22 818, generally have very good colour saturation and colour depth, but an inadequate viewing angle for demanding applications, such as, for example, desktop computer monitors.

In some embodiments, such as, for example, in typical IPS display devices, the brightness of the display can be achieved to an inadequate extent or can only be achieved at great expense with backlighting. In contrast, VANs are frequently characterised by inadequate colour saturation and colour depth, and furthermore the production of VANs is complex owing to the homeotropic alignment, which is difficult to achieve, and owing to the long filling times.

EP 0 264 667 describes TN cells having twist angles (φ, known as twist for short) in the range from 100 to 80° with a d·Δn in the range from 0.2 μm to 0.7 μm. Although these have both an improved viewing-angle dependence of the contrast and lower steepness of the electro-optical characteristic line compared with TN cells having a 90° twist, they have, however, significant disadvantages. Thus, inter alia, their brightness and their contrast are significantly lower than those of conventional TN switching elements. In addition, the TN switching elements in accordance with EP 0 264 667 switch relatively slowly.

Raynes, E. P., Mol. Cryst. Liq. Cryst. 4, p. 1, ff, 1986, describes the voltage dependence of the tilt angle in the centre of the liquid-crystal layer ($\phi_M$, also known as mid-plane tilt angle or mid-plane tilt for short) as a function of the addressing voltage for cells containing a nematic liquid crystal with a tilted alignment having a tilt angle of from 0° to 270°.

DE 40 10 503 and WO 92/17831, which corresponds thereto, describe, inter alia, TN switching elements having twist angles in the range from greater than 0° to 90° which contain one or more compensation layers, where the compensation layers for compensation of the optical path difference of the switching cell have the same optical retardation as the switching cell. In cells having a twist angle regarded as small, for example 22.5°, the compensation layer may also be omitted. However, the switch elements described in this publication have, in particular, inadequate contrast, which is frequently accompanied by a still considerable viewing-angle dependence of the contrast. Furthermore, the response times, in particular those for the addressing of grey shades, are usually inadequate.

DE 42 12 744 proposes improving the viewing-angle dependence of the contrast and in particular the display of grey shades by TN cells having a 90° twist and a d·Δn in the range from 0.15 μm to 0.70 μm by using a cholesteric liquid-crystal material having a small cholesteric pitch (P) with a d/P ratio in the range from 0.1 to 0.5. The TN switching elements of DE 42 12 744 exhibit similar disadvantages to the switching elements described in EP 0 264 667. The saturation voltage also increases significantly in the cells in accordance with DE 42 12 744 compared with conventional TN cells, albeit not so highly pronounced as in the TN switching elements of EP 0 264 667.

WO 91/06889 and the corresponding U.S. Pat. No. 5,319,478 describe [lacuna] the minimum optical retardations of λ/2 or λ/4 and propose their operation with circular-polarised light. Cells having a twisted structure of the liquid crystal are preferred.

Van Haaren et al., Phys. Rev. E, Vol. 53, No. 2, pp. 1701 to 1713, investigates the elastic constants for surface coupling ($k_{13}$) of the nematic liquid-crystal mixture ZLI-4792, Merck KGaA, in an untwisted cell with a planar alignment having a λ/4 plate.

Tillin et al., SID 98 Digest, pp. 311–314 (1998), investigates reflective liquid-crystal switching elements having a single polariser. He mentions, inter alia, a liquid-crystal switching element having an untwisted liquid crystal which switches from a (d·Δn/λ) of ½ to ¼ in normally white mode and from ¼ to 0 in normally black mode. However, the publication prefers liquid-crystal layers having a twisted structure. In addition, liquid-crystal cells having an (d·Δn/λ) of ⅓ containing a birefringent layer having a (d·Δn/λ) of ½ and optionally an additional birefringent layer having a (d·Δn/λ) of 4/55 are presented. In these, the characteristic directions of the optical components form angles to one another which differ by 0° and 90°. The switching elements having birefringent layers which are described here have a complex structure and are consequently not easy to produce. In addition, the brightness is not particularly good, in particular in the switching elements having a plurality of birefringent layers.

It has now been found that the liquid-crystal switching elements according to the present invention do not have the disadvantages of the known switching elements or at least do so to a significantly reduced extent. They are characterised by very good contrast at the same time as excellent viewing-angle dependence of the contrast. They allow the display both of grey shades and of half-tone colours over a broad range of observation angles. In addition, the response times are good and in particular are adequate for video reproduction.

The liquid-crystal switching elements according to the present invention contain a liquid-crystal layer having a small optical retardation and, if desired, a further birefringent layer, preferably a λ/4 layer, a λ/2 layer or two λ/4 layers, and at least one polariser. The two λ/4 layers may replace the λ/2 layer.

The transmissive or transflective liquid-crystal switching elements according to the present invention preferably contain a polariser and an analyser, which are arranged on opposite sides of the arrangement of liquid-crystal layer and birefringent layer. Polariser and analyser are jointly referred to as polarisers in this application.

FIG. 1 shows a diagrammatic view of the principle of construction of a liquid-crystal switching element according to the invention in the preferred embodiment of a transmissive switching element having a light source, a having a liquid-crystal layer, having two polarisers, having a birefringent layer (here, as preferred, a λ/4 layer) and having crossed polarisers.

FIG. 1a is a side view. For reasons of clarity, the substrates of the liquid-crystal cell between which the liquid-crystal layer is located and the electrode layers located on the alignment layers present on the insides of the substrate and on one or both substrates are omitted. Each of the two polarisers is located on one of the two sides of the liquid-crystal cell. The birefringent layer is located between the liquid-crystal cell and one of the two polarisers, preferably, as shown, on the side facing away from the light source, i.e. between the liquid-crystal cell and the analyser. In this configuration, the fast axis of the birefringent layer is parallel to the transmission axis of the polariser. The light from the light source (backlighting, BL for short) thus passes successively through the polariser, the liquid-crystal cell, the birefringent layer and the analyser before reaching the observer (not shown). However, it is also possible to reverse the sequence of liquid-crystal layer and birefringent layer. In this case, however, the relative alignment of these two components also has to be changed. The fast axis of the birefringent layer is then preferably at an angle of 45° to the polariser, and the projection of the alignment of the liquid crystal in the centre of the cell between the substrates is preferably parallel to the transmission direction of the polariser.

FIG. 1b shows a plan view, i.e. along the z-axis in FIG. 1a. It shows the alignment of the relevant axes of the individual optical components to one another and defines the corresponding angles. The symbols from FIG. 1a are used where appropriate. $\Psi_{PP}$ denotes the angle between the transmission axes of the two polarisers (here 90°), $\Psi_{PL}$ denotes the angle between the transmission axis of the polariser and the preferential direction of the liquid-crystal director in the centre of the layer between the substrates ($n_\parallel$) (here 45°). The fast axis of the λ/4 layer is parallel to the transmission axis of the polariser. The angle $\Psi_{PD}$ is thus 0°. Finally, the observation angle in the plane of the switching element ($\Phi$) is indicated with examples of 0°, 90°, 180° and 270°.

The observation angles in the plane of the display ($\Phi$ and $\Phi'$) and perpendicular to the normal ($\Theta$) are defined in FIG. 2. The observation angles $\Phi'$ commence with $\Phi'=0°$ in the quadrant with the highest contrast at the angle of the highest contrast, which is generally in the direction of $n_\parallel$. Thus, [lacuna] or $\Phi'$ is shifted by 45° compared with $\Phi$.

The fast axis of the λ/4 layer is parallel to the transmission direction of the polariser, to that of the polariser adjacent to the λ/14 layer in the case of the presence of two or more polarisers (cf. FIG. 1b). An analogous situation applies in the presence of two λ/4 layers or of one λ/2 layer.

Linear polarisers are preferably used in the switching elements according to the present application. These linear polarisers may be single-layered polarisers or consist of a combination of a plurality of layers, where these layers may also comprise two or more polarising layers. The degree of polarisation of the polarisers is chosen to be sufficiently high in order to achieve good contrast, but also sufficiently low to achieve good brightness of the switching element. The use of a polariser having a relatively low degree of polarisation, a so-called clean-up polariser, in combination with a polariser having a relatively high degree of polarisation often proves advantageous. In this case, the polarisers are preferably bonded using an adhesive of appropriate refractive index in order to avoid light losses at the surfaces.

The liquid-crystal layer is usually held between two substrates. At least one of the substrates transmits light, preferably both substrates transmit light. The light-transmitting substrates consist, for example, of glass, quartz glass, quartz or of transparent plastics, preferably of glass and particularly preferably of borosilicate glass.

The substrates together with an adhesive frame form a cell in which the liquid-crystal material of the liquid-crystal layer is held. The substrates are preferably planar.

The separation of the planar substrates is kept essentially constant over the entire area by means of spacers. These spacers may be used only in the adhesive frame or, alternatively, distributed over the entire area of the cell. The use of spacers exclusively in the adhesive frame reduces problems with misalignment in the liquid-crystal layer. It is particularly appropriate in the case of liquid-crystal cells having small area diagonals, in particular up to 5" and preferably up to 3". In the case of larger-area liquid-crystal cells, in particular in the case of those having diagonals of 14" or more and very particularly of 18" or more, spacers are preferably employed distributed over the entire area. In this case, it is possible and often advantageous to employ different spacers in the adhesive frame and in the cell area. The preferred limits for the various distributions of the spacers over the cell area additionally depend on the thickness of the substrates used. Thus, the use of spacers distributed over the entire display area is preferred in the case of relatively thin glass and in the case of relatively large diagonals.

The preferred substrate thicknesses are from 0.3 mm to 1.1 mm, particularly preferably from 0.4 mm to 0.7 mm. In the case of the relatively large diagonals of the cells, the substrates of relatively large thicknesses are preferably employed.

The liquid-crystal switching elements according to the invention are distinguished by very good grey-shade capacity, a low dependence of the contrast on the observation angle, even in the case of colour display, with a large viewing-angle range and low contrast inversion and, in particular, by very short response times. In particular, the inverse contrast, as defined, for example, in DE 42 12 744, which occurs, for example, in displays in accordance with DE 30 22 818, is significantly reduced, in particular at relatively large observation angles θ.

As spacers, commercially available spacers in bead form or in cylindrical form may consist either of plastics or of inorganic materials, such as, for example, chopped glass fibre. Suitable spacers are furthermore more or less regular, raised structures on, preferably, one of the substrates. These regular, raised structures may have various shapes, such as, for example, rectangular, square, oval or round columns or pyramid shafts, but also strip- or wave-shaped structures.

The liquid-crystal switching elements in accordance with the present application have, if they are reflective switching elements, at least one polariser and a reflector, with at least one polariser and the reflector being located on opposite sides (i.e. substrates) to one another in the liquid-crystal cell. In the case that they are transmissive or reflective switching elements, these have at least two polarisers, in each case at least one of which is arranged on one of the two opposite sides of the liquid-crystal cell (so-called sandwich structure). The obligatory polarisers mentioned are preferably linear polarisers and particularly linear polarisers having a high degree of polarisation.

In addition to the obligatory polarisers, the switching elements according to the invention may contain one or more further polarisers. These may be so-called clean-up polarisers having a lower degree of polarisation, but high transmission. In particular in the case of reflective switching elements, however, a further polariser having a high degree of polarisation may also be present. This is preferably arranged between the liquid-crystal cell and the reflector. However, the use of additional polarisers is generally less preferred since in most cases it results in a reduction in the transmission. However, it is usual, in particular in connection with so-called brightness-increasing components, which may, for example, contain cholesteric polymer films.

In the case of transmissive and transflective displays in accordance with the present application, the two obligatory polarisers are arranged either crossed or parallel to one another. In this application, the directions of the arrangement of the polarisers are relative to their absorption axes. The crossed arrangement of the polarisers is preferred. The angle of the absorption axes to one another ($\Psi_{PP}$) in the case of crossed polarisers is in the range from 75° to 105°, preferably from 85° to 95°, particularly preferably from 88° to 92°, especially preferably from 89° to 91° and very particularly preferably 90°, and in the case of parallel polarisers is from −15° to 15°, preferably from −5° to 5°, particularly preferably from −2° to 2°, especially preferably from −1° to 1° and very particularly preferably 0°.

The angle between the absorption axis of the polariser adjacent to the liquid-crystal layer with the direction of the alignment of the director of the liquid-crystal material in the unswitched (field-free) state at the adjacent substrate ($\Psi_{PL}$) is from 35° to 55°, preferably from 40° to 50°, particularly preferably from 43° to 47°, in particular from 44° to 46° and ideally 45°. This applies to the untwisted alignment of the liquid crystal. In the case of the twisted alignment of the liquid crystal, the preferential direction for the indication of the angle $\Psi_{PL}$ is the projection of the alignment of the liquid-crystal director in the centre between the two substrates of the cell on the substrate adjacent to the polariser. On use of further birefringent layers and/or compensators in addition to the obligatory or preferred λ/4 or λ/2 layer or layers, depending on the embodiment, other angles between the polariser direction and the liquid-crystal alignment can also be employed. However, these are generally not preferred.

The twist angle (φ) of the liquid-crystal layer between the two substrates is, in particular in the case of switching elements having a birefringent layer, in particular having a λ/4 or λ/2 layer, or having a plurality of birefringent layers, in particular having two λ/4 layers, preferably from −20° to 20°, particularly preferably from −10° to 10°, especially preferably from −5° to 5°, very particularly preferably from −2° to 2° and most preferably from −1° to 1°.

For the preferred embodiment without a birefringent layer, i.e. without a λ/4 or λ/2 layer or layers, the liquid-crystal layer is essentially untwisted and particularly preferably untwisted. A twist angle (φ) of from −6° to 6° is preferred. The twist angle is particularly preferably from −1.0° to 1.0°, very particularly preferably from −0.5 to 0.5, especially preferably 0.0°.

The liquid-crystal materials are aligned at the substrate surfaces by conventional methods. To this end, use can be made of inclined vapour deposition with inorganic compounds, preferably oxides, such as $SiO_x$, alignment on surfaces that have been subjected to antiparallel rubbing, in particular on polymer layers, such as polyimide layers, that have been subjected to antiparallel rubbing, or alignment on photopolymerised anisotropic polymers. In the case of vertical alignment (abbreviated to VA), it is also possible to employ lecithin or surface-active substances for homeotropic alignment.

The liquid-crystal switching elements in accordance with the present invention can be produced using the production processes in the production plants for the most widespread liquid-crystal switching elements to date, the TN liquid-crystal switching elements. In particular, there is no need for special effort regarding alignment of the liquid-crystal director, as, for example, in STN (high tilt angle) or in VAN (homeotropic alignment). In addition, in contrast to TN, IPS having a twisted initial state and in particular to STN, additives, such as chiral dopants, can be substantially and frequently even completely omitted. A further process parameter which is sometimes difficult to control is thus superfluous.

The surface tilt angle at the substrates ($\phi_0$, tilt for short) is in the range from 0° to '15°, preferably in the range from 0° to 10°, particularly preferably in the range from 0.1° to 5° and especially preferably in the range from 0.2° to 5° and most preferably in the range from 0.3° to 3°. The surface tilt angle at the alignment layer on at least one of the substrate surfaces is from 0.5° to 3°. The tilt angle at the two substrates is preferably essentially identical.

The electrodes on the substrates transmit light, at least on one of the substrates and preferably on both substrates. The material employed for the electrodes is preferably indium tin oxide (ITO), but it is also possible to use aluminium, copper, silver, and/or gold.

Since the surface tilt angle in the liquid-crystal display elements according to the invention may be small, the use of anisotropically photopolymerisable materials, such as, for example, cinnamic acid derivatives, the so-called photoalignment should particularly advantageously be employed.

This applies in particular to a preferred embodiment of the liquid-crystal display elements according to the invention, the embodiment with multidomain switching elements. In these, the individual liquid-crystal switching elements or their individual display electrodes (also known as pixels) are divided into sub-areas of different alignment of the liquid-crystal director, at least in the switched state, but generally also in the unswitched state, so-called domains. These domains having different alignment in the switched state can be induced, for example, by different surface tilt angles or by different differential alignment on the substrates. However, they can also be induced by corresponding electric fields with a sufficiently inclined alignment, for example through slotted electrodes, or through non-planar surface topographies. In particular in the case of induction of the domains by electric fields which are not perpendicular to the substrates, but also in the case of non-planar surface topographies, the smallest possible surface tilt angle, if possible of 0°, is usually preferred, as can readily be achieved by means of photoalignment. The individual pixels of the multidomain switching elements preferably contain two or more, preferably precisely a multiple of two, very particularly preferably two or four, domains. The tilt angles of the liquid-crystal director in the centre of the liquid-crystal layer ($\phi_M$, mid-plane tilt angle) of these domains in the switched state are preferably opposite one another in pairs. The result of this is that the viewing-angle dependencies of the domains, also known as sub-pixels, cancel each other out, and the undesired effect is eliminated. The light-scattering disclinations which occur at the domain limits are covered by a corresponding mask, preferably a black mask, in order to improve the contrast. Through appropriate design of the structure or structures inducing the domains, and of the mask, the restriction in the light yield by the reduced aperture ratio can be kept as low as possible.

The larger of the preferred surface tilt angles are particularly advantageous for a definition of the preferred quadrant, i.e. the quadrant in which the best contrast is observed. They result, in particular, in a suppression of reverse tilt domains, which arise particularly easily on application of nonorthogonal fields.

Active electric switching elements of the active matrix which are used are both bipolar structures, such as diodes, for example MIM diodes or back to back diodes, if desired with reset, and tripolar structures, such as transistors, for example thin-film transistors (TFTs), or varistors. For the liquid-crystal display devices in accordance with the present application, TFTs are preferred. The active semiconductor medium of these TFTs is amorphous silicon (a-Si), polycrystalline silicon (poly-Si) or cadmium selenide (CdSe), preferably a-Si or poly-Si. Poly-Si here equally denotes high-temperature and low-temperature poly-Si.

In liquid-crystal switching elements according to a preferred embodiment of the present invention, the liquid-crystal layer preferably has an optical retardation (d·Δn) of from 0.14 μm to 0.42 μm, particularly preferably from 0.22 μm to 0.34 μm, especially preferably from 0.25 μm to 0.31 μm, very particularly preferably from 0.27 μm to 0.29 μm and ideally 0.28 μm.

To this end, liquid-crystal materials of low birefringence Δn are preferably employed. The birefringence of the liquid-crystal materials is preferably from 0.02 to 0.09, particularly preferably from 0.04 to 0.08, especially preferably from 0.05 to 0.075, very particularly preferably from 0.055 to 0.070 and ideally from about 0.060 to 0.065.

The layer thickness of the liquid-crystal layer is preferably from 1 μm to 10 μm, preferably from 2 μm to 7 μm, particularly preferably from 3 μm to 6 μm and especially preferably from 4 μm to 5 μm.

In liquid-crystal display devices containing liquid-crystal cells having a diagonal of up to 6", layer thicknesses of the liquid-crystal layer of from 1 μm to 4 μm and particularly from 2 μm to 3 μm are preferred. In liquid-crystal display devices containing liquid-crystal cells having a diagonal from 10", layer thicknesses of the liquid-crystal layer of from 3 μm to 6 μm and particularly from 4 μm to 5 μm are preferred.

There are two different preferred sub-forms for this preferred embodiment. In the first of these preferred sub-embodiments of the present invention, the liquid-crystal layer has an optical retardation (d·Δn) of from 0.20 μm to 0.37 μm, preferably from 0.25 μm to 0.32 μm, particularly preferably from 0.26 μm to 0.30 μm, very particularly preferably from 0.27 μm to 0.29 μm, and most preferably 0.28 μm.

In this preferred sub-embodiment, the display element surprisingly does not require a λ/4 layer in some applications. It is nevertheless characterised by good brightness, excellent contrast and excellent viewing-angle dependence and very good grey-shade and colour-shade display given an appropriate polariser setting, preferably at an angle of essentially 45° to the liquid-crystal preferential direction. Without a λ/4 layer, a very broad viewing-angle range for the observation angle Θ is achieved, although not for all observation angles Φ. By contrast, the viewing-angle range in the switching elements having a λ/4 layer is significantly more centrosymmetrical, i.e. extends to all similar, large values of the observation angle Θ at all observation angles Φ (cf. in this respect also FIGS. 9a) and 9b) regarding Examples 1 and 2).

In the second of these preferred sub-embodiments of the present invention, the display elements preferably contain a λ/4 layer, and the liquid-crystal layer has an optical retardation $[(d \cdot \Delta n)_{LC}]$ of from 0.10 μm to 0.45 μm, preferably from 0.20 μm to 0.37 μm, particularly preferably from 0.25 μm to 0.32 μm, very particularly preferably from 0.26 μm to 0.30 μm, especially particularly preferably from 0.27 μm to 0.29 μm, and most preferably 0.28 μm. The liquid-crystal layer in the unswitched state thus behaves approximately like a λ/2 layer. Preference is furthermore given here to an embodiment in which the $(d \cdot \Delta n)_{LC}$ is different from 0.28 μm, preferably in the range from 0.10 μm to 0.27 μm or from 0.30 μm to 0.45 μm, particularly preferably from 0.14 μm to 0.25 μm or from 0.32 μm to 0.42 μm, very particularly preferably from 0.22 μm to 0.25 μm, or from 0.32 μm to 0.34 μm.

In the present application, the wavelength x always preferably relates to the wavelength of maximum sensitivity of the human eye, to 554 nm, unless explicitly stated otherwise.

The terms λ/4 layer and λ/4 plate, or λ/2 layer and λ/2 plate are generally used with equal importance in the present application. The term λ in λ/4 layer and λ/2 layer denotes a wavelength in the region of λ±30%, preferably λ±20%, particularly preferably λ±10%, especially preferably λ±5% and very particularly preferably λ±2%. The wavelength here, unless stated otherwise, is 554 nm. The wavelength of the λ/4 layer or λ/2 layer is generally and in particular in the case of a significant spectral distribution given as the central wavelength thereof.

The λ/4 layer or λ/2 layer is an inorganic layer or preferably an organic layer, for example comprising a birefringent polymer, for example stretched films (PET) or liquid-crystalline polymers.

The use particularly of the smaller of the preferred layer thicknesses of the liquid-crystal layer is preferred in view of the advantageous short response times which can be achieved thereby. In addition, it tends to allow the use of conventional liquid-crystal materials or makes at least lower demands regarding the often difficult implementation of the small an values.

By contrast, the use of liquid-crystal materials having a particularly small Δn is preferred in view of the lower layer thickness dependence of the contrast and of the background hue of the liquid-crystal switching elements. In addition, the production of the display elements in this embodiment is possible with significantly greater yields, especially in the case of liquid-crystal cells having larger diagonals.

For a broad working-temperature range, particular preference is given to liquid-crystal materials having a relatively high clearing point, since the effect of the λ/4 layer is significantly temperature-dependent, owing to the temperature dependence of the birefringence of the liquid-crystal materials $[\Delta n_{LC}(T)]$, and $\Delta n_{LC}(T)$ in liquid-crystal materials having a high clearing point is relatively low. The temperature dependence of the optical arrangement as a whole is thus kept relatively low and can thus, if necessary, also be compensated more readily.

In a second preferred embodiment of the present invention, the liquid-crystal layer has an optical retardation of from 0.07 μm to 0.21 μm, preferably from 0.11 μm to 0.17 μm, particularly preferably from 0.12 μm to 0.16 μm, especially preferably from 0.13 μm to 0.15 μm and very particularly preferably 0.14 μm. In this preferred embodiment, the display element preferably has at least one birefringent layer, preferably a λ/2 layer or two λ/4 layers, in addition to the liquid-crystal layer.

To this end, liquid-crystal materials of low birefringence Δn are again preferably employed. The birefringence of the liquid-crystal materials is preferably from 0.02 to 0.09, particularly preferably from 0.04 to 0.08, especially preferably from 0.05 to 0.07, very particularly preferably from 0.055 to 0.065 and ideally about 0.060.

The layer thickness of the liquid-crystal layer is preferably from 0.5 μm to 7 μm, preferably from 1 μm to 5 μm, particularly preferably from 1.5 μm to 4 μm and especially preferably from 2 μm to 2.5 μm. Particular preference is given here to displays containing liquid-crystal cells having smaller diagonals, in particular in the range from 0.5" to 6", particularly in the range from 1"to4".

In this second preferred embodiment, the liquid-crystal switching elements preferably contain two λ/4 layers or, particularly preferably, one λ/2 layer. The two λ/4 layers can be used on different sides of the liquid-crystal layer, but they can also be located on the same side of the liquid-crystal layer.

In particular if the optical retardation of the liquid-crystal layer $[(d \cdot \Delta n)_{LC}]$ is significantly different from 0.14 μm, particularly if it is in the range from 0.07 μm to 0.12 μm or from 0.16 μm to 0.21 μm, the use of two λ/4 layers, or one λ/2 layer is necessary.

This second preferred embodiment makes high demands both regarding the birefringence of the liquid-crystal material and regarding the layer thickness of the liquid-crystal layer. However, the requirements of the layer thickness of the liquid-crystal layer are somewhat reduced by the lower layer-thickness dependence of the optical properties of the switching elements. In the case of small-area liquid-crystal cells, the layer-thickness tolerance is in addition easier to comply with. In addition, the thin liquid-crystal cells in this preferred embodiment have extremely short short response times.

The liquid-crystal switching elements in accordance with the present application can be operated transmissively, transflectively or reflectively. The transmissive or transflective mode, particularly preferably the transmissive mode, is preferred.

Transflective displays enable the advantages of low power consumption of the reflective displays to be combined with that of good legibility at low ambient brightness of the transmissive displays with backlighting.

Reflectors which can be used are dielectric or metallic layers. Metallic reflector layers are preferred. On use of metallic reflectors, a greater by, variation in the optical retardation of the liquid-crystal layer can be tolerated. If a dielectric mirror is used, the optical retardation of the liquid-crystal layer is essentially λ/4, in particular in the case of switching elements without a birefringent layer. On use of a second linear polariser between the liquid-crystal layer and the reflector, preference is given to a dielectric reflector, which preferably has a low fraction of depolarised reflection.

Particularly preferred combinations of the optical retardation of the liquid-crystal layer and of the birefringent layer are shown in the following table (Table 1). In this table, the preferred settings of the polarisers both with respect to one another and with respect to the preferential direction of the liquid crystals are also indicated.

TABLE 1

Preferred parameter combinations

A) Transmissive or transflective switching element

| $(d\Delta n)_{LC}/$ $\mu m$ | Birefringent layer | $\Psi_{PP}/°$ | Preferably | $\Psi_{PL}/°$ | Preferably |
|---|---|---|---|---|---|
| 0.220 to 0.276 | λ/4 plate obligatory | 0 to 10 | 90 to 70 | 45 +/− 10 | 45 +/− 5 |
| 0.277 | λ/4 plate preferred | 0 +/− 5 | 90 +/− 5 | 45 +/− 10 | 45 +/− 5 |
| 0.278 to 0.335 | λ/4 plate obligatory | 0 to 15 | 90 to 110 | 45 +/− 10 | 45 +/− 5 |
| 0.110 to 0.138 | λ/2 plate obligatory | 0 to 15 | 90 to 70 | 45 +/− 10 | 45 +/− 5 |
| 0.1385 | λ/2 plate preferred | 0 +/− 5 | 90 +/− 5 | 45 +/− 10 | 45 +/− 5 |
| 0.139 to 0.168 | λ/2 plate obligatory | 0 to 15 | 90 to 110 | 45 +/− 10 | 45 +/− 5 |

B) Reflective switching element having two polarisers

| $(d\Delta n)_{LC}/\mu m$ | Birefringent layer | $\Psi_{PP}/°$ | $\Psi_{PL}/°$ preferably |
|---|---|---|---|
| 0.110 to 0.138 | λ/4 plate obligatory | 90 to 70 | 45 +/− 5 |
| 0.1385 +/− 0.0004 | λ/4 plate preferred | 90 +/− 5 | 45 +/− 5 |
| 0.139 to 0.168 | λ/4 plate obligatory | 90 to 110 | 45 +/− 5 |

C) Reflective switching element having one polariser

| $(d\Delta n)_{LC}/\mu m$ | Birefringent layer | $\Psi_{PL}/°$ |
|---|---|---|
| 0.110 to 0.138 | λ/4 plate obligatory | 45 +/− 5 |
| 0.1385 +/− 0.0004 | λ/4 plate preferred | 45 +/− 5 |
| 0.139 to 0.168 | λ/4 plate obligatory | 45 +/− 5 |

Note: the term λ/2 plate in the above table expressly also covers two λ/4 plates.

The angle $\Psi_{PD}$ is preferably 0°+/−5°, particularly preferably 0°+/−2° and very particularly preferably 0°+/−1°.

The following table (Table 2) shows preferred combinations of the optical retardations of the liquid-crystal layer and, if present, of the birefringent layer with the twist angles of the liquid-crystal layer.

TABLE 2

Preferred parameter combinations

A) Transmissive or transflective switching element having a birefringent layer

| | | $\phi/°$ | | |
|---|---|---|---|---|
| $(d \cdot \Delta n)_{LC}$ | $(d \cdot \Delta n)_{DS}$ | | Preferably | Part. pref. |
| λ/2 | λ/4 | 0 +/− 20 | 0 +/− 8 | 0 +/− 4 |
| λ/4 | λ/2 | 0 +/− 20 | 0 +/− 8 | 0 +/− 4 |
| λ/4 | 2 * (λ/4) | 0 +/− 20 | 0 +/− 8 | 0 +/− 4 |

TABLE 2-continued

Preferred parameter combinations

B) Transmissive or transflective switching element with no birefringent layer

| $(d \cdot \Delta n)_{LC}/\lambda$ | | $\phi/°$ | | |
|---|---|---|---|---|
| Unswitched | Switched | | Preferably | Part. pref. |
| 1/2 | 0 | 0 +/− 6 | 0 +/− 0.5 | 0 +/− 0.3 |
| 1/4 | 0 | 0 +/− 6 | 0 +/− 0.5 | 0 +/− 0.3 |

The liquid-crystal switching elements in accordance with the present invention act as light valves on application of a voltage. This is shown, for example, in FIGS. 1 and 2 for the liquid-crystal switching elements of the first preferred embodiment of the present application. With crossed polarisers, the switching element in the voltage-free state, the "off state", transmits light (known as "normally white" or alternatively positive contrast). With increasing applied voltage, a threshold is initially reached from which the transmission begins to drop. The transmission then drops in a virtually linear manner with increasing voltage over a relatively broad voltage range. At higher voltage, the transmission comes up against a limit, and saturation is reached.

The liquid-crystal switching elements are preferably addressed in such a way that the optical retardation of the liquid-crystal layer in the case of complete switching approaches 0 nm or at least essentially 0 nm. This naturally does not exclude the addressing of grey shades with the intermediate values required for this purpose.

It goes without saying that in order further to improve the optical properties, the display elements in accordance with the present invention may contain further optical layers. These layers can be, for example, compensation layers, which are employed, in particular, in display elements having a twist of the liquid-crystal layer which is different from 0°, or alternatively films which collimate the light, for example from backlighting, such as the so-called "brightness enhancement films" (BEF) or cholesteric circular polarisers for utilisation of the half of the backlighting light which is otherwise absorbed by the polariser.

The display of coloured images using the display elements in accordance with the present invention is possible in various ways. Backlighting having an approximately white spectral distribution is preferably used, and the colour splitting carried out by a colour filter. The individual liquid-crystal switching elements are then employed as light valves for the respective primary colours. The backlighting can also be matched to the spectral characteristics of the colour filter in such a way that it has corresponding intensity maxima in the respective transmission regions. However, colour display can also be achieved by birefringence effects.

The liquid-crystal switching elements according to the invention and in particular the reflective switching elements preferably operate in normally white mode (for the polariser setting, cf. FIG. 3 and the associated description).

Liquid-crystal mixtures which are used in the liquid-crystal switching elements according to the invention preferably comprise from 3 to 27, particularly preferably from 10 to 21 and very particularly preferably from 12 to 18, individual compounds. The individual compounds preferably employed preferably each contain a 1.4'-trans-trans-bicyclohexylene unit of the sub-formula i:

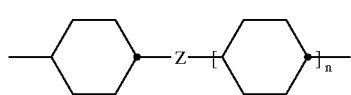

where

Z is a single bond, —CH$_2$CH$_2$— or —CF$_2$CF2 and n is 1 or 2.

It is also possible here for one or preferably two non-adjacent —CH$_2$— groups in one of the cyclohexane rings to be replaced by oxygen atoms or for two adjacent —CH$_2$— groups to be replaced by one —CH=CH— group.

In the case of compounds having a total of only two six-membered rings, it is also possible, if desired, for one of the two cyclohexane rings to be replaced by 1.4-phenylene, which may also, if desired, be laterally difluorinated or preferably monofluorinated.

The liquid-crystal mixtures preferably comprise one or more compounds containing a structural unit of the formula i in which n is 2.

The liquid-crystal mixtures used in the liquid-crystal switching elements according to the invention preferably comprise a component A consisting of compounds having 2 six-membered rings, a component B consisting of compounds having 3 six-membered rings, and, if desired, a component C consisting of compounds having 4 six-membered rings.

The liquid-crystal mixtures preferably essentially consist of components A, B and, if desired, C.

Particularly preferred liquid-crystal mixtures comprise one or more dielectrically neutral compounds of the formula I

in which

R$^{11}$ is n-alkyl having from 1 to 5 carbon atoms,

R$^{12}$ is n-alkyl having from 1 to 5 carbon atoms, 1E-alkenyl, preferably vinyl, or n-alkoxy having from 1 to 6 carbon atoms, optionally dielectrically positive compounds selected from the group consisting of the formulae II and II'

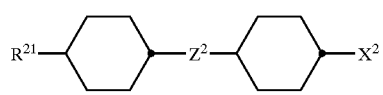

in which

R$^{21}$ is n-alkyl or 1E-alkenyl having from 3 to 7 or from 2 to 8, preferably from 5 to 7 or from 4 to 6 carbon atoms respectively, Z$^2$ is a single bond or —CH$_2$CH$_2$— and

X$^2$ is OCF$_3$, CF$_3$ or CH$_2$CH$_2$CF$_3$, preferably CF$_3$ or CH$_2$CH$_2$CF$_3$,

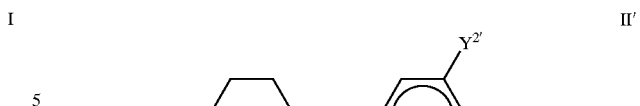

in which

R$^{2'}$ is n-alkyl or 1E-alkenyl having from 3 to 7 or from 2 to 8, preferably having from 5 to 7 or from 4 to 6 carbon atoms respectively, Z$^{2'}$ is a single bond or —CH$_2$CH$_2$—, X$^{2'}$ is OCF$_2$H, OCF$_3$ or F, preferably F, and Y$^{2'}$ and Z$^{2'}$, independently of one another, are H or F, and compounds of the formula III

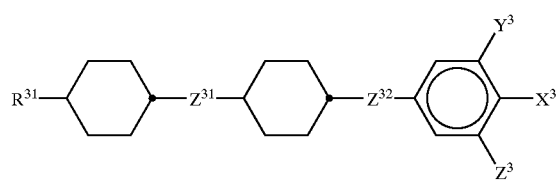

in which

R$^{31}$ is n-alkyl or 1E-alkenyl having from 2 to 7, preferably from 2 to 5, carbon atoms, Z$^{31}$ and Z$^{32}$ may each be a single bond of Z$^{31}$ and Z$^{32}$ and —CH$_2$CH$_2$— or —CF$_2$CF$_2$—, preferably —CH$_2$CH$_2$, but particularly preferably are both a single bond, X$^3$ is OCF$_2$, OCF$_3$ or F, Y$^3$ and Z$^3$, independently of one another, are H or F, in the case of X$^3$=OCF$_2$ both Y$^3$ and Z$^3$ are preferably F, in the case of X$^3$=F both Y$^3$ and Z$^3$ are preferably F, in the case of X$^3$=OCF$_3$ one of Y$^3$ and Z$^3$ is preferably F, and the other is H, optionally one or more compounds selected from the group consisting of the compounds of the formulae IV and V

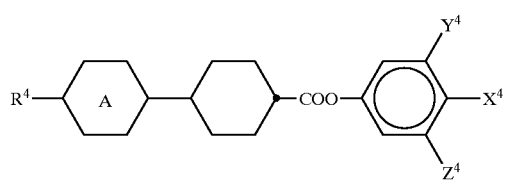

in which

R$^4$ is n-alkyl or 1E-alkenyl having from 2 to 5, preferably having from 2 to 5 carbon atoms,

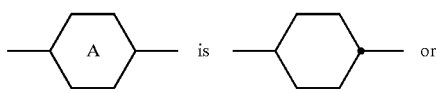 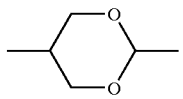

$X^4$ is $OCF_2H$, $OCF_3$ or F, preferably F or $OCF_3$,
$Y^4$ and $Z^4$, independently of one another, are H or F,
in the case of
X=F and

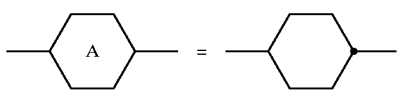

both $Y^4$ and $Z^4$ are preferably F
in the case of
$X=OCF_3$ and particularly preferably in the case of

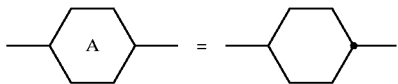

one of $Y^3$ and $Z^3$ is F, and the other is H.

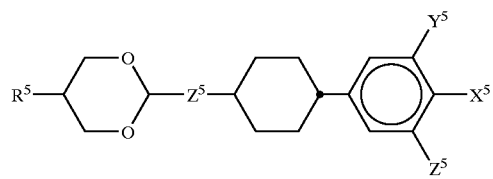

in which
$R^5$ is n-alkyl or 1E-alkenyl having from 2 to 5 carbon atoms,
$Z^{51}$ is a single bond or —$CH_2CH_2$—,
$X^5$ is F, $OCF_3$ or $OCF_2H$,
$Y^5$ and $Z^5$, independently of one another, are H or F,
preferably
$X^5$, $Y^5$ and $Z^5$ are all F,
optionally one or more compounds of high clearing point selected from the group consisting of the compounds of the formulae VI to XI

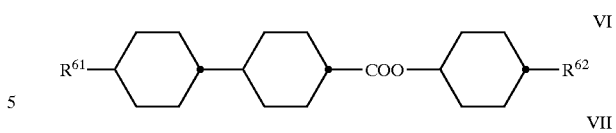

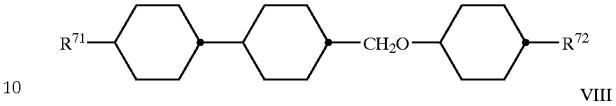

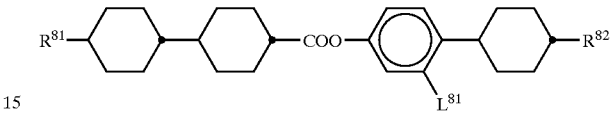

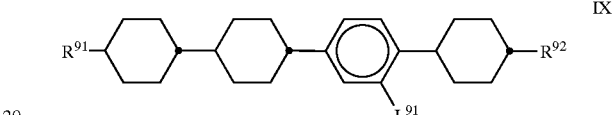

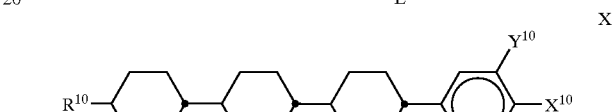

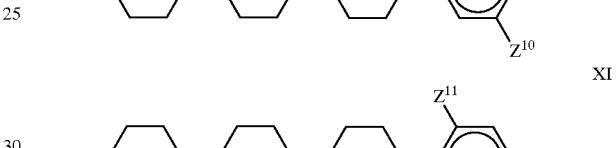

in which $R^{71}$ and $R^{72}$, $R^{81}$ and $R^{82}$, $R^{91}$ and $R^{92}$, $R^{10}$ and $R^{11}$ are each, independently of one another, as defined above for $R^{11}$ and $R^{12}$ in the formulae I,
$L^{81}$ and $L^{91}$ are H or F, and
$X^{10}$, $Y^{10}$ and $Z^{10}$, and $X^{11}$, $Y^{11}$ and $Z^{11}$ are each, independently of one another, as defined above for $X^3$, $Y^3$, and $Z^3$ in the formulae III.

The liquid-crystal mixtures in accordance with the present application preferably comprise from 4 to 36 compounds, particularly preferably from 6 to 25 compounds and very particularly preferably from 7 to 20 compounds.

Particularly preferred liquid-crystal mixtures comprise one or more compounds selected from the group consisting of the following compounds from Table 3 and especially preferably in each case one or more compounds of at least three, preferably of at least four, different formulae of those listed in Table 3 below.

TABLE 3

Preferred compounds $C_nH_{2n+1}$—⬡—⬡—COO—⬢—⬡—$C_mH_{2m+1}$

CCPC-nm

TABLE 3-continued

Preferred compounds $C_mH_{2m+1}$—⬡—⬡—⌬—⬡—$C_nH_{2n+1}$

CPCC-n-m, $C_nH_{2n+1}$—⬡—⬡—$CH_2O$—⬡—$C_mH_{2m+1}$

CCOC-n-m $C_nH_{2n+1}$—⬡—⬡—COO—⬡—$C_mH_{2m+1}$

CH-nm $C_nH_{2n+1}$—⬡—⬡—⌬(F,F,F)

CCP-nF.F.F $C_nH_{2n+1}$—⬡—⬡—⌬(F,F)—$OCHF_2$

CCP-nOCF2.F.F $C_nH_{2n+1}$—⬡—[1,3-dioxane]—⌬(F,F,F)

CDU-n-F $C_nH_{2n+1}$—⬡—⬡—⌬—$OCF_3$

CCP-nOC3F $C_nH_{2n+1}$—⬡—⬡—⌬(F)—$OCF_3$

CCP-nOC3F.F

TABLE 3-continued
Preferred compounds
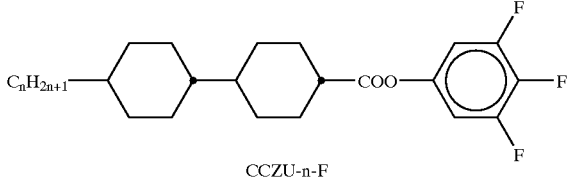
CCZU-n-F
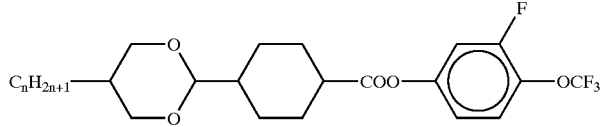
DCZG-n-OT
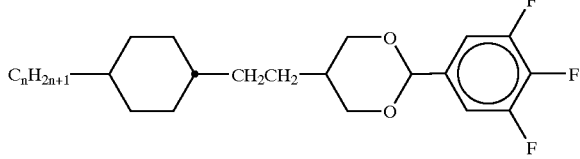
CEDU-n-F
CCH-nm
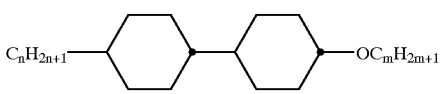
CCH-nOm
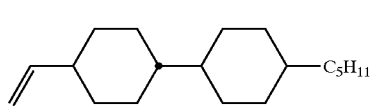
CC-n-V
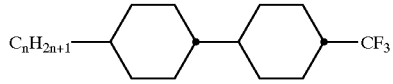
CCH-nCF3
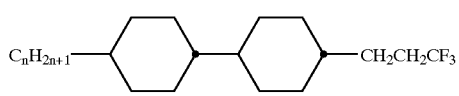
CCH-n2T
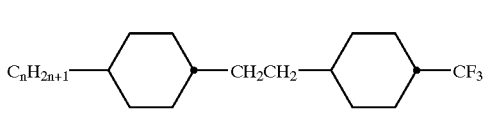
ECCH-nCF3

TABLE 3-continued

Preferred compounds $C_nH_{2n+1}$—⟨cyclohexane⟩—⟨benzene⟩—F

PCH-nF cyc-($C_nH_{2n-1}$)—$(CH_2)_m$—⟨cyclohexane⟩—⟨cyclohexane⟩—⟨benzene⟩(F)—F CCG-(c n)m-F $C_nH_{2n+1}$—⟨cyclohexane⟩—⟨cyclohexane⟩($C_mH_{2m+1}$)—C≡C—C≡C—($C_lH_{2l+1}$)⟨cyclohexane⟩—⟨cyclohexane⟩—$C_kH_{2k+1}$ CCTTCC-n-m-l-k $C_nH_{2n+1}$—⟨cyclohexane⟩—⟨cyclohexane⟩—$OCH_2$—⟨cyclohexane⟩—$CF_3$ CCOlC-n-T
or
CHO-nT $C_nH_{2n+1}$—⟨cyclohexane⟩—⟨cyclohexane⟩(C≡C—$C_lH_{2l+1}$)($C_mH_{2m+1}$)

CC-n-(Tl)m $C_nH_{2n+1}$—⟨cyclohexane⟩—⟨cyclohexane⟩(C≡CH)($C_mH_{2m+1}$)

CC-n-(T)m $C_nH_{2n+1}$—⟨cyclohexane⟩—⟨cyclohexane⟩—⟨cyclobutane⟩(F)(F)

CCS-n $C_nH_{2n+1}$—⟨cyclohexane⟩—⟨cyclohexane⟩(NCS)($C_mH_{2m+1}$)

CC-n-(S)m

The temperature range of the nematic phase preferably extends from −20° C. to 60° C., particularly preferably from −30° C. to 70° C. and very particularly from 40° C. to 80° C. The birefringence is preferably from 0.040 to 0.070, particularly preferably from 0.050 to 0.065 and very particularly preferably from 0.054 to 0.063. The rotational viscosity is preferably from 60 to 170 m Pa s, particularly preferably from 80 to 150 m Pa s and very particularly preferably from 90 to 139 m Pa s. The threshold voltage ($V_{10}$) in the switching elements according to the invention is preferably from 0.9 V to 2.7 V, particularly preferably from 1.1 V to 2.5 V and very particularly preferably from 1.2 V to 2.0 V. The sum response times for switching between $V_{10}$ and $V_{90}$ and back in the switching elements according to the invention are preferably at most 100 ms, particularly preferably at most 80 ms, very particularly preferably 60 ms or less. For faster applications, the sum response times are 50 ms or less, preferably 45 ms or less, particularly preferably 40 ms or less, especially 40 ms or less and very particularly preferably 30 ms or less.

Furthermore, the preferred parameters of the liquid-crystal mixtures can readily be gathered by the person skilled in the art from the examples shown below. In particular, the preferred ranges for the physical properties of the liquid-crystal mixtures and their combinations are those which are covered by the values in the examples.

The liquid-crystal mixtures particularly preferably essentially consist of compounds selected from the group consisting of the compounds of the formulae I, II, II' and III to XI.

The liquid-crystal media employed in the liquid-crystal switching elements in accordance with the present invention preferably consist of from 3 to 35 compounds, particularly preferably of from 4 to 25, very particularly preferably of from 5 to 20 and especially preferably of from 6 to 15 compounds.

The preferred d/P range is from −0.25 to 0.25. For the lowest possible addressing voltages, a d/P in the range from −0.1 to 0.1, particularly 0, is preferred. For optimum display of grey shades and in order to suppress inverse contrast, d/P values having a figure of from 0.1 to 0.25, particularly from 0.15 to 0.24, are preferred.

In the present application, the following apply, unless expressly stated otherwise:
the physical properties were determined as described in: Merck Liquid Crystals, Physical Properties of Liquid Crystals, Description of the Measurement Methods, Ed. W. Becker, Status Nov. 1997,
all physical data are given for a temperature of 20° C.,
all temperatures are given in ° C. and all temperature differences in differential degrees,
all concentration data are in % by weight,
$\Delta n$ ($\Delta n = n_{\parallel} - n_{\perp}$) relates to 589.3 nm,
$\Delta \epsilon$ ($\Delta \epsilon = \epsilon_{\parallel} - \epsilon_{\perp}$) relates to 1 kHz,
$\gamma_1$: rotational viscosity,
$k_{ii}$: elastic constants,
$\lambda$ is 576 nm,
$V_0$: capacitive threshold or alternatively Freedericks threshold,
$V_{10}$: threshold voltage (for 10% relative contrast, $\Theta = 0°$),
$V_{50}$: mid-grey voltage (for 50% relative contrast, $\Theta = 0°$),
$V_{90}$: saturation voltage (for 90% relative contrast, $\Theta = 0°$),
$\tau_{delay}$: dead time from 0% to 10% change in the relative contrast,
$\tau_{rise}$: rise time from 10% to 90% change in the relative contrast,
$\tau_{on}$: switch-on time from 0% to 90% change in the relative contrast,
$\tau_{off}$: switch-off time from 90% to 10% change in the relative contrast,
$\tau_{sum}$: sum response time=$\tau_{on}+\tau_{off}$,
$\Phi$ and $\Phi'$: observation angle in the display plane,
$\Theta$: observation angle from the display normal, $\phi$: twist angle of the liquid-crystal director between the two substrates,
$\phi$: tilt angle of the liquid-crystal director,
$\phi_0$: tilt angle of the liquid-crystal director at the substrate surface or at the alignment layer,
$\phi_m$: tilt angle of the liquid-crystal director in the centre of the liquid-crystal layer,
$\Psi_{PP}$ (identical with $\Psi_{PA}$): angle between the transmission axes of the polarisers,
$\Psi_{PD}$: angle between the transmission axis of the polariser and the fast axis of the birefringent layer,
$\Psi_{PL}$ and $\Psi_{AL}$: angle between the transmission axis of the polariser or of the analyser and the alignment direction of the liquid-crystal material at the respective adjacent substrate,
the electro-optical properties and response times were determined with rectangular alternating voltage addressing with a frequency of 60 Hz,
the stated voltage values are root mean square (rms) values,
"essentially 0" means, unless stated otherwise, 0+/−1, preferably 0+/−0.1 and particularly preferably 0+/−0.1,
"essentially" in connection with physical properties means, unless stated otherwise, with a deviation of not greater than +/−10%, preferably +/−5% and particularly preferably +/−2% of the respective value,
"essentially consisting of" means, unless stated otherwise, that the proportion of other constituents is not greater than 10%, preferably not greater than 5% and particularly preferably not greater than 2%,
the numerical values given in the present application are, unless stated otherwise, accurate to +/− one unit in the final place given,
limits of the ranges indicated are, unless stated otherwise, inclusive, but preferably exclusive,
>= and <=, >/= and </=, and $\geq$ and $\leq$ in each case mean less than or equal to or greater than or equal to respectively, and
+/− means plus or minus.

The rotational viscosity of the nematic liquid-crystal mixture ZLI-4792 (Merck KGaA) at 20° C. using the calibrated rotational viscometer was 133 mPa·s.

The electro-optical properties were investigated in test cells from Merck KGaA's production:
Layer thickness:
Glass: borosilicate glass with a thickness of 1.1 mm (Pilkington)
ITO: 100 ohm/square inch (i/square inch)
Alignment layer: AL-1054 from Japan Synthetic Rubber, Japan,
Tilt angle: from 1° to 2° (determined using liquid-crystal material ZLI-4792 from Merck KGaA, Germany,
Twist angle: 0° (glass plates subjected to antiparallel rubbing),
d/P: 0 (undoped).

The optical and electro-optical properties of the test cells were measured in commercial instruments from Autronic-Melchers, Karlsruhe, Germany (DMS 301 and DMS 703) and in addition in a home-made instrument from Merck KGaA, in each case using white light. The home-made instrument uses a photomultiplier as detector and a filter for matching the addressing sensitivity of the detector to the sensitivity curve of the human eye.

In the home-made instrument from Merck KGaA, the λ/4 layer was permanently mounted as a platelet in the ray path. In the case of the measurements with the DMS 703, a λ/4 film of liquid-crystalline polymer from Merck Ltd, Great Britain, was used.

In the present application and in particular in the examples, the liquid-crystal compounds are denoted by abbreviations. The coding of the structures is obvious and is carried out in accordance with Tables A and B. All groups $C_nH_{2n+1}$, $C_mH_{2m+1}$ $C_lH_{2l+1}$ and $C_kH_{2k+1}$ are straight-chain alkyl chains having n, m, l and k carbon atoms respectively. The coding in Table B is self-explanatory. Table A shows only the respective skeletons of the structures. The individual compounds are indicated below through specification of the designation of the core followed, separated by a dash, by the designation for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nOF | $OC_nH_{2n+1}$ | F | H | H |
| nCl | $C_nH_{2n+1}$ | Cl | H | H |
| nCl.F | $C_nH_{2n+1}$ | Cl | F | H |
| nCl.F.F | $C_nH_{2n+1}$ | Cl | F | F |
| nF | $C_nH_{2n+1}$ | F | H | H |
| nF.F | $C_nH_{2n+1}$ | F | F | H |
| nF.F.F | $C_nH_{2n+1}$ | F | F | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$.F | $C_nH_{2n+1}$ | OCF$_3$ | F | H |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F | $C_nH_{2n+1}$ | OCHF$_2$ | F | H |
| nOCF$_2$.F.F | $C_nH_{2n+1}$ | OCHF$_2$ | F | F |
| nS | $C_nH_{2n+1}$ | NCS | H | H |
| nVsN | $C_rH_{2r+1}$—CH=CH—$C_sH_{2s}$— | CN | H | H |
| nEsN | $C_rH_{2r+1}$—O—$C_sH_{2s}$— | CN | H | H |
| nAm | $C_nH_{2n+1}$ | COOC$_m$H$_{2m+1}$ | H | H |

TABLE A

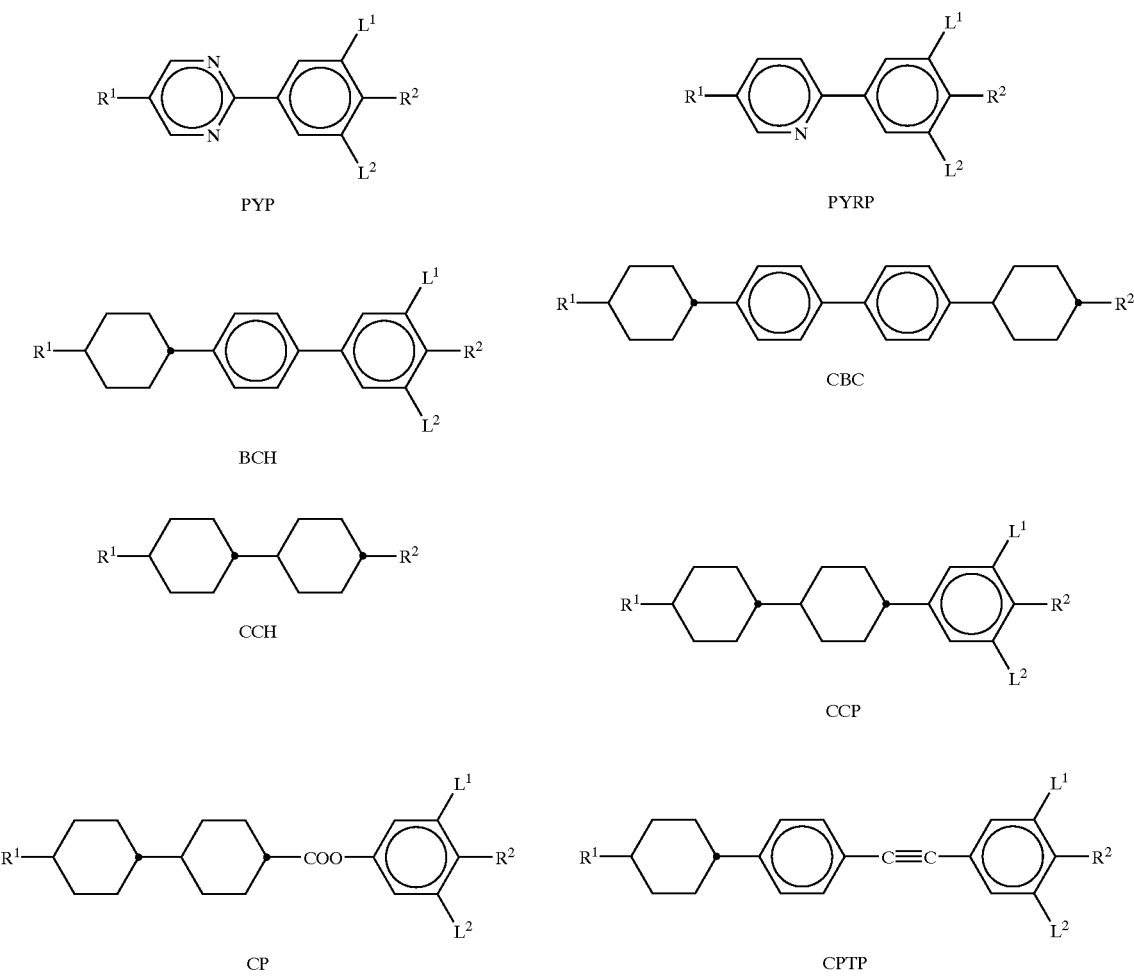

PYP

PYRP

BCH

CBC

CCH

CCP

CP

CPTP

TABLE A-continued
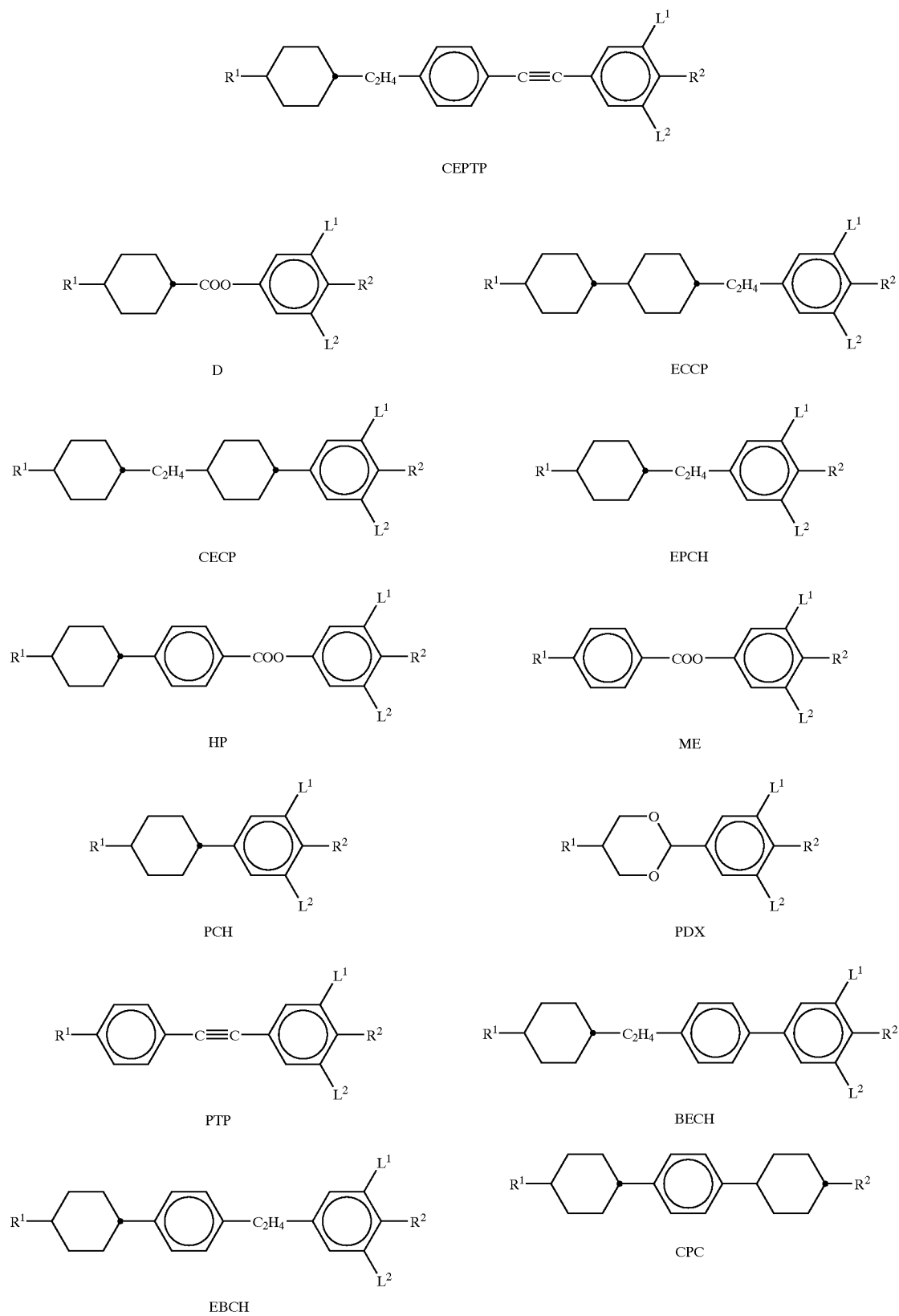

TABLE A-continued
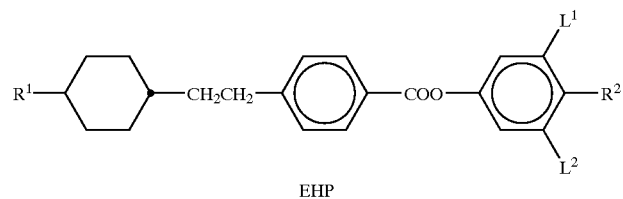
EHP
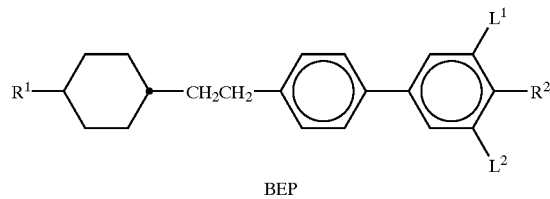
BEP
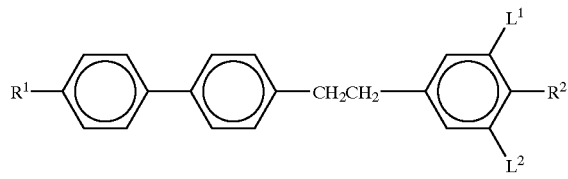
ET
TABLE B
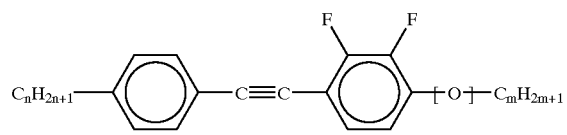
PTP-n(O)mFF
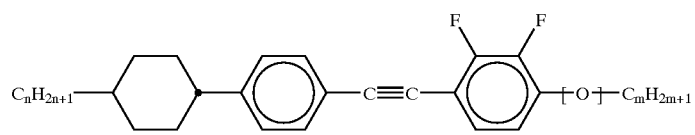
CPTP-n(O)mFF
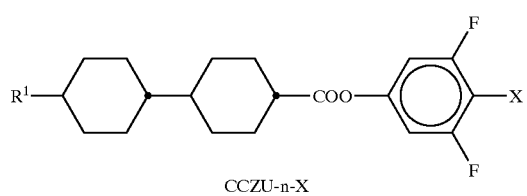
CCZU-n-X
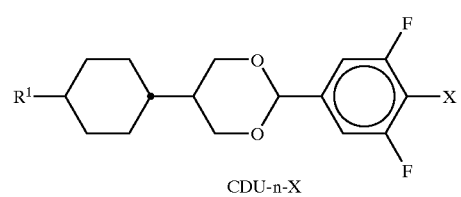
CDU-n-X
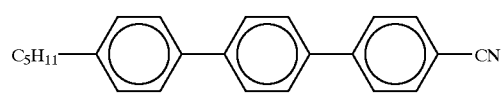
T15
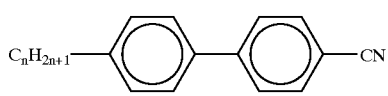
K3n TABLE B-continued
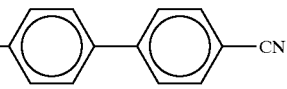
M3n
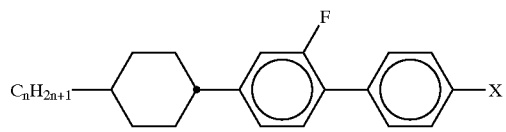
BCH-n.FX
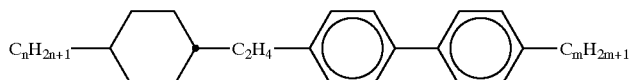
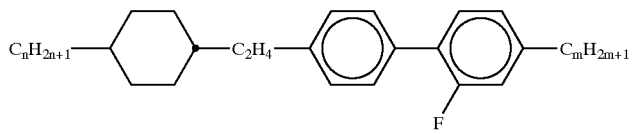
Inm
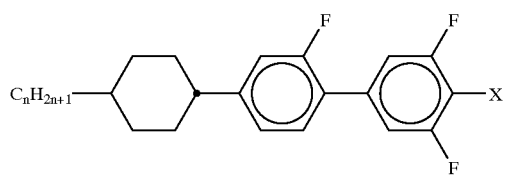
CGU-n-X
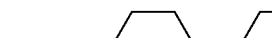
C-nm
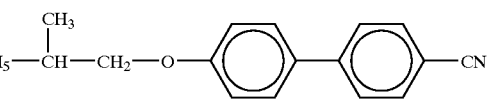
C15
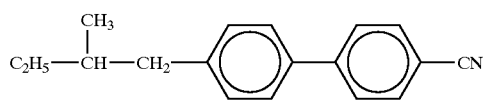
CB15
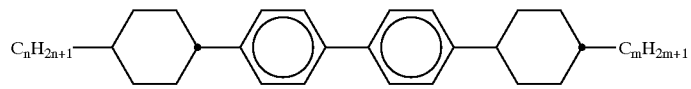
CBC-nm
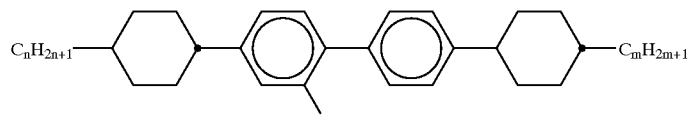
CBC-nmF
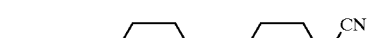
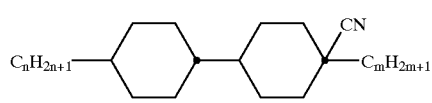
CCN-nm
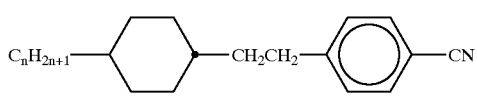
G3n
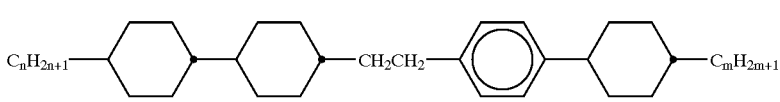
CCEPC-nm TABLE B-continued
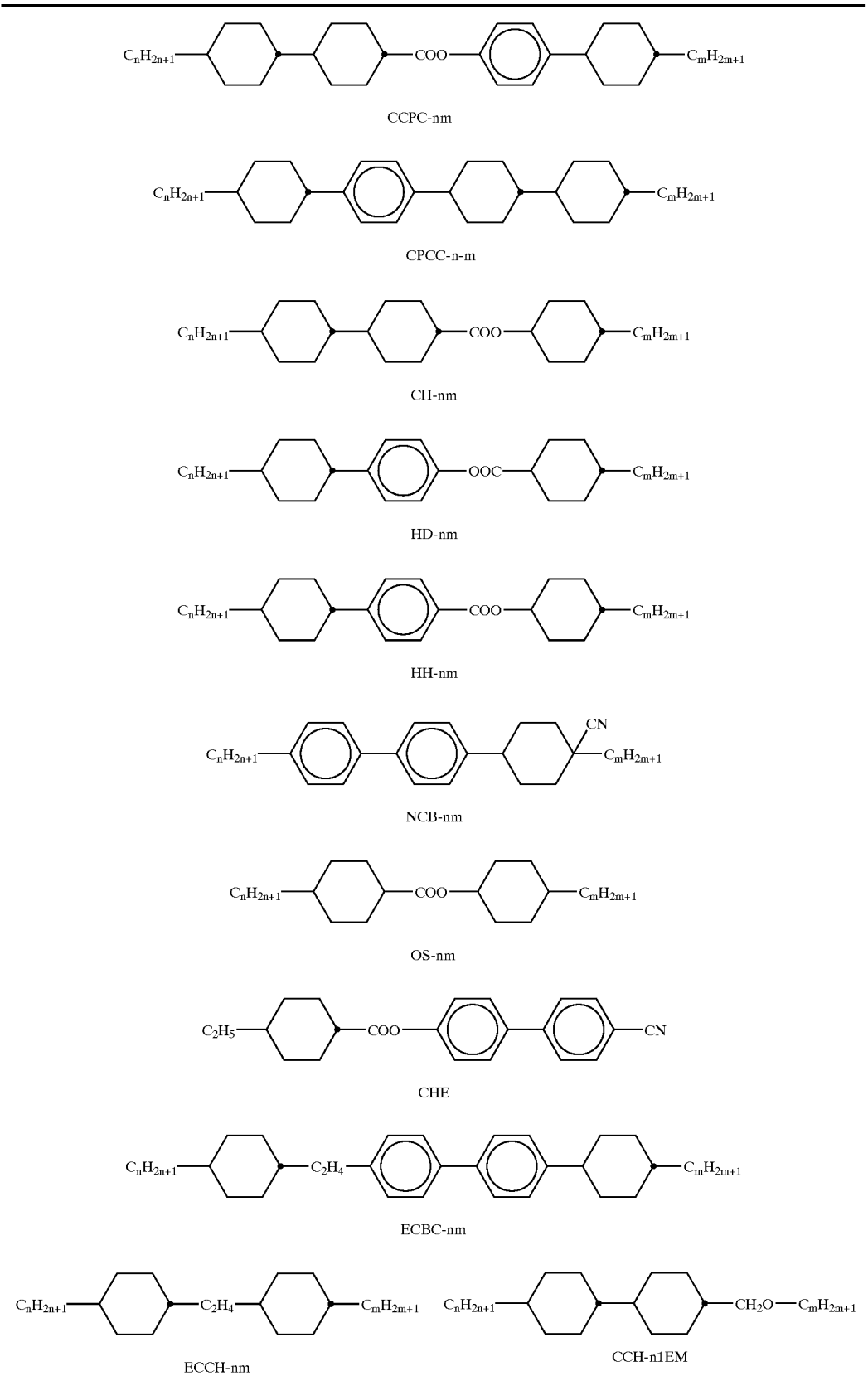

TABLE B-continued
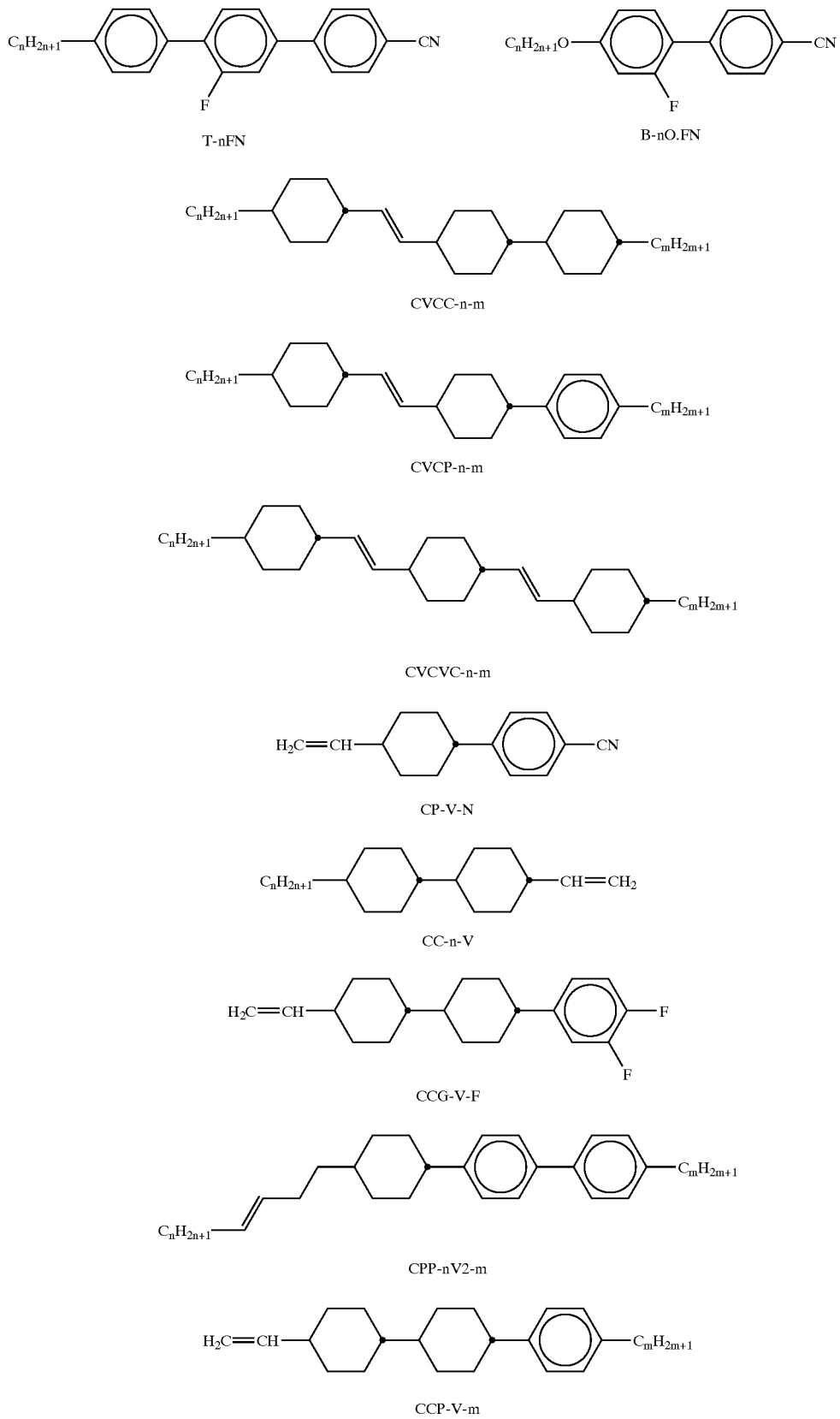

TABLE B-continued
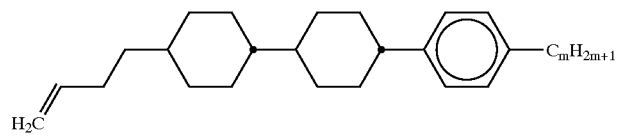
CCP-V2-m
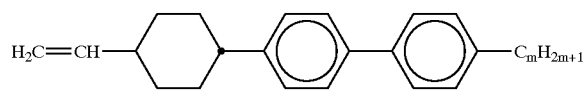
CPP-V-m
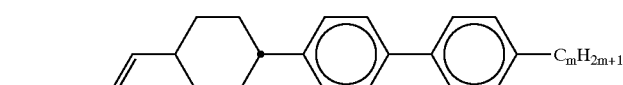
CPP-nV-m
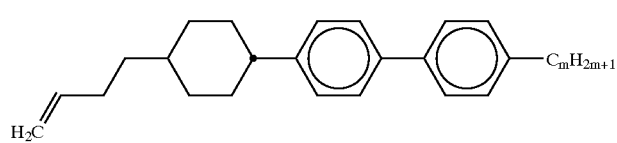
CPP-V2-m
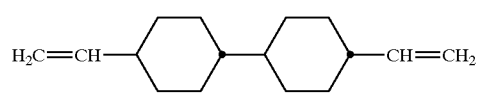
CC-V-V
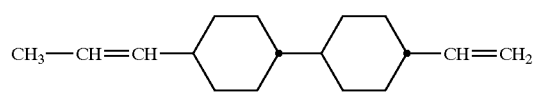
CC-1V-V
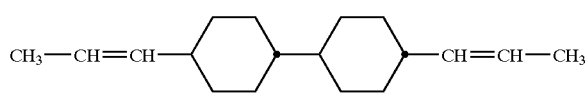
CC-1V-V1
CC-2V-V
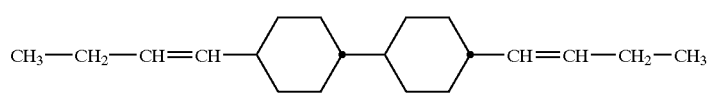
CC-2V-V2
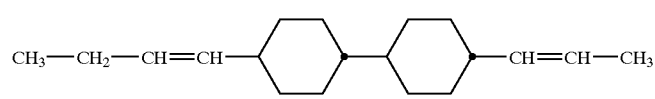
CC-2V-V1

TABLE B-continued
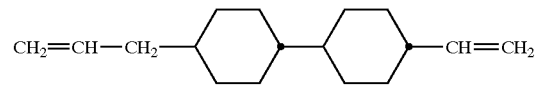
CC-V1-V
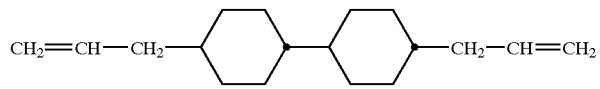
CC-V1-1V
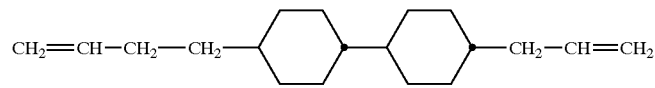
CC-V2-1V
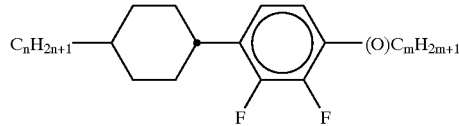
PCH-n(O)mFF
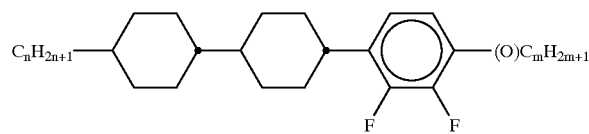
CCP-n(O)mFF
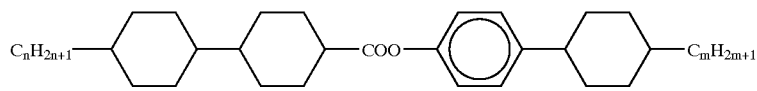
CCPC-nm
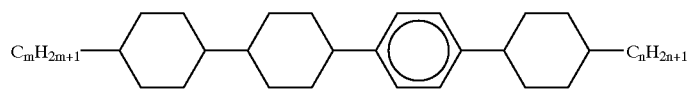
CPCC-n-m,
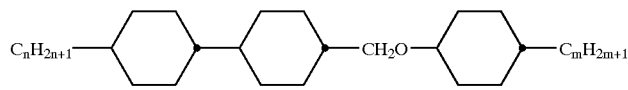
CCOC-n-m
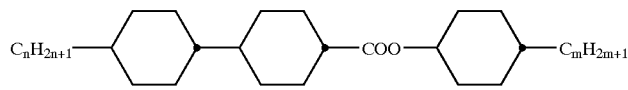
CCPC-nm
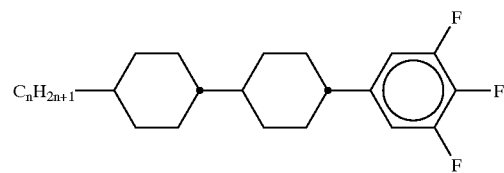
CCP-nF.F.F TABLE B-continued
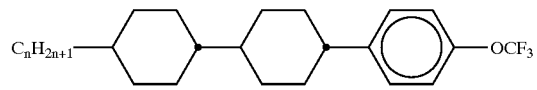
CCP-nOCF3
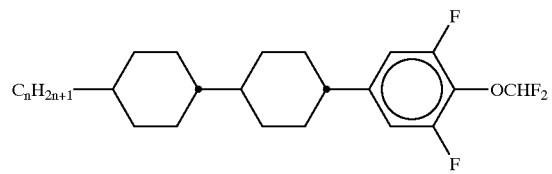
CCP-nOCF2.F.F
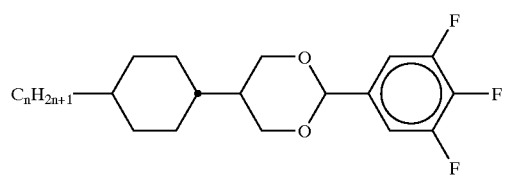
CDU-n-F
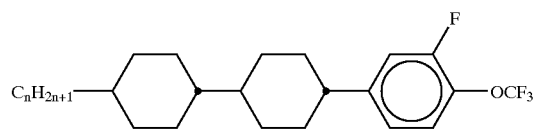
CCP-nOCF3.F
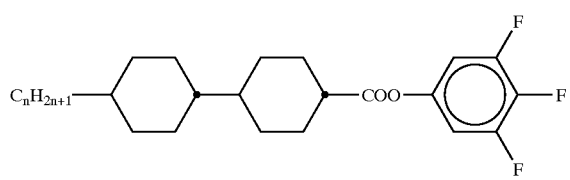
CCZU-n-F
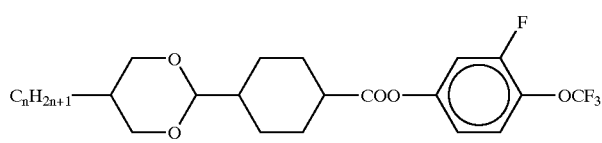
DCZG-n-OT
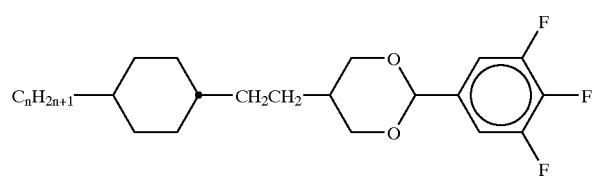
CEDU-n-F
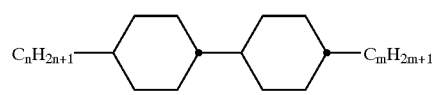
CCH-nm TABLE B-continued
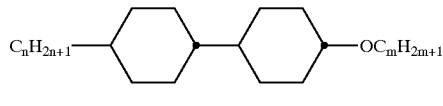
CCH-nOm
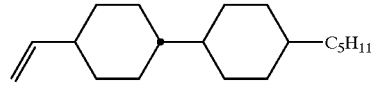
CC-n-V
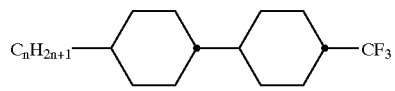
CCH-nCF3
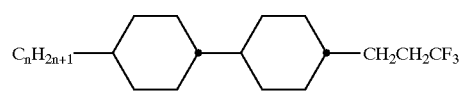
CCH-n2T
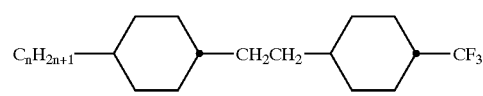
ECCH-nCF3
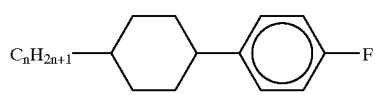
PCH-nF
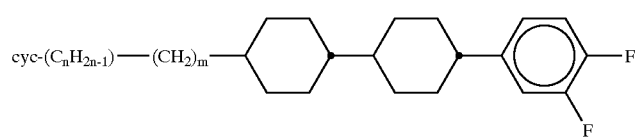
CCG-(c n)m-F
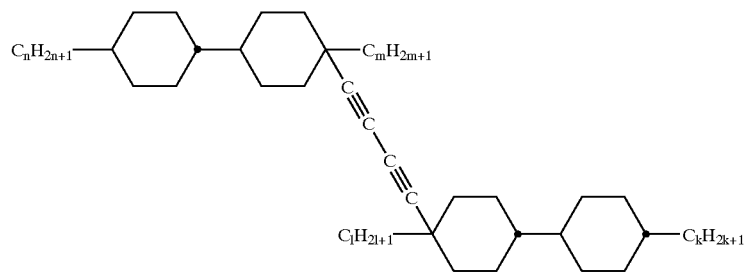
CCTTCC-n-m-l-k TABLE B-continued

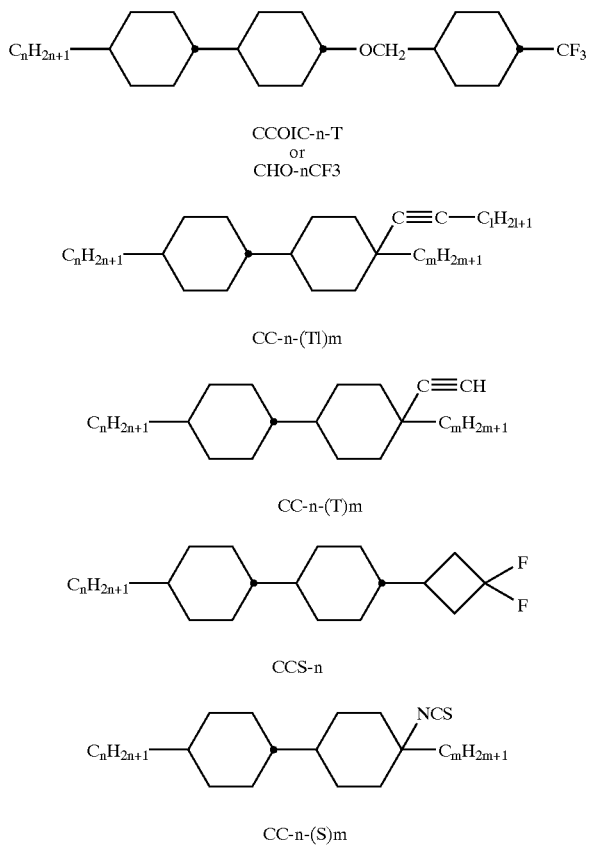

CCOIC-n-T
or
CHO-nCF3

CC-n-(Tl)m

CC-n-(T)m

CCS-n

CC-n-(S)m

The liquid-crystal mixtures of the present invention preferably comprise:
- four or more compounds selected from the group consisting of the compounds from Tables A and B and/or
- five or more compounds selected from the group consisting of the compounds from Table B and/or
- two or more compounds selected from the group consisting of the compounds from Table A.

The effect of the present invention is illustrated below with reference to figures and examples and compared with the prior art.

EXAMPLES

The following examples are intended to explain the present invention without restricting it in any way. However, the descriptive embodiments are preferred and confirm the variation range for the various parameters of the liquid-crystal switching elements and those of the liquid-crystal mixtures and their composition. The person skilled in the art will be able to deduce preferred ranges for these conditions and properties directly from the examples.

Example 1

A liquid-crystal switching element having an antiparallel edge alignment and a polyimide alignment layer, a twist angle of 0° and a surface tilt angle of 1.4° was produced. The switching element contained a λ/4 layer and crossed polarisers, which adopted an angle of 45° to the rubbing direction of the substrates. The construction of the liquid-crystal switching element corresponds to the structure shown in FIG. 1. The optical retardation of the liquid-crystal layer was 0.277 μm. The composition of the liquid-crystal mixture used is indicated in the following table, together with the properties of the mixture as such, and the characteristic voltages in the switching element according to the invention.

| Composition | Conc./% | Properties |
|---|---|---|
| CCH-301 | 5.0 | Transition T (S, N) < −30.0° C. |
| CH-33 | 3.0 | Clearing point T (N, I) = +68.0° C. |
| CH-35 | 3.0 | Δn (589 nm, 20° C.) = +0.0602 |
| CCP-2F.F.F | 6.0 | Δε (1 kHz, 20° C.) = +10.3 |
| CCZU-2-F | 6.0 | $\gamma_1$ (20° C.) = 161 m Pa s |
| CCZU-3-F | 16.0 | d · Δn = 0.277 μm |
| CCZU-5-F | 6.0 | Twist = 0° |
| CDU-2-F | 10.0 | $V_0$ (20° C.) = 0.99 V |
| CDU-3-F | 12.0 | $V_{10}$ (20° C.) = 1.29 V |
| CDU-5-F | 8.0 | $V_{50}$ (20° C.) = 1.76 V |
| CCH-3CF3 | 9.0 | $V_{90}$ (20° C.) = 3.15 V |
| CCH-5CF3 | 12.0 | |
| CCPC-34 | 4.0 | |
| Σ | 100.0 | |

The liquid-crystal switching element was firstly investigated with respect to its transmission on variation of the analyser angle. The result is shown in FIG. 3. The optical retardation was 277 nm.

It can be seen that minimal transmission occurs in the voltage-free state with parallel polarisers, i.e. in each case at angles $\Psi_{PP}$ of 0°, 180° and 360°, and that this minimal transmission drops virtually to 0%. These polarisation settings, which are identical with one another, correspond to the normally black mode. By contrast, with crossed polarisers, i.e. at angles $\Psi_{PP}$ of 90° and 270°, which correspond to the normally white mode, maximum transmission occurs.

The electro-optical characteristic line was then recorded at various observation angles both with the home-made instrument and with the instrument from Autronic-Melchers. The results obtained with the home-made instrument for two cells in normally black mode at two observation angles $\Theta$ ($\Theta$=0° and $\Theta$=30°) in the quadrant having the best contrast ($\Phi$=45°) are shown in FIG. 4 by way of example. The definition of the observation angles $\Theta$ and $\Phi$ is shown in FIG. 2.

FIG. 2 shows the definition of the observation angles in the plane of the display ($\Phi$ and ($\Phi'$) and perpendicular to the normal ($\Theta$).

FIG. 4 shows the resultant transmission voltage characteristic lines for two switching elements. The results for the different cells were so readily reproducible that they are in each case reproduced in a single curve. Two curves are shown. The first curve shows the results for the two different cells for $\Theta$=0°. The second curve applies to $\Theta$=30° and $\Phi$=−45°. It clearly shows the flatter rise in the characteristic line at a greater viewing angle $\Theta$.

The maximum transmission in the fully switched state is about 45%. It is essentially determined by the transmission of the polarisers. At high addressing voltages of from about 6 to 7 V, very high transmission is achieved. The minimum transmission is predominantly dependent on the degree of polarisation of the polarisers used.

The spectral distribution of the transmission for the switching element addressed with various voltages was subsequently determined. The results are shown in FIG. 7. Here, the wavelength dependencies of the transmission of the liquid-crystal switching element according to the invention are shown as continuous curves compared with those of a TN display having a d·$\Delta$n=0.5 µm from Comparative Example 1 (dashed curves). The three sets of curves correspond to the addressing voltages for 10, 50 and 90% relative contrast. It is striking that the spectral distribution in both switching elements is virtually identical, and that the spectrum is virtually colourless. At most a slight drop in the integral transmission can be observed in the element according to the invention compared with the TN switching element.

The transmission of the addressed element in the hemisphere above the element was then measured using the instrument from Autronic-Melchers, as shown in FIG. 8b). FIG. 8b) shows the results of the liquid-crystal switching element according to the invention from the present Example 1 and FIG. 8a) shows those of the conventional TN switching element from Comparative Example 1.

In FIG. 8, the depiction in polar coordinates has been selected (for the definition, see FIG. 2). The transmission is determined for each point in the hemisphere above the liquid-crystal switching element with a fixed addressing voltage which results in a minimum transmission of 10%. Points of equal transmission are denoted by the same grey shade. The isotransmission lines are staggered at separations of 10% absolute in each case. The darkest region corresponds to a transmission of from 0% to 10% inclusive, the next grey region from more than 10% to 20% inclusive, the pale grey region from more than 20% to 30% inclusive, and so on, the lower limit always being exclusive and the upper limit inclusive. The other regions having a transmission of greater than 30% are not shaded in grey.

In direct comparison of FIGS. 8b) and 8a), the significantly lower viewing-angle dependence of the transmission of the switching element according to the invention in FIG. 8b) is clearly evident.

Finally, isocontrast measurements were carried out on liquid cells in accordance with the present invention and on comparative cells using the instrument from Autronic-Melchers. In these measurements, the two addressing voltages used were the threshold voltage ($V_{10}$) and the saturation voltage ($V_{90}$) of the respective cell. The results are shown in FIG. 9.

The two addressing voltages were 1.13 V and 2.64 V for the cell of the present example. The result is shown in FIG. 9a). The individual curves stand from the inside outward successively for contrast ratios of 7, 5, 3, 2 and 1. The maximum contrast ratio here was 9.6, and the minimum contrast ratio 0.58. The viewing-angle dependence of the contrast ratio (CR) over the entire viewing-angle range is thus very low. Only moderate inverse contrast occurs, with $CR_{min}$=0.58, with inverse contrast being denoted as contrast ratios of less than 1.

FIG. 9c) shows for direct comparison the results for the TN switching element of Comparative Example 1. The individual curves stand from the inside outward successively for contrast ratios of 10, 7, 5, 3, 2 and 1. Significant inverse contrast occurs here.

Furthermore, response times for various switching voltages were determined. Illustrative results are listed in Table 4. In particular in comparison with the results for the TN switching element of Comparative Example 1, the surprisingly short response times of the switching elements according to the invention are notable. The response times were determined from three different addressing conditions. In the first two series, the response times were determined from a change from a voltage of 0 volts to a fixed value and back. In the first series, the voltage of the switched-on state was 9.9 volts and in the second series it was 5.0 volts. In the third series, switching was carried out from $V_{10}$ to $V_{90}$ and back. This corresponds to the switching of a display between two grey shades. The results are shown in the following table (Table 4).

TABLE 4

Response times

| No. | Example No. | $V_{off}$/ V | $V_{on}$/ V | $\tau_{delay}$/ ms | $\tau_{rise}$/ ms | $\tau_{on}$/ ms | $\tau_{off}$/ ms | $\tau_{sum}$/ ms |
|---|---|---|---|---|---|---|---|---|
| 1 | CE 1 | 0 | 9.9 | 2.60 | 0.78 | 3.39 | 52.3 | 55.7 |
| 2 | 1 | 0 | 9.9 | 1.43 | 0.78 | 2.23 | 25.2 | 27.4 |
| 3 | CE 1 | 0 | 5.0 |  |  | 9.6 | 52.3 | 56.5 |
| 4 | 1 | 0 | 5.0 |  |  | 9.6 | 24.8 | 28.1 |
| 5 | CE 1 | 1.11 | 1.73 | 3.39 | 34.4 | 37.8 | 83.6 | 121.4 |
| 6 | 1 | 1.26 | 3.07 | 0.65 | 8.98 | 9.64 | 32.8 | 42.4 |

Comparative Example 1

A liquid-crystal switching element was produced and investigated analogously to Example 1, but now a TN switching element having an optical retardation of 0.50 µm, without a further birefringent layer, with crossed polarisers, which were also crossed to the rubbing directions.

The composition of the liquid-crystal mixture used is shown in the following table, as are the properties of the mixture and the characteristic voltages of the TN element.

| Composition | Conc./% | Properties |
|---|---|---|
| BCH-2F.F | 9.0 | Clearing point T (N, I) = +69.5° C. |
| BCH-3F.F | 9.0 | $\Delta n$ (589 nm, 20° C.) = +0.1039 |
| BCH-3F.F.F | 5.0 | $\Delta \epsilon$ (1 kHz, 20° C.) = +10.2 |
| BCH-5F.F.F | 7.0 | $\gamma_1$ (20° C.) = 156 m Pa s |
| CGU-2-F | 10.0 | $d \cdot \Delta n$ = 0.50 µm |
| CGU-3-F | 9.0 | Twist = 90° |
| CCP-3F.F.F | 10.0 | $V_0$ (20° C.) = 0.94 V |
| CCP-5F.F.F | 6.0 | $V_{10}$ (20° C.) = 1.08 V |
| CCZU-2-F | 4.0 | $V_{50}$ (20° C.) = 1.35 V |
| CCZU-3-F | 13.0 | $V_{90}$ (20° C.) = 1.72 V |
| CCG-V-F | 15.0 | |
| BCH-32 | 3.0 | |
| Σ | 100.0 | |

The electro-optical characteristic line of the TN switching element is shown in FIG. 5. Cells were investigated at Θ=0°. The results were identical. Compared with FIG. 4, FIG. 5 shows that the characteristic lines of the TN switching element having d·Δn of 0.5 µm (corresponding to the 1st Gooch and Tarry minimum) of this Comparative Example 1 are significantly steeper and thus less favourable for the display of grey shades than those of the liquid-crystal switching element according to the invention from Example 1.

It should be noted here that both in normally white mode and in normally black mode, the reduction in the steepness of the characteristic line of the switching elements according to the invention is most pronounced at high voltages, in contrast to the prior art. Since the human eye reacts more sensitively to changes in transmission in the region of low transmission (i.e. lower brightness) than in the region of high transmission (i.e. greater brightness), the effect is more favourable in normally white mode than in normally black mode since it occurs in the region of lower transmission in normally white mode.

The spectral distribution of the transmission is compared in FIG. 7 directly with that of the element from Example 1 and has already been discussed in Example 1.

FIG. 8a) shows the isotransmission results for this Comparative Example 1, which were obtained under the same conditions as the results for Example 1. The results have already been discussed in Example 1.

FIG. 9c) shows the isocontrast results obtained under the same conditions as in Example 1. The two addressing voltages were 1.07 V and 1.71 V, corresponding to $V_{10}$ and $V_{90}$ respectively. The individual curves stand from the inside outward successively for contrast ratios of 10, 7, 5, 3, 2 and 1. The maximum contrast ratio was 15, and the minimum contrast ratio was 0.43. The viewing-angle dependence of the contrast is thus obviously much more pronounced than in the case of the switching elements from Examples 1 and 2. In addition, significant inverse contrast occurs. The apparently greater maximum contrast ratio compared with Examples 1 and 2 is presumably attributable to the measurement conditions. In separate measurements of the transmission with vertical observation and with addressing with sufficiently high voltages, the same contrast was determined for all three types of switching element.

The response times are also shown in Table 4. As is clearly evident from Table 4, the sum response time of the switching element according to the invention is virtually halved under each of the three addressing conditions compared with that of the conventional TN switching element. This is all the more surprising since both switching elements have the same layer thickness (in each case 4.8 µm). Even the rotational viscosities cannot explain the observed change in the response times. The rotational viscosity of the liquid-crystal mixture from Example 1 is virtually exactly as large as that of the liquid-crystal mixture of Comparative Example 1. It is even about 3% greater, from which a corresponding small increase in the response times for the switching element according to the invention would rather have been expected.

Example 2

A switching element like that of Example 1 was produced, with the construction apart from one exception. No λ/4 layer was used.

The switching element had virtually the same electro-optical characteristic lines at an observation angle of 0° as that of Example 1, both in the home-made instrument and in the instrument from Autronic-Melchers. The maximum contrast was also virtually identical with that of Example 1.

The viewing-angle dependency of the contrast was excellent on visual assessment. This was confirmed by measurement of the isocontrast curves under the same conditions as in Example 1. As in Example 1, the two addressing voltages were 1.13 V and 2.64 V. The result is shown in FIG. 9b). The individual curves stand from the inside outward successively for the same contrast ratios as in FIG. 9a), with merely the last curve being omitted, i.e. for 7, 5, 3 and 2. The maximum contrast ratio here was 10.0, and the minimum 1.08. Thus, absolutely no inverse contrast at all occurred under these conditions.

The direct comparison between the values for the switching elements of Examples 1 and 2 gives the following. Based on the observation angle Θ, Example 2 clearly has the broader, i.e. better, viewing-angle range. The element of Example 2 is also slightly superior to that of Example 1 with respect to integral observation. By contrast, the viewing-angle range of the element from Example 1 is therefore significantly better with respect to the observation angle Φ). This is particularly evident in the region of the quadrant having the lowest contrast. The viewing-angle range of the switching element from Example 1 is significantly more centrosymmetrical.

Example 3

A switching element was produced as in Example 1 with a λ/4 plate. However, the liquid-crystal material used here was ZLI-4792, a commercial product from Merck KGaA. This material has a birefringence of 0.0969. The layer thickness of the liquid-crystal layer was 5.1 µm. The electro-optical characteristic line for a normally black switching element (having parallel polarisers) was determined at an observation angle of Φ=45° and Θ=10°, as described in Example 1. The result is shown in FIG. 6.

In this FIG. 6, the characteristic line of a TN switching element having d·Δn of 0.50 µm and of a switching element according to the invention, both with virtually the same capacitive threshold, also known as the Freedericks threshold, are shown in comparison. The curves were obtained at observation angles of Θ=100, Φ=45°. In direct comparison with this liquid-crystal switching element from the prior art, it is striking that the switching element according to the invention has both significantly lower steepness than the comparable TN switching element and also exhibits absolutely no signs of inverse contrast, with virtually unchanged maximum transmission. The switching element according to the invention is consequently significantly more suitable for the display of grey shades and in particular of colour shades.

Comparative Example 2

A switching element was produced analogously to Example 3 using ZLI-4792, but this time a TN switching element at the first transmission minimum (optical retardation 0.50 μm) was produced as in Comparative Example 1. As in Example 3, the electro-optical characteristic line was determined at an observation angle of Φ=45° and Θ=10°. The result is shown in FIG. 6 for comparison with that from Example 3.

The occurrence of inverse contrast, i.e. the reversal of the slope of the electro-optical characteristic line with increasing voltage, is clearly evident in the curve for the TN switching element from a voltage of about 2.4 volts. By contrast, the characteristic line of the switching element according to the invention is significantly flatter, i.e. has a smaller slope (also known as steepness), which is more suitable for the display of grey shades. In addition, absolutely no inverse contrast at all occurs at this viewing angle in the switching element according to the invention.

FIG. 6 shows the characteristic line of the liquid-crystal switching element according to the invention with that of the TN switching element from Comparative Example 1. Both switching elements have virtually the same capacitive threshold, also known as the Freedericks threshold. The curves were obtained at observation angles of Θ=10° and Φ=−45°. In direct comparison with this liquid-crystal switching element from the prior art, it is striking that the switching element according to the invention has both significantly lower steepness than the comparable TN switching element and also exhibits absolutely no signs of inverse contrast, with virtually unchanged maximum transmission. The switching element according to the invention is consequently significantly more suitable for the display of grey shades and in particular of colour shades.

Further examples (No. 4 to 63) of switching elements and liquid-crystal mixtures according to the invention are given in abbreviated form below. For simplification, only the characteristic voltages $V_{10}$, $V_{50}$ and $V_{90}$, which were determined from the electro-optical characteristic lines for normally white switching elements according to Example 1, as described therein, are shown for the switching elements.

Example 4

| Composition | Conc./% | Properties |
|---|---|---|
| CC-5-V | 14.0 | Transition T (S, N) < −40.0° C. |
| CCH-303 | 3.0 | Clearing point T (N, I) = +76.0° C. |
| CCH-501 | 5.0 | Δn (559 nm, 20° C.) = +0.0597 |
| CCP-2F.F.F | 10.0 | Δε (1 kHz, 20° C.) = +5.5 |
| CCP-3F.F.F | 12.0 | $\gamma_1$ (20° C.) [m Pa s] |
| CCP-5F.F.F | 4.0 | $V_{10}$ (20° C.) = 1.80 V |
| CCZU-2-F | 5.0 | $V_{50}$ (20° C.) = 2.48 V |
| CCZU-3-F | 16.0 | $V_{90}$ (20° C.) = 4.44 V |
| CCZU-5-F | 5.0 | |
| CCH-301 | 18.0 | |
| CH-33 | 2.0 | |
| CH-35 | 3.0 | |
| CH-45 | 3.0 | |
| Σ | 100.0 | |

Example 5

| Composition | Conc./% | Properties |
|---|---|---|
| CC-5-V | 6.0 | Transition T (S, N) < −40.0° C. |
| CCH-34 | 5.0 | Clearing point T (N, I) = +75.0° C. |
| CCH-501 | 6.0 | Δn (589 nm, 20° C.) = +0.0604 |
| CCP-2F.F.F | 12.0 | Δε (1 kHz, 20° C.) = +6.4 |
| CCP-3F.F.F | 12.0 | $V_{10}$ (20° C.) = 1.60 V |
| CCP-5F.F.F | 5.0 | $V_{50}$ (20° C.) = 2.23 V |
| CCZU-2-F | 6.0 | $V_{90}$ (20° C.) = 3.95 V |
| CCZU-3-F | 20.0 | |
| CCZU-5-F | 5.0 | |
| CCH-301 | 18.0 | |
| CH-35 | 2.0 | |
| CH-45 | 3.0 | |
| Σ | 100.0 | |

Example 6

| Composition | Conc./% | Properties |
|---|---|---|
| CCH-3CF3 | 8.0 | Transition T (S, N) < −40.0° C. |
| CCH-5CF3 | 12.0 | Clearing point T (N, I) = +70.5° C. |
| CC-5-V | 5.0 | Δn (589 nm, 20° C.) = +0.0578 |
| CCH-303 | 5.0 | Δε (1 kHz, 20° C.) = +6.5 |
| CCH-501 | 12.9 | $\gamma_1$ (20° C.) = 129 m Pa s |
| CCP-2F.F.F | 12.0 | $V_{10}$ (20° C.) = 1.72 |
| CCP-3F.F.F | 6.0 | $V_{50}$ (20° C.) = 2.34 V |
| CCZU-2-F. | 6.0 | $V_{90}$ (20° C.) = 4.13 V |
| CCZU-3-F | 19.0 | |
| CCZU-5-F | 6.0 | |
| CH-33 | 3.0 | |
| CH-35 | 3.0 | |
| CCPC-34 | 3.0 | |
| Σ | 100.0 | |

Example 7

| Composition | Conc./% | Properties |
|---|---|---|
| CC-5-(S)3 | 10.0 | Transition T (S, N) < −40.0° C. |
| CCH-301 | 6.0 | Clearing point T (N, I) = +70.5° C. |
| CCH-303 | 5.0 | Δn (589 nm, 20° C.) = +0.0568 |
| CCH-501 | 14.0 | Δε (1 kHz, 20° C.) = +5.8 |
| CCP-2F.F.F | 12.0 | $\gamma_1$ (20° C.) = 142 m Pa s |
| CCP-3F.F.F | 12.0 | $V_{10}$ (20° C.) = 1.64 V |
| CCZU-2-F | 6.0 | $V_{50}$ (20° C.) = 2.23 V |
| CCZU-3-F | 22.0 | $V_{90}$ (20° C.) = 3.98 V |
| CCZU-5-F | 6.0 | |
| CH-33 | 3.0 | |
| CCPC-34 | 4.0 | |
| Σ | 100.0 | |

Example 8

| Composition | Conc./% | Properties |
|---|---|---|
| CC-5-V | 14.0 | Clearing point T (N, I) = +76.0° C. |
| CCH-301 | 18.0 | Δn (589 nm, 20° C.) = +0.0608 |
| CCH-303 | 3.0 | Δε (1 kHz, 20° C.) = +5.5 |
| CCH-501 | 5.0 | $V_{10}$ (20° C.) = 1.77 V |

-continued

| Composition | Conc./% | Properties |
|---|---|---|
| CCP-2F.F.F | 10.0 | $V_{90}$ (20° C.) = 4.28 V |
| CCP-3F.F.F | 12.0 | |
| CCP-5F.F.F | 4.0 | |
| CCZU-2-F | 5.0 | |
| CCZU-3-F | 16.0 | |
| CCZU-5-F | 5.0 | |
| CH-33 | 2.0 | |
| CH-35 | 3.0 | |
| CH-45 | 3.0 | |
| Σ | 100.0 | |

Example 9

| Composition | Conc./% | Properties |
|---|---|---|
| CC-5-V | 6.0 | Clearing point T (N, I) = +75.5° C. |
| CCH-301 | 18.0 | Δn (559 nm, 20° C.) = +0.0596 |
| CCH-34 | 5.0 | Δε (1 kHz, 20° C.) = +6.4 |
| CCH-501 | 6.0 | $V_{10}$ (20° C.) = 1.63 V |
| CCP-2F.F.F | 12.0 | $V_{90}$ (20° C.) = 3.91 V |
| CCP-3F.F.F | 12.0 | |
| CCP-5F.F.F | 5.0 | |
| CCZU-2-F | 6.0 | |
| CCZU-3-F | 20.0 | |
| CCZU-5-F | 5.0 | |
| CH-35 | 2.0 | |
| CH-45 | 3.0 | |
| Σ | 100.0 | |

Example 10

| Composition | Conc./% | Properties |
|---|---|---|
| CCH-501 | 12.0 | Transition T (S, N) < −40.0° C. |
| CH-33 | 4.0 | Clearing point T (N, I) = +81.0° C. |
| CH-35 | 4.0 | Δn (589 nm, 20° C.) = +0.0610 |
| CH-43 | 4.0 | Δε (1 kHz, 20° C.) = +8.9 |
| CCP-2F.F.F | 9.0 | $γ_1$ (20° C.) = 154 m Pa s |
| CCZU-2-F | 6.0 | $V_{10}$ (20° C.) = 1.49 V |
| CCZU-3-F | 16.0 | $V_{90}$ (20° C.) = 3.55 V |
| CCZU-5-F | 6.0 | |
| CDU-2-F | 9.0 | |
| CDU-3-F | 11.0 | |
| CCH-3CF3 | 7.0 | |
| CCH-5CF3 | 8.0 | |
| CCPC-34 | 4.0 | |
| Σ | 100.0 | |

Example 11

| Composition | Conc./% | Properties |
|---|---|---|
| ECCH-5CF3 | 20.0 | Clearing point T (N, I) = +74.0° C. |
| CC-5-V | 5.0 | Δn (589 nm, 20° C.) = +0.0585 |
| CCH-303 | 5.0 | Δε (1 kHz, 20° C.) = +6.5 |
| CCH-501 | 12.0 | $γ_1$ (20° C.) = 141 m Pa s |
| CCP-2F.F.F | 12.0 | $V_{10}$ (20° C.) = 1.79 V |
| CCP-3F.F.F | 6.0 | $V_{90}$ (20° C.) = 4.27 V |
| CCZU-2-F | 6.0 | |
| CCZU-3-F | 19.0 | |
| CCZU-5-F | 6.0 | |

-continued

| Composition | Conc./% | Properties |
|---|---|---|
| CH-33 | 3.0 | |
| CH-35 | 3.0 | |
| CCPC-34 | 3.0 | |
| Σ | 100.0 | |

Example 12

| Composition | Conc./% | Properties |
|---|---|---|
| CC-5-V | 10.0 | Transition T (S, N) < −40.0° C. |
| CCP-20CF3 | 6.0 | Clearing point T (N, I) = +77.0° C. |
| CCP-40CF3 | 4.0 | Δn (589 nm, 20° C.) = +0.0608 |
| CCP-2F.F.F | 11.0 | Δε (1 kHz, 20° C.) = +5.4 |
| CCP-3F.F.F | 11.0 | $V_{10}$ (20° C.) = 1.91 V |
| CCP-5F.F.F | 6.0 | $V_{90}$ (20° C.) = 4.66 V |
| CCP-20CF3.F | 9.0 | |
| CCZU-2-F | 5.0 | |
| CZU-3-F | 10.0 | |
| CCPC-34 | 3.0 | |
| CC-5-(T)5 | 15.0 | |
| CC-5-(T1)5 | 10.0 | |
| Σ | 100.0 | |

Example 13

| Composition | Conc./% | Properties |
|---|---|---|
| CCH-501 | 12.0 | Transition T (S, N) < −40.0° C. |
| CH-33 | 3.0 | Clearing point T (N, I) = +81.5° C. |
| CH-35 | 3.0 | Δn (589 nm, 20° C.) = +0.0604 |
| CH-43 | 3.0 | Δε (1 kHz, 20° C.) = +8.4 |
| CH-45 | 3.0 | $γ_1$ (20° C.) = 160 m Pa s |
| CCP-2F.F.F | 9.0 | $V_0$ (20° C.) = 1.22 V |
| CCZU-2-F | 6.0 | $V_{10}$ (20° C.) = 1.51 V |
| CZU-3-F | 15.0 | $V_{50}$ (20° C.) = 2.03 V |
| CZU-5-F | 6.0 | $V_{90}$ (20° C.) = 3.59 V |
| CDU-2-F | 9.0 | |
| CDU-3-F | 9.0 | |
| CDU-5-F | 3.0 | |
| CCH-3CF3 | 7.0 | |
| CCH-5CF3 | 8.0 | |
| CCPC-34 | 4.0 | |
| Σ | 100.0 | |

Example 14

| Composition | Conc./% | Properties |
|---|---|---|
| CCH-301 | 17.0 | Transition T (S, N) < −40.0° C. |
| CCH-501 | 14.0 | Clearing point T (N, I) = +81.0° C. |
| CCH-34 | 4.0 | Δn (589 nm, 20° C.) = +0.0598 |
| CH-33 | 3.0 | Δε (1 kHz, 20° C.) = +7.1 |
| CH-35 | 3.0 | $V_{10}$ (20° C.) = 1.65 V |
| CH-43 | 3.0 | $V_{90}$ (20° C.) = 3.96 V |
| CCPC-34 | 4.0 | |
| CCZU-2-F | 4.0 | |
| CCZU-3-F | 17.0 | |
| CCZU-5-F | 5.0 | |
| CDU-2-F | 9.0 | |
| CDU-3-F | 9.0 | |
| CDU-5-F | 8.0 | |
| Σ | 100.0 | |

Example 15

| Composition | Conc./% | Properties |
|---|---|---|
| CCH-301 | 14.0 | Transition T (S, N) < −40.0° C. |
| CCH-34 | 4.0 | Clearing point T (N, I) = +78.0° C. |
| CC-5-V | 5.0 | Δn (559 nm, 20° C.) = +0.0601 |
| CCP-2F.F.F | 10.0 | Δε (1 kHz, 20° C.) = +6.6 |
| CCP-3F.F.F | 12.0 | $V_{10}$ (20° C.) = 1.72 V |
| CCP-5F.F.F | 6.0 | $V_{90}$ (20° C.) = 4.17 V |
| CCZU-2-F | 5.0 | |
| CCZU-3-F | 16.0 | |
| CCZU-5-F | 5.0 | |
| CCP-20CF3.F | 2.0 | |
| CCH-3CF3 | 10.0 | |
| CH-33 | 3.0 | |
| CH-35 | 3.0 | |
| CH-43 | 3.0 | |
| CH-45 | 2.0 | |
| Σ | 100.0 | |

Example 16

| Composition | Conc./% | Properties |
|---|---|---|
| CCH-301 | 16.0 | Transition T (S, N) < −40.0° C. |
| CCH-501 | 16.0 | Clearing point T (N, I) = +95.5° C. |
| CCH-35 | 3.0 | Δn (589 nm, 20° C.) = +0.0608 |
| CCH-5CF3 | 5.0 | Δε (1 kHz, 20° C.) = +4.5 |
| CCP-2F.F.F | 10.0 | $V_{10}$ (20° C.) = 2.26 V |
| CCP-3F.F.F | 8.0 | $V_{90}$ (20° C.) = 5.41 V |
| CCZU-2-F | 4.0 | |
| CCZU-3-F | 13.0 | |
| CCZU-5-F | 4.0 | |
| CCPC-33 | 3.0 | |
| CCPC-34 | 4.0 | |
| CCPC-35 | 4.0 | |
| CCOC-3-3 | 3.0 | |
| CCOC-4-3 | 5.0 | |
| CCOC-3-5 | 2.0 | |
| Σ | 100.0 | |

Example 17

| Composition | Conc./% | Properties |
|---|---|---|
| CCH-301 | 14.0 | Clearing point T (N, I) = +71.0° C. |
| CCH-303 | 18.0 | Δn (589 nm, 20° C.) = +0.0593 |
| CCH-501 | 4.0 | Δε (1 kHz, 20° C.) = +4.0 |
| CCH-34 | 6.0 | |
| CCH-35 | 6.0 | |
| CCP-20CF3 | 5.0 | |
| CCP-40CF3 | 5.0 | |
| CCP-50CF3 | 7.0 | |
| CCP-2F.F.F | 12.0 | |
| CCP-3F.F.F | 15.0 | |
| CCP-5F.F.F | 8.0 | |
| Σ | 100.0 | |

Example 18

| Composition | Conc./% | Properties |
|---|---|---|
| CC-5-V | 14.0 | Transition T (S, N) < −40.0° C. |
| CCH-303 | 3.0 | Clearing point T (N, I) = +76.0° C. |
| CCH-501 | 5.0 | Δn (589 nm, 20° C.) = +0.0597 |
| CCP-2F.F.F | 10.0 | Δε (1 kHz, 20° C.) = +5.5 |
| CCP-3F.F.F | 12.0 | $V_{10}$ (20° C.) = 1.80 V |
| CCP-5F.F.F | 4.0 | $V_{90}$ (20° C.) = 4.44 V |
| CCZU-2-F | 5.0 | |
| CCZU-3-F | 16.0 | |
| CCZU-5-F | 5.0 | |
| CCH-301 | 18.0 | |
| CH-33 | 2.0 | |
| CH-35 | 3.0 | |
| CH-45 | 3.0 | |
| Σ | 100.0 | |

Example 19

| Composition | Conc./% | Properties |
|---|---|---|
| CC-5-V | 6.0 | Transition T (S, N) < −40.0° C. |
| CCH-34 | 5.0 | Clearing point T (N, I) = +75.0° C. |
| CCH-501 | 6.0 | Δn (589 nm, 20° C.) = +0.0604 |
| CCP-2F.F.F | 12.0 | Δε (1 kHz, 20° C.) = +6.4 |
| CCP-3F.F.F | 12.0 | $V_{10}$ (20° C.) = 1.60 V |
| CCP-5F.F.F | 5.0 | $V_{90}$ (20° C.) = 3.94 V |
| CCZU-2-F | 6.0 | |
| CCZU-3-F | 20.0 | |
| CCZU-5-F | 5.0 | |
| CCH-301 | 18.0 | |
| CH-35 | 2.0 | |
| CH-45 | 3.0 | |
| Σ | 100.0 | |

Example 20

| Composition | Conc./% | Properties |
|---|---|---|
| CC-5-V | 4.0 | Clearing point T (N, I) = +70.0° C. |
| CCH-34 | 5.0 | Δn (589 nm, 20° C.) = +0.0601 |
| CCH-501 | 7.0 | Δε (1 kHz, 20° C.) = +6.6 |
| CCP-2F.F.F | 11.0 | $V_{10}$ (20° C.) = 1.57 V |
| CCP-3F.F.F | 12.0 | $V_{90}$ (20° C.) = 3.89 V |
| CCP-5F.F.F | 5.0 | |
| CCZU-2-F | 6.0 | |
| CCZU-3-F | 20.0 | |
| CCZU-5-F | 6.0 | |
| CCH-301 | 20.0 | |
| CH-35 | 2.0 | |
| CCP-20CF2.F.F | 2.0 | |
| Σ | 100.0 | |

Example 21

| Composition | Conc./% | Properties |
|---|---|---|
| CCH-301 | 23.0 | Clearing point T (N, I) = +70.0° C. |
| CCH-303 | 3.0 | Δn (589 nm, 20° C.) = +0.0610 |
| CCH-501 | 4.0 | Δε (1 kHz, 20° C.) = +4.1 |
| CCP-30CF3 | 3.0 | $V_{10}$ (20° C.) = 2.10 V |
| CCP-40CF3 | 3.0 | $V_{90}$ (20° C.) = 5.05 V |
| CCP-50CF3 | 3.0 | |
| CCP-2F.F.F | 5.0 | |
| CCP-3F.F.F | 10.0 | |

| Composition | Conc./% | Properties |
|---|---|---|
| CCP-5F.F.F | 8.0 | |
| CC-5-V | 16.0 | |
| CCP-30CF3.F | 6.0 | |
| CCP-50CF3.F | 8.0 | |
| CCP-30CF2.F.F | 4.0 | |
| CCP-50CF2.F.F | 4.0 | |
| Σ | 100.0 | |

Example 22

| Composition | Conc./% | Properties |
|---|---|---|
| CCH-301 | 23.0 | Clearing point T (N, I) = +70.0° C. |
| CCH-303 | 3.0 | Δn (589 nm, 20° C.) = +0.0610 |
| CCH-501 | 4.0 | Δε (1 kHz, 20° C.) = +4.1 |
| CCP-30CF3 | 3.0 | $V_{10}$ (20° C.) = 2.10 V |
| CCP-40CF3 | 3.0 | $V_{90}$ (20° C.) = 5.05 V |
| CCP-50CF3 | 3.0 | |
| CCP-2F.F.F | 5.0 | |
| CCP-3F.F.F | 10.0 | |
| CCP-5F.F.F | 8.0 | |
| CC-5-V | 16.0 | |
| CCP-30CF3.F | 6.0 | |
| CCP-50CF3.F | 8.0 | |
| CCP-30CF2.F.F | 4.0 | |
| CCP-50CF2.F.F | 4.0 | |
| Σ | 100.0 | |

Example 23

| Composition | Conc./% | Properties |
|---|---|---|
| CC-5-V | 16.0 | Transition T (S, N) < −30.0° C. |
| CCH-301 | 16.0 | Clearing point T (N, I) = +86.0° C. |
| CCH-303 | 3.0 | Δn (589 nm, 20° C.) = +0.0606 |
| CCH-501 | 5.0 | Δε (1 kHz, 20° C.) = +4.0 |
| CCP-2F.F.F | 7.0 | $\gamma_1$ (20° C.) = 123 m Pa s |
| CCP-3F.F.F | 5.0 | $V_{10}$ (20° C.) = 2.18 V |
| CCZU-2-F | 4.0 | $V_{90}$ (20° C.) = 5.30 V |
| CCZU-3-F | 13.0 | |
| CCZU-5-F | 4.0 | |
| CH-33 | 2.0 | |
| CH-35 | 3.0 | |
| CH-43 | 2.0 | |
| CH-45 | 3.0 | |
| CCPC-34 | 3.0 | |
| CCPC-35 | 2.0 | |
| CCP-50CF2.F.F | 7.0 | |
| PCH-7F | 5.0 | |
| Σ | 100.0 | |

Example 24

| Composition | Conc./% | Properties |
|---|---|---|
| CCH-301 | 20.0 | Transition T (S, N) < −40.0° C. |
| CCH-501 | 16.0 | Clearing point T (N, I) = +95.0° C. |
| CC-5-V | 11.5 | Δn (589 nm, 20° C.) = +0.0604 |
| CDU-2-F | 6.0 | Δε (1 kHz, 20° C.) = +4.0 |
| CDU-3-F | 6.0 | $\gamma_1$ (20° C.) = 127 m Pa s |
| CDU-5-F | 3.0 | $V_{10}$ (20° C.) = 2.31 V |
| CCZU-2-F | 3.0 | $V_{90}$ (20° C.) = 5.55 V |
| CCZU-3-F | 11.0 | |
| CCZU-5-F | 3.0 | |
| CH-33 | 3.0 | |
| CH-35 | 2.0 | |
| CH-43 | 2.5 | |
| CCPC-33 | 5.0 | |
| CCPC-34 | 4.0 | |
| CCPC-35 | 4.0 | |
| Σ | 100.0 | |

Example 25

| Composition | Conc./% | Properties |
|---|---|---|
| CCH-301 | 18.0 | Clearing point T (N, I) = +80.0° C. |
| CCH-501 | 8.0 | Δn (589 nm, 20° C.) = +0.0602 |
| CCH-34 | 5.0 | Δε (1 kHz, 20° C.) = +7.9 |
| CH-33 | 3.0 | |
| CH-35 | 3.0 | |
| CH-45 | 3.0 | |
| CCPC-34 | 3.0 | |
| CCZU-2-F | 5.0 | |
| CCZU-3-F | 17.0 | |
| CCZU-5-F | 5.0 | |
| CDU-2-F | 11.0 | |
| CDU-3-F | 12.0 | |
| CDU-5-F | 7.0 | |
| Σ | 100.0 | |

Example 26

| Composition | Conc./% | Properties |
|---|---|---|
| CCH-301 | 12.0 | Transition T (S, N) < −30.0° C. |
| CCH-501 | 8.0 | Clearing point T (N, I) = +80.0° C. |
| CC-5-V | 8.0 | Δn (589 nm, 20° C.) = +0.0606 |
| CCP-2F.F.F | 10.0 | Δε (1 kHz, 20° C.) = +6.3 |
| CCP-3F.F.F | 12.0 | |
| CCP-5F.F.F | 5.0 | |
| CCZU-2-F | 5.0 | |
| CCZU-3-F | 17.0 | |
| CCZU-5-F | 5.0 | |
| CH-33 | 3.0 | |
| CH-35 | 3.0 | |
| CH-43 | 3.0 | |
| CCH-3CF3 | 7.0 | |
| CCPC-33 | 2.0 | |
| Σ | 100.0 | |

Example 27

| Composition | Conc./% | Properties |
|---|---|---|
| CCH-301 | 14.0 | Transition T (S, N) < −30.0° C. |
| CCH-501 | 11.0 | Clearing point T (N, I) = +80.0° C. |
| CCP-2F.F.F | 10.0 | Δn (589 nm, 20° C.) = +0.0607 |
| CCP-3F.F.F | 13.0 | Δε (1 kHz, 20° C.) = +6.5 |
| CCP-5F.F.F | 5.0 | |

-continued

| Composition | Conc./% | Properties |
|---|---|---|
| CCZU-2-F | 5.0 | |
| CCZU-3-F | 17.0 | |
| CCZU-5-F | 5.0 | |
| CH-33 | 3.0 | |
| CH-35 | 3.0 | |
| CH-43 | 3.0 | |
| CCPC-33 | 3.0 | |
| CCH-3CF3 | 8.0 | |
| Σ | 100.0 | |

Example 28

| Composition | Conc./% | Properties |
|---|---|---|
| CC-5-V | 4.0 | Clearing point T (N, I) = +70.0° C. |
| CCH-34 | 5.0 | Δn (589 nm, 20° C.) = +0.0601 |
| CCH-301 | 20.0 | Δε (1 kHz, 20° C.) = +6.6 |
| CCH-501 | 7.0 | |
| CH-35 | 2.0 | |
| CCP-2F.F.F | 11.0 | |
| CCP-3F.F.F | 12.0 | |
| CCP-5F.F.F | 5.0 | |
| CCZU-2-F | 6.0 | |
| CCZU-3-F | 20.0 | |
| CCZU-5-F | 6.0 | |
| CCP-20CF2.F.F | 2.0 | |
| Σ | 100.0 | |

Example 29

| Composition | Conc./% | Properties |
|---|---|---|
| CCH-301 | 17.0 | Transition T (S, N) < −30.0° C. |
| CCH-501 | 6.0 | Clearing point T (N, I) = +80.0° C. |
| CC-5-V | 14.0 | Δn (589 nm, 20° C.) = +0.0605 |
| CCP-2F.F.F | 10.0 | Δε (1 kHz, 20° C.) = +5.7 |
| CCP-3F.F.F | 10.0 | $\gamma_1$ (20° C.) = 104 m Pa s |
| CCP-5F.F.F | 5.0 | $V_0$ (20° C.) = 1.50 V |
| CCZU-2-F | 5.0 | |
| CCZU-3-F | 18.0 | |
| CCZU-5-F | 6.0 | |
| CH-33 | 3.0 | |
| CH-35 | 3.0 | |
| CH-43 | 3.0 | |
| Σ | 100.0 | |

Example 30

| Composition | Conc./% | Properties |
|---|---|---|
| CCH-301 | 18.0 | Clearing point T (N, I) = +81.0° C. |
| CCH-501 | 5.0 | Δn (589 nm, 20° C.) = +0.0604 |
| CC-5-V | 14.0 | Δε (1 kHz, 20° C.) = +5.5 |
| CCP-2F.F.F | 9.0 | |
| CCP-3F.F.F | 13.0 | |
| CCP-5F.F.F | 6.0 | |
| CCZU-2-F | 4.0 | |
| CCZU-3-F | 16.0 | |
| CCZU-5-F | 5.0 | |
| CH-33 | 2.0 | |

-continued

| Composition | Conc./% | Properties |
|---|---|---|
| CH-35 | 3.0 | |
| CH-43 | 2.0 | |
| CH-45 | 3.0 | |
| Σ | 100.0 | |

Example 31

| Composition | Conc./% | Properties |
|---|---|---|
| CC-5-V | 16.0 | Transition T (S, N) < −30.0° C. |
| CCH-301 | 16.0 | Clearing point T (N, I) = +86.0° C. |
| CCH-303 | 3.0 | Δn (589 nm, 20° C.) = +0.0606 |
| CCH-501 | 5.0 | Δε (1 kHz, 20° C.) = +4.0 |
| CCP-2F.F.F | 7.0 | $V_{10}$ (20° C.) = 2.18 V |
| CCP-3F.F.F | 5.0 | $V_{90}$ (20° C.) = 5.30 V |
| CCZU-2-F | 4.0 | |
| CCZU-3-F | 13.0 | |
| CCZU-5-F | 4.0 | |
| CH-33 | 2.0 | |
| CH-35 | 3.0 | |
| CH-43 | 2.0 | |
| CH-45 | 3.0 | |
| CCPC-34 | 3.0 | |
| CCPC-35 | 2.0 | |
| CCP-50CF2.F.F | 7.0 | |
| PCH-7F | 5.0 | |
| Σ | 100.0 | |

Example 32

| Composition | Conc./% | Properties |
|---|---|---|
| CCH-301 | 20.0 | Transition T (S, N) < −40.0° C. |
| CCH-501 | 16.0 | Clearing point T (N, I) = +95.0° C. |
| CC-5-V | 11.5 | Δn (589 nm, 20° C.) = +0.0604 |
| CDU-2-F | 6.0 | Δε (1 kHz, 20° C.) = +4.0 |
| CDU-3-F | 6.0 | $\gamma_1$ (20° C.) = 127 m Pa s |
| CDU-5-F | 3.0 | $V_{10}$ (20° C.) = 2.31 V |
| CCZU-2-F | 3.0 | $V_{90}$ (20° C.) = 5.53 V |
| CCZU-3-F | 11.0 | |
| CCZU-5-F | 3.0 | |
| CH-33 | 3.0 | |
| CH-35 | 2.0 | |
| CH-43 | 2.5 | |
| CCPC-33 | 5.0 | |
| CCPC-34 | 4.0 | |
| CCPC-35 | 4.0 | |
| Σ | 100.0 | |

Example 33

| Composition | Conc./% | Properties |
|---|---|---|
| CCH-301 | 18.0 | Clearing point T (N, I) = +80.0° C. |
| CCH-501 | 8.0 | Δn (589 nm, 20° C.) = +0.0602 |
| CCH-34 | 5.0 | Δε (1 kHz, 20° C.) = +7.9 |
| CH-33 | 3.0 | |
| CH-34 | 3.0 | |
| CH-35 | 3.0 | |
| CCPC-34 | 3.0 | |

-continued

| Composition | Conc./% | Properties |
|---|---|---|
| CCZU-2-F | 5.0 | |
| CCZU-3-F | 17.0 | |
| CCZU-5-F | 5.0 | |
| CDU-2-F | 11.0 | |
| CDU-3-F | 12.0 | |
| CDU-5-F | 7.0 | |
| Σ | 100.0 | |

Example 34

| Composition | Conc./% | Properties |
|---|---|---|
| CCH-301 | 14.0 | Transition T (S, N) < −30.0° C. |
| CCH-501 | 11.0 | Clearing point T (N, I) = +80.0° C. |
| CCP-2F.F.F | 10.0 | Δn (589 nm, 20° C.) = +0.0607 |
| CCP-3F.F.F | 13.0 | Δε (1 kHz, 20° C.) = +6.5 |
| CCP-5F.F.F | 5.0 | |
| CCZU-2-F | 5.0 | |
| CCZU-3-F | 17.0 | |
| CCZU-5-F | 5.0 | |
| CH-33 | 3.0 | |
| CH-35 | 3.0 | |
| CH-43 | 3.0 | |
| CCPC-33 | 3.0 | |
| CCH-3CF3 | 8.0 | |
| Σ | 100.0 | |

Example 35

| Composition | Conc./% | Properties |
|---|---|---|
| CC-5-V | 14.0 | Transition T (S, N) < −40.0° C. |
| CCH-303 | 3.0 | Clearing point T (N, I) = +76.0° C. |
| CCH-501 | 5.0 | Δn (589 nm, 20° C.) = +0.0597 |
| CCP-2F.F.F | 10.0 | Δε (1 kHz, 20° C.) = +5.5 |
| CCP-3F.F.F | 12.0 | $V_{10}$ (20° C.) = 1.80 V |
| CCP-5F.F.F | 4.0 | $V_{90}$ (20° C.) = 4.44 V |
| CCZU-2-F | 5.0 | |
| CCZU-3-F | 16.0 | |
| CCZU-5-F | 5.0 | |
| CCH-301 | 18.0 | |
| CH-33 | 2.0 | |
| CH-35 | 3.0 | |
| CH-43 | 3.0 | |
| Σ | 100.0 | |

Example 36

| Composition | Conc./% | Properties |
|---|---|---|
| CC-5-V | 6.0 | Transition T (S, N) = < −40.0° C. |
| CCH-34 | 5.0 | Clearing point T (N, I) = +75.0° C. |
| CCH-301 | 18.0 | Δn (5.89 nm, 20° C.) = +0.0604 |
| CCH-501 | 6.0 | Δε (1 kHz, 20° C.) = +6.4 |
| CCP-2F.F.F | 12.0 | $V_{10}$ (20° C.) = 1.61 V |
| CCP-3F.F.F | 12.0 | $V_{90}$ (20° C.) = 3.94 V |
| CCP-5F.F.F | 5.0 | |
| CCZU-2-F | 6.0 | |
| CCZU-3-F | 20.0 | |
| CCZU-5-F | 5.0 | |

-continued

| Composition | Conc./% | Properties |
|---|---|---|
| CH-35 | 2.0 | |
| CH-45 | 3.0 | |
| Σ | 100.0 | |

Example 37

| Composition | Conc./% | Properties |
|---|---|---|
| CC-5-V | 7.0 | Transition T (S, N) < −30.0° C. |
| CCH-301 | 5.0 | Clearing point T (N, I) = +82.0° C. |
| CCH-303 | 5.0 | Δn (589 nm, 20° C.) = +0.0630 |
| CCH-501 | 14.0 | Δε (1 kHz, 20° C.) = +8.0 |
| CCP-2F.F.F | 12.0 | $V_{10}$ (20° C.) = 1.69 V |
| CCP-3F.F.F | 12.0 | $V_{90}$ (20° C.) = 4.08 V |
| CCP-5F.F.F | 4.0 | |
| CCZU-2-F | 6.0 | |
| CCZU-3-F | 22.0 | |
| CCZU-5-F | 6.0 | |
| CH-33 | 2.0 | |
| CH-35 | 3.0 | |
| CH-45 | 2.0 | |
| Σ | 100.0 | |

Example 38

| Composition | Conc./% | Properties |
|---|---|---|
| CCH-303 | 11.0 | Transition T (S, N) < −30.0° C. |
| CCH-501 | 17.0 | Clearing point T (N, I) = +83.5° C. |
| CH-33 | 3.0 | Δn (589 nm, 20° C.) = +0.0624 |
| CH-35 | 3.0 | Δε (1 kHz, 20° C.) = +8.7 |
| CH-45 | 3.0 | $γ_1$ (20° C.) = 151 m Pa s |
| CCP-5F.F.F | 3.0 | $V_{10}$ (20° C.) = 1.51 V |
| CCZU-2-F | 6.0 | $V_{90}$ (20° C.) = 3.64 V |
| CCZU-3-F | 16.0 | |
| CCZU-5-F | 6.0 | |
| CCPC-34 | 2.0 | |
| CDU-2-F | 10.0 | |
| CDU-3-F | 12.0 | |
| CDU-5-F | 8.0 | |
| Σ | 100.0 | |

Example 39

| Composition | Conc./% | Properties |
|---|---|---|
| CCH-301 | 19.0 | Transition T (S, N) < −40.0° C. |
| CC-5-V | 17.0 | Clearing point T (N, I) = +76.5° C. |
| CCP-20CF3 | 6.0 | Δn (589 nm, 20° C.) = +0.0639 |
| CCP-40CF3 | 6.0 | Δε (1 kHz, 20° C.) = +5.2 |
| CCP-2F.F.F | 11.0 | $γ_1$ (20° C.) = 92 m Pa s |
| CCP-3F.F.F | 11.0 | $V_0$ (20° C.) = 1.50 V |
| CCP-5F.F.F | 6.0 | $V_{10}$ (20° C.) = 1.87 V |
| CCP-20CF3.F | 9.0 | $V_{90}$ (20° C.) = 4.59 V |
| CCZU-2-F | 5.0 | |
| CCZU-3-F | 7.0 | |
| CCPC-34 | 3.0 | |
| Σ | 100.0 | |

Example 40

| Composition | Conc./% | Properties |
|---|---|---|
| CCH-301 | 20.0 | Transition T (S, N) < −30.0° C. |
| CC-5-V | 16.0 | Clearing point T (N, I) = +70.5° C. |
| CCP-20CF3 | 6.0 | $\Delta n$ (589 nm, 20° C.) = +0.0620 |
| CCP-40CF3 | 5.0 | $\Delta \epsilon$ (1 kHz, 20° C.) = +7.4 |
| CCZU-2-F | 5.0 | $V_0$ (20° C.) = 1.23 V |
| CCZU-3-F | 8.0 | $V_{10}$ (20° C.) = 1.52 V |
| CCPC-34 | 4.0 | $V_{90}$ (20° C.) = 3.71 V |
| CDU-2-F | 12.0 | |
| CDU-3-F | 14.0 | |
| CDU-5-F | 10.0 | |
| Σ | 100.0 | |

Example 41

| Composition | Conc./% | Properties |
|---|---|---|
| CCH-3CF3 | 9.0 | Transition T (S, N) < −40.0° C. |
| CCH-5CF3 | 12.0 | Clearing point T (N, I) = +80.0° C. |
| CCH-302 | 10.0 | $\Delta n$ (589 nm, 20° C.) = +0.0633 |
| CCP-2F.F.F | 12.0 | $\Delta \epsilon$ (1 kHz, 20° C.) = +7.9 |
| CCP-3F.F.F | 11.0 | $V_{10}$ (20° C.) = 1.72 V |
| CCP-5F.F.F | 6.0 | $V_{90}$ (20° C.) = 4.13 V |
| CCP-20CF3.F | 3.0 | |
| CCZU-2-F | 6.0 | |
| CCZU-3-F | 14.0 | |
| CCZU-5F | 6.0 | |
| CCPC-34 | 5.0 | |
| CH-35 | 6.0 | |
| Σ | 100.0 | |

Example 42

| Composition | Conc./% | Properties |
|---|---|---|
| CH-33 | 4.0 | Transition T (S, N) < −30.0° C. |
| CH-35 | 3.0 | Clearing point T (N, I) = +82.0° C. |
| CCP-2F.F.F | 10.0 | $\Delta n$ (589 nm, 20° C.) = +0.0645 |
| CCZU-2-F | 6.0 | $\Delta \epsilon$ (1 kHz, 20° C.) = +11.2 |
| CCZU-3-F | 16.0 | $V_{10}$ (20° C.) = 1.35 V |
| CCZU-5-F | 6.0 | $V_{90}$ (20° C.) = 3.26 V |
| CDU-2-F | 9.0 | |
| CDU-3-F | 11.0 | |
| CDU-5-F | 8.0 | |
| CCH-3CF3 | 11.0 | |
| CCH-5CF3 | 9.0 | |
| CCPC-33 | 4.0 | |
| CCPC-34 | 3.0 | |
| Σ | 100.0 | |

Example 43

| Composition | Conc./% | Properties |
|---|---|---|
| CCH-501 | 7.0 | Transition T (S, N) < −30.0° C. |
| CH-33 | 4.0 | Clearing point T (N, I) = +81.0° C. |
| CH-35 | 4.0 | $\Delta n$ (589 nm, 20° C.) = +0.0624 |
| CH-43 | 4.0 | $\Delta \epsilon$ (1 kHz, 20° C.) = +9.5 |
| CCP-2F.F.F | 12.0 | $\gamma_1$ (20° C.) = 180 m Pa s |
| CCZU-2-F | 6.0 | $V_{10}$ (20° C.) = 1.34 V |
| CCZU-3-F | 16.0 | $V_{90}$ (20° C.) = 3.23 V |
| CCZU-5-F | 6.0 | |
| CDU-2-F | 9.0 | |
| CDU-3-F | 11.0 | |
| CDU-5-F | 6.0 | |
| CCS-3 | 8.0 | |
| CCS-5 | 7.0 | |
| Σ | 100.0 | |

Example 44

| Composition | Conc./% | Properties |
|---|---|---|
| CCH-301 | 14.0 | Transition T (S, N) < −30.0° C. |
| CC-5-V | 5.0 | Clearing point T (N, I) = +79.5° C. |
| CH-33 | 3.0 | $\Delta n$ (589 nm, 20° C.) = +0.0640 |
| CH-35 | 3.0 | $\Delta \epsilon$ (1 kHz, 20° C.) = +9.7 |
| CH-45 | 3.0 | $V_0$ (20° C.) = 1.04 V |
| CCP-2F.F.F | 8.0 | $V_{10}$ (20° C.) = 1.33 V |
| CCZU-2-F | 6.0 | $V_{90}$ (20° C.) = 3.25 V |
| CCZU-3-F | 19.0 | |
| CCZU-5-F | 6.0 | |
| CCPC-34 | 1.0 | |
| CDU-2-F | 11.0 | |
| CDU-3-F | 12.0 | |
| CDU-5-F | 9.0 | |
| Σ | 100.0 | |

Example 45

| Composition | Conc./% | Properties |
|---|---|---|
| ECCH-5CF3 | 21.0 | Clearing point T (N, I) = +82.0° C. |
| CC-5-V | 5.0 | $\Delta n$ (589 nm, 20° C.) = +0.0654 |
| CH-33 | 3.0 | $\Delta \epsilon$ (1 kHz, 20° C.) = +8.5 |
| CCP-2F.F.F | 12.0 | $\gamma_1$ (20° C.) = 165 m Pa s |
| CCP-3F.F.F | 12.0 | $V_{10}$ (20° C.) = 1.58 V |
| CCP-5F.F.F | 5.0 | $V_{90}$ (20° C.) = 3.88 V |
| CCP-20CF3.F | 6.0 | |
| CCZU-2-F | 6.0 | |
| CCZU-3-F | 20.0 | |
| CCZU-5-F | 6.0 | |
| CCPC-34 | 4.0 | |
| Σ | 100.0 | |

Example 46

| Composition | Conc./% | Properties |
|---|---|---|
| CCH-303 | 11.0 | Transition T (S, N) < −40.0° C. |
| CCH-501 | 17.0 | Clearing point T (N, I) = +84.5° C. |
| CH-33 | 3.0 | $\Delta n$ (589 nm, 20° C.) = +0.0628 |
| CH-35 | 3.0 | $\Delta \epsilon$ (1 kHz, 20° C.) = +9.2 |
| CH-45 | 3.0 | $V_{10}$ (20° C.) = 1.58 V |
| CCP-5F.F.F | 3.0 | $V_{90}$ (20° C.) = 3.83 V |
| CCZU-2-F | 6.0 | |
| CCZU-3-F | 16.0 | |
| CCZU-5-F | 6.0 | |
| CCPC-34 | 2.0 | |

-continued

| Composition | Conc./% | Properties |
|---|---|---|
| CEDU-3-F | 15.0 | |
| CEDU-5-F | 15.0 | |
| Σ | 100.0 | |

Example 47

| Composition | Conc./% | Properties |
|---|---|---|
| CCH-501 | 7.0 | Transition T (S, N) < −40.0° C. |
| CH-33 | 3.0 | Clearing point T (N, I) = +86.0° C. |
| CH-35 | 3.0 | $\Delta n$ (589 nm, 20° C.) = +0.0645 |
| CH-43 | 3.0 | $\Delta \epsilon$ (1 kHz, 20° C.) = +10.2 |
| CCP-2F.F.F | 7.0 | $V_{10}$ (20° C.) = 1.44 V |
| CCP-3F.F.F | 5.0 | $V_{90}$ (20° C.) = 3.44 V |
| CCZU-2-F | 6.0 | |
| CCZU-3-F | 15.0 | |
| CCZU-5-F | 6.0 | |
| CDU-2-F | 9.0 | |
| CDU-3-F | 9.0 | |
| CDU-5-F | 6.0 | |
| CCH-3CF3 | 7.0 | |
| CCH-5CF3 | 8.0 | |
| CCPC-34 | 3.0 | |
| CCPC-33 | 3.0 | |
| Σ | 100.0 | |

Example 48

| Composition | Conc./% | Properties |
|---|---|---|
| CCH-301 | 5.0 | Transition T (S, N) < −40.0° C. |
| CCH-501 | 16.0 | Clearing point T (N, I) = +86.0° C. |
| CCP-2F.F.F | 12.0 | $\Delta n$ (589 nm, 20° C.) = +0.0622 |
| CCP-3F.F.F | 12.0 | $\Delta \epsilon$ (1 kHz, 20° C.) = +4.8 |
| CCP-5F.F.F | 6.0 | $V_{10}$ (20° C.) = 2.10 V |
| CCP-20CF3 | 5.0 | $V_{90}$ (20° C.) = 4.98 V |
| CCP-40CF3 | 6.0 | |
| CCP-20CF3.F | 9.0 | |
| CH-33 | 4.0 | |
| CH-35 | 3.0 | |
| CH-43 | 3.0 | |
| CH-45 | 3.0 | |
| CCPC-34 | 4.0 | |
| CCH-3CF3 | 6.0 | |
| CCH-5CF3 | 6.0 | |
| Σ | 100.0 | |

Example 49

| Composition | Conc./% | Properties |
|---|---|---|
| CCH-5CF3 | 10.0 | Transition T (S, N) < −30.0° C. |
| CCH-34 | 5.0 | Clearing point T (N, I) = +79.5° C. |
| CC-5-V | 16.0 | $\Delta n$ (589 nm, 20° C.) = +0.0650 |
| CCP-2F.F.F | 12.0 | $\Delta \epsilon$ (1 kHz, 20° C.) = +7.4 |
| CCP-3F.F.F | 10.0 | $\gamma_1$ (20° C.) = 113 m Pa s |
| CCP-5F.F.F | 7.0 | $V_{10}$ (20° C.) = 1.67 V |
| CCP-20CF3.F | 12.0 | $V_{90}$ (20° C.) = 4.08 V |
| CCZU-2-F | 5.0 | |
| CCZU-3-F | 16.0 | |

-continued

| Composition | Conc./% | Properties |
|---|---|---|
| CCZU-5-F | 5.0 | |
| CCPC-34 | 2.0 | |
| Σ | 100.0 | |

Example 50

| Composition | Conc./% | Properties |
|---|---|---|
| CCH-34 | 6.0 | Transition T (S,N) < −40.0° C. |
| CCH-3CF3 | 3.0 | Clearing point T (N,I) = +75.0° C. |
| CCH-5CF3 | 8.0 | $\Delta n$ (589 nm, 20° C.) = +0.0644 |
| CCP-2F.F.F | 11.0 | $\Delta \epsilon$ (1 kHz, 20° C.) = +10.1 |
| CCP-3F.F.F | 10.0 | $V_{10}$ (20° C.) = 1.42 V |
| CCP-5F.F.F | 6.0 | $V_{90}$ (20° C.) = 3.47 V |
| CCP-20CF3.F | 4.0 | |
| CCP-40CF3 | 8.0 | |
| CDU-2-F | 10.0 | |
| CDU-3-F | 12.0 | |
| CDU-5-F | 10.0 | |
| CCOC-3-3 | 4.0 | |
| CCOC-3-3 | 8.0 | |
| Σ | 100.0 | |

Example 51

| Composition | Conc./% | Properties |
|---|---|---|
| CCH-34 | 6.0 | Clearing point T (N,I) = +81.0° C. |
| CC-5-V | 11.0 | $\Delta n$ (589 nm, 20° C.) = +0.0653 |
| CC-3-2T | 9.0 | $\Delta \epsilon$ (1 kHz, 20° C.) = +7.7 |
| CC-5-2T | 9.0 | $V_{10}$ (20° C.) = 1.70 V |
| CCP-2F.F.F | 11.0 | $V_{90}$ (20° C.) = 4.20 V |
| CCP-3F.F.F | 11.0 | |
| CCP-5F.F.F | 6.0 | |
| CCP-40CF3 | 6.0 | |
| CCP-20CF3.F | 5.0 | |
| CCZU-2-F | 6.0 | |
| CCZU-3-F | 14.0 | |
| CCZU-5-F | 6.0 | |
| Σ | 100.0 | |

Example 52

| Composition | Conc./% | Properties |
|---|---|---|
| CCH-34 | 5.0 | Clearing point T (N,I) = +80.0° C. |
| CC-5-V | 8.0 | $\Delta n$ (589 nm, 20° C.) = +0.0642 |
| CCH-3CF3 | 6.0 | $\Delta \epsilon$ (1 kHz, 20° C.) = +7.8 |
| CCH-5CF3 | 8.0 | $V_{10}$ (20° C.) = 1.68 V |
| CCP-2F.F.F | 11.0 | $V_{90}$ (20° C.) = 4.08 V |
| CCP-3F.F.F | 11.0 | |
| CCP-5F.F.F | 6.0 | |
| CCZU-2-F | 6.0 | |
| CCZU-3-F | 14.0 | |
| CCZU-5-F | 6.0 | |
| CCP-20CF3.F | 8.0 | |
| CCP-40CF3 | 4.0 | |
| CCOC-4-3 | 5.0 | |
| CCOC-3-3 | 2.0 | |
| Σ | 100.0 | |

Example 53

| Composition | Conc./% | Properties |
|---|---|---|
| CCH-34 | 6.0 | Clearing point T (N,I) = +79.5° C. |
| CC-5-V | 14.0 | Δn (589 nm, 20° C.) = +0.0649 |
| CCP-2F.F.F | 11.0 | Δε (1 kHz, 20° C.) = +9.5 |
| CCP-3F.F.F | 11.0 | $V_{10}$ (20° C.) = 1.46 V |
| CCP-5F.F.F | 6.0 | $V_{90}$ (20° C.) = 3.60 V |
| CCP-20CF3.F | 6.0 | |
| CDU-2-F | 10.0 | |
| CDU-3-F | 14.0 | |
| CDU-5-F | 10.0 | |
| CCOC-3-3 | 4.0 | |
| CCOC-4-3 | 8.0 | |
| Σ | 100.0 | |

Example 54

| Composition | Conc./% | Properties |
|---|---|---|
| CCH-34 | 6.0 | Clearing point T (N,I) = +78.5° C. |
| CC-5-V | 15.0 | Δn (589 nm, 20° C.) = +0.0652 |
| CCH-5CF3 | 9.0 | Δε (1 kHz, 20° C.) = +9.4 |
| CCP-2F.F.F | 11.0 | $V_{10}$ (20° C.) = 1.48 V |
| CCP-3F.F.F | 11.0 | $V_{90}$ (20° C.) = 3.66 V |
| CCP-5F.F.F | 6.0 | |
| CCP-40CF3 | 4.0 | |
| CCZU-2-F | 6.0 | |
| CCZU-3-F | 14.0 | |
| CCZU-5-F | 6.0 | |
| DCZG-2-OT | 4.0 | |
| DCZG-3-OT | 4.0 | |
| DCZG-5-OT | 4.0 | |
| Σ | 100.0 | |

Example 55

| Composition | Conc./% | Properties |
|---|---|---|
| CCH-34 | 5.0 | Transition T (S,N) < −40.0° C. |
| CC-5-V | 8.0 | Clearing point T (N,I) = +80.5° C. |
| CCH-3CF3 | 6.0 | Δn (589 nm, 20° C.) = +0.0643 |
| CCH-5CF3 | 8.0 | Δε (1 kHz, 20° C.) = +7.8 |
| CCP-2F.F.F | 11.0 | $V_{10}$ (20° C.) = 1.69 V |
| CCP-3F.F.F | 11.0 | $V_{90}$ (20° C.) = 4.11 V |
| CCP-5F.F.F | 6.0 | |
| CCZU-2-F | 5.0 | |
| CCZU-3-F | 15.0 | |
| CCZU-5-F | 5.0 | |
| CCP-20CF3.F | 8.0 | |
| CCP-40CF3 | 5.0 | |
| CCOC-4-3 | 5.0 | |
| CCOC-3-3 | 2.0 | |
| Σ | 100.0 | |

Example 56

| Composition | Conc./% | Properties |
|---|---|---|
| CCH-34 | 5.0 | Clearing point T (N,I) = +82.0° C. |
| CC-3-2T | 8.0 | Δn (589 nm, 20° C.) = +0.0650 |
| CC-5-2T | 8.0 | Δε (1 kHz, 20° C.) = +6.5 |
| CCH-5CF3 | 8.0 | $V_{10}$ (20° C.) = 1.94 V |
| CCP-2F.F.F | 12.0 | $V_{90}$ (20° C.) = 4.71 V |
| CCP-3F.F.F | 11.0 | |
| CCP-5F.F.F | 6.0 | |
| CCP-20CF3.F | 12.0 | |
| CCP-50CF3.F | 6.0 | |
| CCP-40CF3 | 6.0 | |
| CCOC-4-3 | 8.0 | |
| CCG-(c3)m-F | 10.0 | |
| Σ | 100.0 | |

Example 57

| Composition | Conc./% | Properties |
|---|---|---|
| CCH-34 | 5.0 | Transition T (S,N) < −40.0° C. |
| CC-5-V | 6.0 | Clearing point T (N,I) = +80.5° C. |
| CCH-3CF3 | 6.0 | Δn (589 nm, 20° C.) = +0.0644 |
| CCH-5CF3 | 8.0 | Δε (1 kHz, 20° C.) = +7.9 |
| CCP-2F.F.F | 11.0 | $\gamma_1$ (20° C.) = 124 m Pa s |
| CCP-3F.F.F | 12.0 | $V_{10}$ (20° C.) = 1.65 V |
| CCP-5F.F.F | 5.0 | $V_{90}$ (20° C.) = 4.06 V |
| CCZU-2-F | 5.0 | |
| CCZU-3-F | 15.0 | |
| CCZU-5-F | 4.0 | |
| CCP-20CF3.F | 10.5 | |
| CCP-40CF3 | 6.5 | |
| CCOC-4-3 | 4.0 | |
| CCOC-3-3 | 2.0 | |
| Σ | 100.0 | |

Example 58

| Composition | Conc./% | Properties |
|---|---|---|
| CCH-3CF3 | 8.0 | Clearing point T (N,I) = +81.0° C. |
| CCH-5CF3 | 5.0 | Δn (589 nm, 20° C.) = +0.0655 |
| CCH-301 | 9.0 | Δε (1 kHz, 20° C.) = +8.7 |
| CCP-2F.F.F | 8.0 | $V_{10}$ (20° C.) = 1.56 V |
| CCP-3F.F.F | 13.0 | $V_{90}$ (20° C.) = 3.77 V |
| CCP-5F.F.F | 5.0 | |
| CCZU-2-F | 5.0 | |
| CCZU-3-F | 8.0 | |
| CCZU-5-F | 5.0 | |
| CCP-30CF3.F | 8.0 | |
| CCP-50CF2.F.F | 8.0 | |
| CDU-3-F | 9.0 | |
| CCOC-3-3 | 5.0 | |
| CPCC-2-3 | 4.0 | |
| Σ | 100.0 | |

Example 59

| Composition | Conc./% | Properties |
|---|---|---|
| CCH-3CF3 | 9.0 | Transition T (S,N) = < −30.0° C. |
| CCH-5CF3 | 7.0 | Clearing point T (N,I) = +80.0° C. |
| CCH-34 | 5.0 | Δn (589 nm, 20° C.) = +0.0652 |
| CCP-2F.F.F | 11.0 | Δε (1 kHz, 20° C.) = +8.6 |

-continued

| Composition | Conc./% | Properties |
|---|---|---|
| CCP-3F.F.F | 12.0 | $\gamma_1$ (20° C.) = 144 m Pa s |
| CCP-5F.F.F | 5.0 | $V_{10}$ (20° C.) = 1.58 V |
| CCP-20CF3 | 4.0 | $V_{90}$ (20° C.) = 3.88 V |
| CCP-30CF3 | 2.0 | |
| CCP-40CF3 | 7.0 | |
| CCP-20CF3.F | 10.0 | |
| CCZU-2-F | 5.0 | |
| CCZU-3-F | 15.0 | |
| CCZU-5-F | 4.0 | |
| CCTTCC-5-5-5-5 | 4.0 | |
| Σ | 100.0 | |

Example 60

| Composition | Conc./% | Properties |
|---|---|---|
| CCH-34 | 6.0 | Transition T (S,N) = < −40.0° C. |
| CCH-501 | 8.0 | Clearing point T (N,I) = +80.0° C. |
| CCH-5CF3 | 8.0 | Δn (589 nm, 20° C.) = +0.0656 |
| CCP-2F.F.F | 11.0 | Δε (1 kHz, 20° C.) = +8.4 |
| CCP-3F.F.F | 11.0 | $V_{10}$ (20° C.) = 1.57 V |
| CCP-5F.F.F | 6.0 | $V_{90}$ (20° C.) = 3.89 V |
| CCP-40CF3 | 8.0 | |
| CCP-20CF3.F | 10.0 | |
| CCZU-2-F | 6.0 | |
| CCZU-3-F | 14.0 | |
| CCZU-5-F | 6.0 | |
| CHO-3CF3 | 6.0 | |
| Σ | 100.0 | |

Example 61

| Composition | Conc./% | Properties |
|---|---|---|
| CCH-34 | 6.0 | Transition T (S,N) = < −40.0° C. |
| CCH-501 | 10.0 | Clearing point T (N,I) = +80.0° C. |
| CCH-5CF3 | 6.0 | Δn (589 nm, 20° C.) = 0.0653 |
| CCP-2F.F.F | 11.0 | $V_{10}$ (20° C.) = 1.41 V |
| CCP-3F.F.F | 11.0 | $V_{90}$ (20° C.) = 3.45 V |
| CCP-5F.F.F | 6.0 | |
| CCP-20CF3.F | 8.0 | |
| CCZU-2-F | 6.0 | |
| CCZU-3-F | 14.0 | |
| CCZU-5-F | 6.0 | |
| DCZG-2-OT | 4.0 | |
| DCZG-3-OT | 4.0 | |
| DCZG-5-OT | 4.0 | |
| CCOC-3-3 | 4.0 | |
| Σ | 100.0 | |

Example 62

| Composition | Conc./% | Properties |
|---|---|---|
| CC-5-V | 18.5 | Clearing point T (N,I) = +70.0° C. |
| CCH-303 | 6.0 | Δn (589 nm, 20° C.) = 0.0650 |
| CCH-501 | 6.0 | $V_{10}$ (20° C.) = 1.56 V |
| CCP-2F.F.F | 12.0 | $V_{90}$ (20° C.) = 3.93 V |
| CCP-3F.F.F | 13.0 | |
| CCP-5F.F.F | 5.0 | |
| CCP-20CF2.F.F | 10.0 | |
| CCP-30CF2.F.F | 10.0 | |
| CCZU-2-F | 5.0 | |
| CCZU-3-F | 10.0 | |
| PCH-7 | 4.5 | |
| Σ | 100.0 | |

Example 63

| Composition | Conc./% | Properties |
|---|---|---|
| CCH-301 | 11.5 | Transition T (S,N) = < −30.0° C. |
| CCP-2F.F.F | 10.0 | Clearing point T (N,I) = +80.0° C. |
| CCP-3F.F.F | 13.0 | Δn (589 nm, 20° C.) = 0.0653 |
| CCP-5F.F.F | 5.0 | $\gamma_1$ (20° C.) = 161 m Pa s |
| CCZU-2-F | 5.0 | $V_{10}$ (20° C.) = 1.54 V |
| CCZU-3-F | 16.0 | $V_{90}$ (20° C.) = 3.76 V |
| CCZU-5-F | 4.0 | |
| CCP-20CF2.F.F | 5.0 | |
| CCP-30CF2.F.F | 6.0 | |
| CCP-50CF2.F.F | 6.0 | |
| CH-33 | 3.0 | |
| CH-35 | 2.0 | |
| CH-43 | 2.5 | |
| CCH-3CF3 | 7.0 | |
| CCH-5CF3 | 4.0 | |
| Σ | 100.0 | |

FIGURES

FIG. 1 shows the principle of construction of a liquid-crystal switching element according to the invention having crossed polarisers.

FIG. 1a) shows the arrangement of the most important constituents of the switching elements of the first preferred embodiment and the ray path in side view.

| | |
|---|---|
| BL: | denotes backlighting, |
| P: | denotes polariser or analyser (the transmission direction is denoted by the respective bars), |
| z: | denotes the normal to the display surface, |
| n∥: | denotes the preferential direction of the liquid-crystal director in the centre of the layer between the substrates (not shown), corresponds to the direction of the extraordinary refractive index ($n_o$), and |
| n⊥: | denotes the direction perpendicular to the preferential direction of the liquid-crystal director in the centre of the layer between the substrates (in the x-axis and in the z-axis), corresponds to the direction of the ordinary refractive index ($n_e$). |

FIG. 1b) shows a plan view of the alignment of the relevant axes. The symbols from FIG. 1a are also used here, where appropriate.

Figure 4:
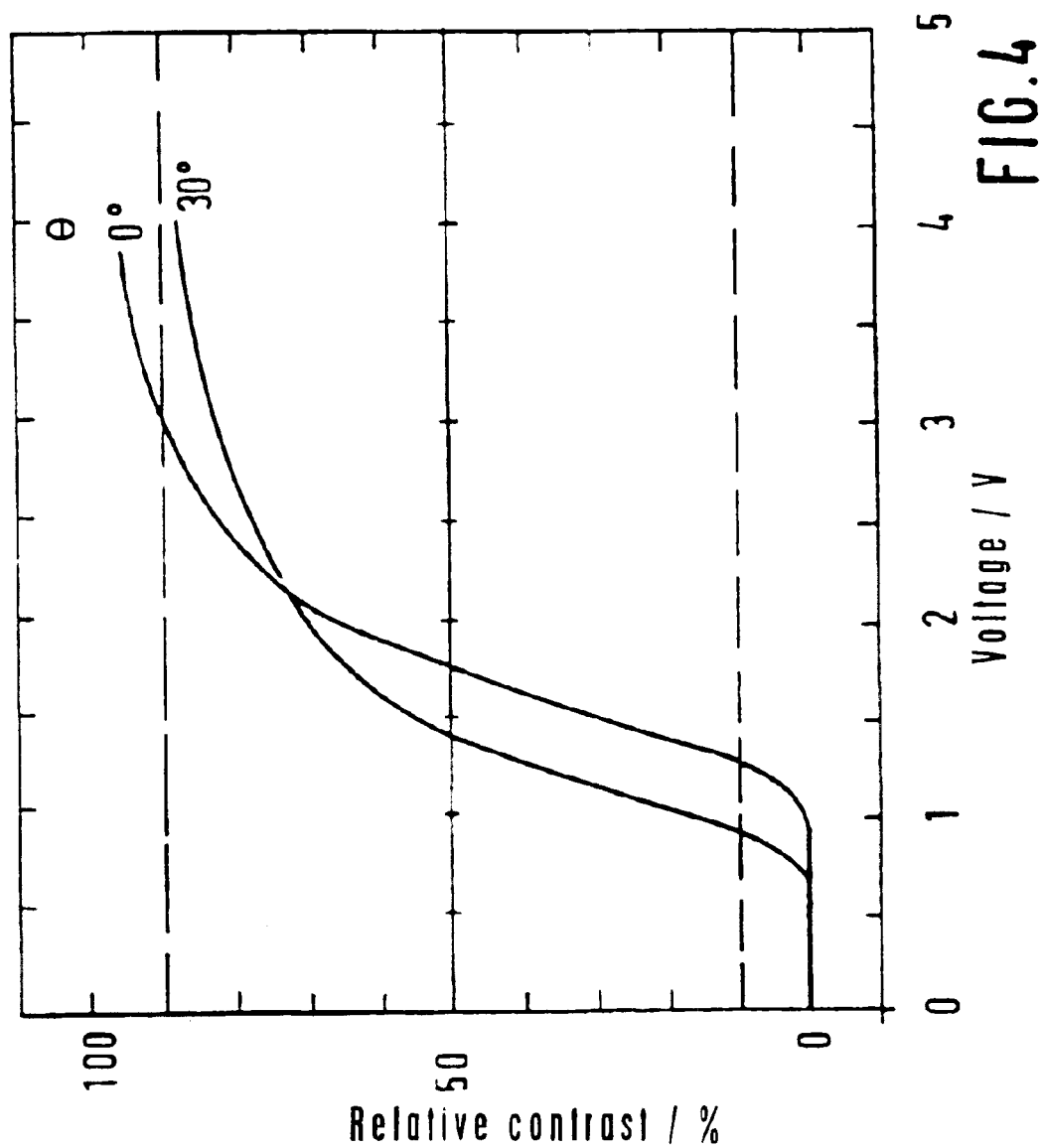

FIG. 4 shows the transmission voltage characteristic line of a liquid-crystal switching element according to the invention in normally black mode in accordance with Example 1. The parameters are as indicated in the text. Two curves are shown which were obtained for two different cells with identical results in each case. The curves were obtained for $\Theta=0°$ and for $\Theta=30°$ and $\Phi=45°$.

Figure 5:
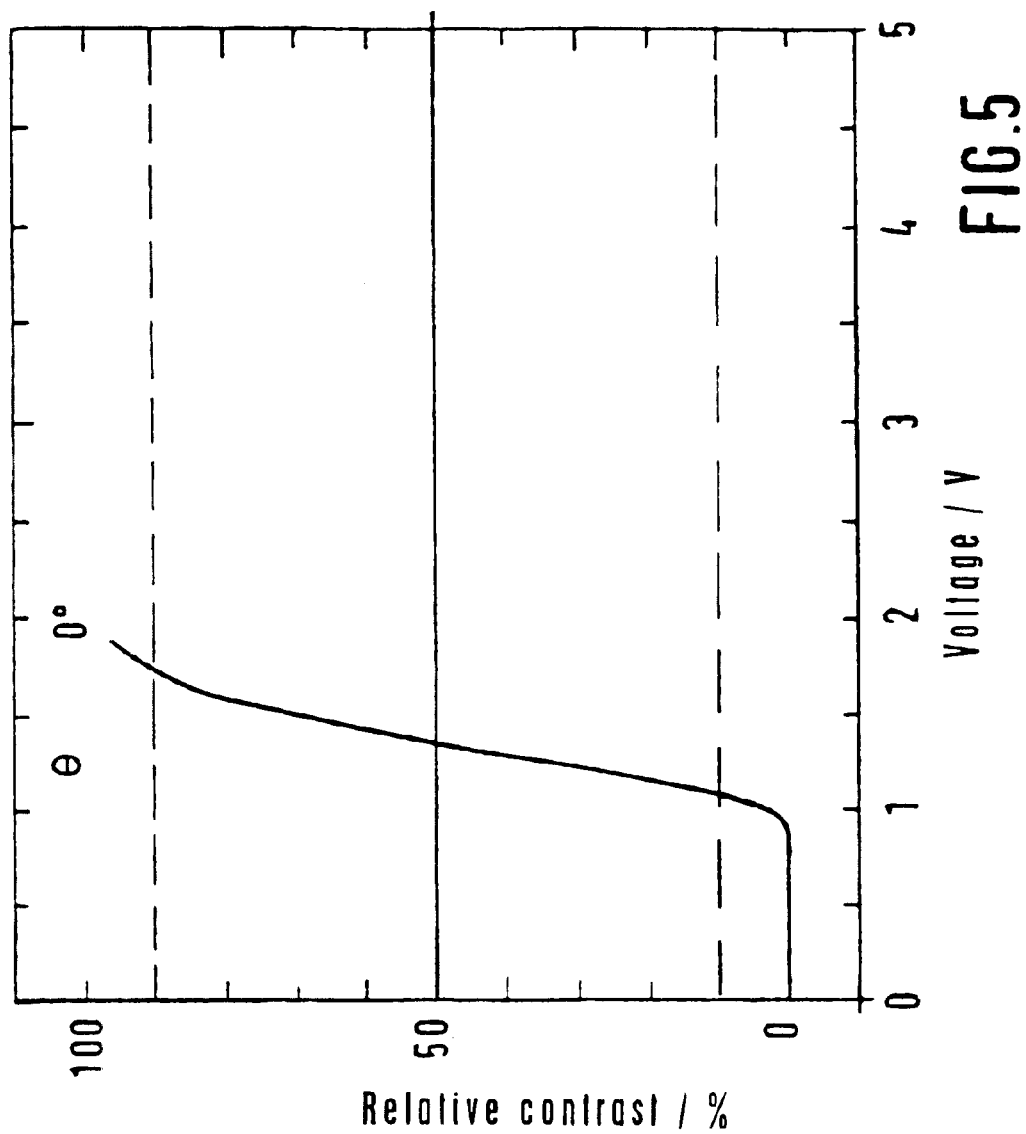

FIG. 5 shows, similarly to FIG. 4, the characteristic lines of a liquid-crystal switching element, but here of a TN switching element having d·Δn of 0.5 μm (corresponding to the 1st Gooch and Tarry minimum) of Comparative Example 1. The curve shows the results for two different cells at $\Theta=0°$.

Figure 6:
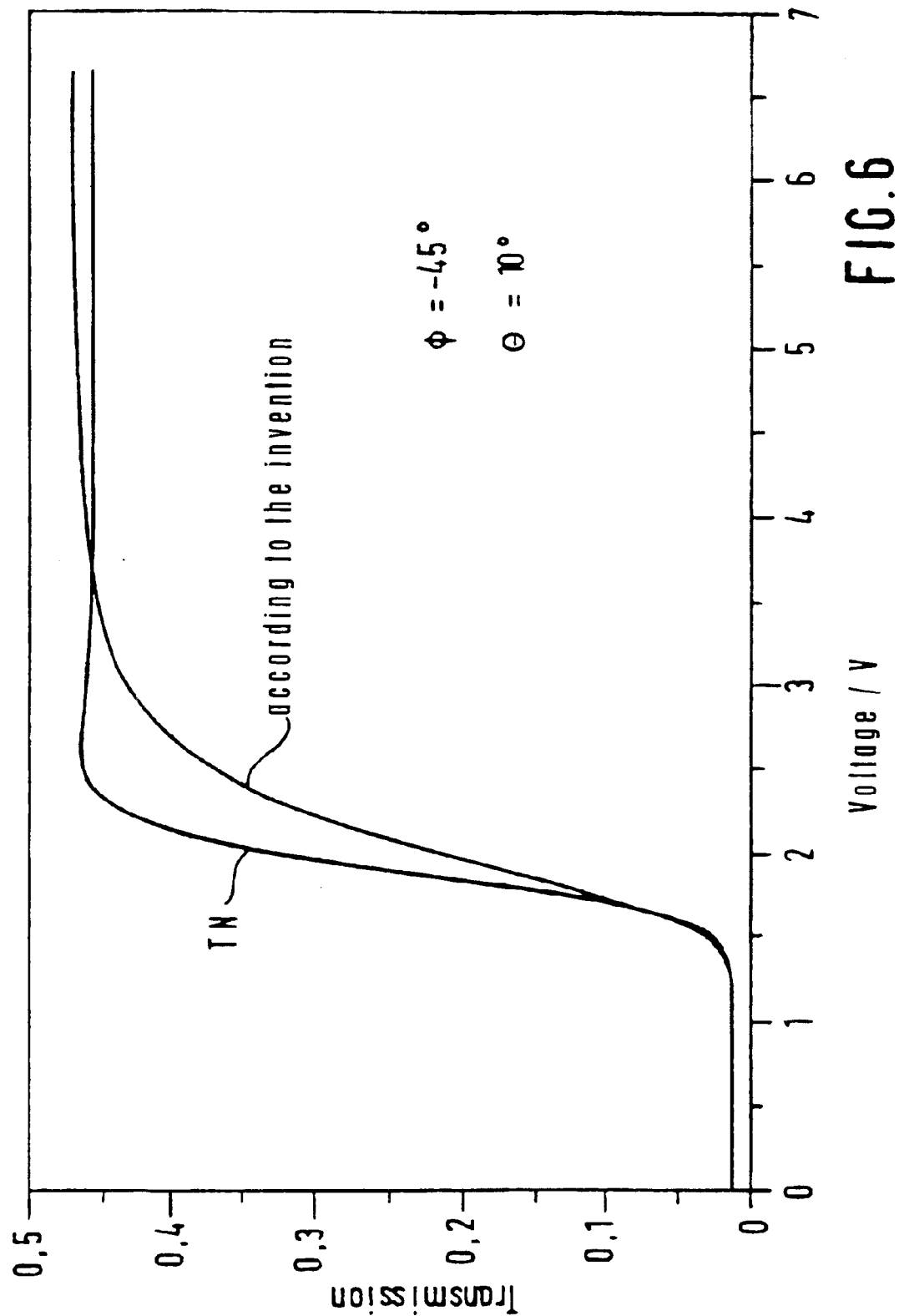

FIG. 6 shows the characteristic line of a TN switching element having d·Δn of 0.50 μm in comparison with that of a switching element according to the invention, both with virtually the same capacitive threshold, also known as the Freedericks threshold, at an observation angle of $\Theta=10°$, $\Phi=45°$.

Figure 7:
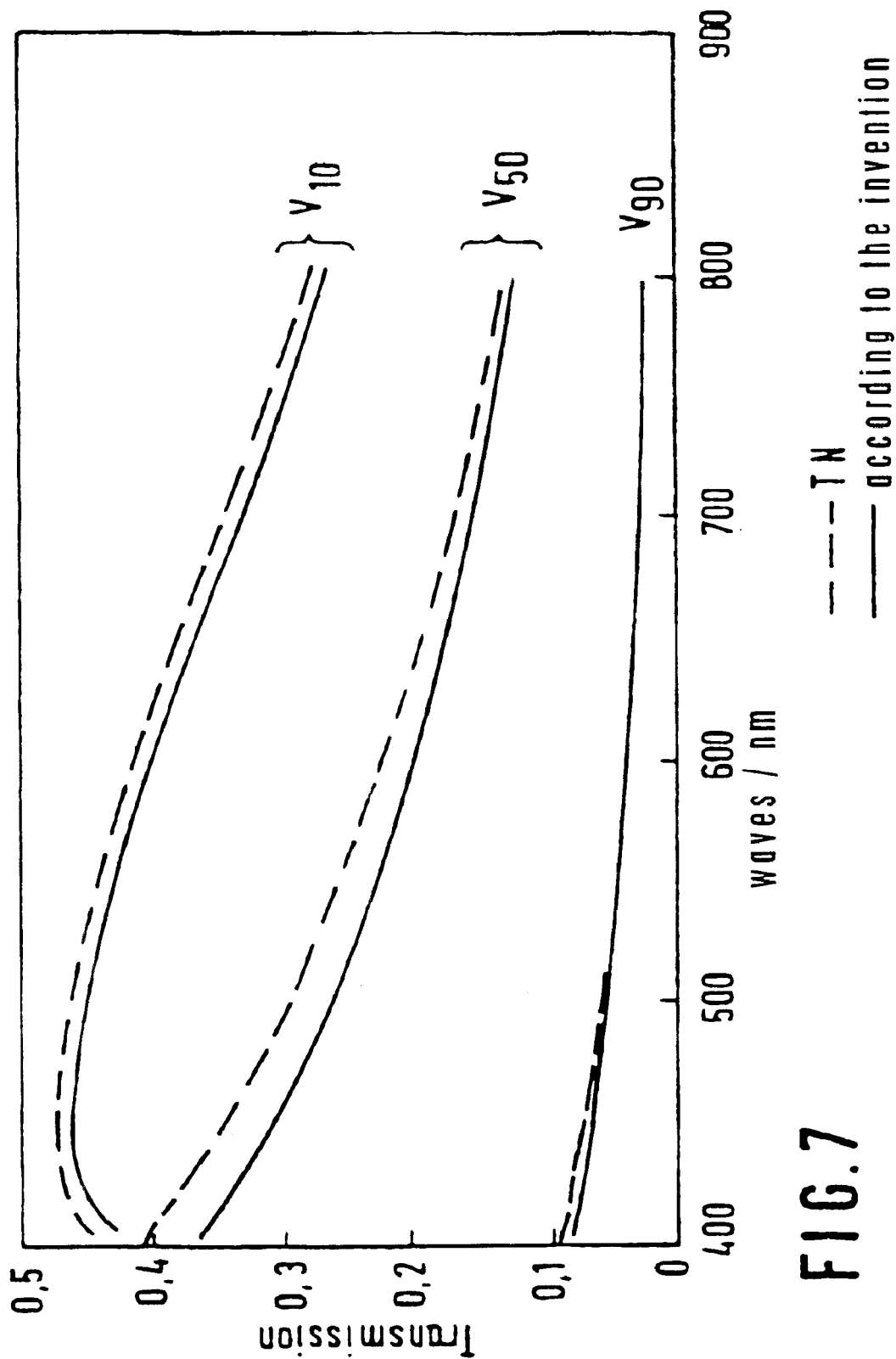

FIG. 7 shows the wavelength dependence of the transmission of the liquid-crystal switching element according to the invention from Example 1 (continuous curves) in comparison with that of a TN display having d·Δn=0.50 μm from Comparative Example 1 (dashed curves). The three sets of curves correspond to the addressing voltages for 10, 50 and 90% relative contrast.

Figure 1A:
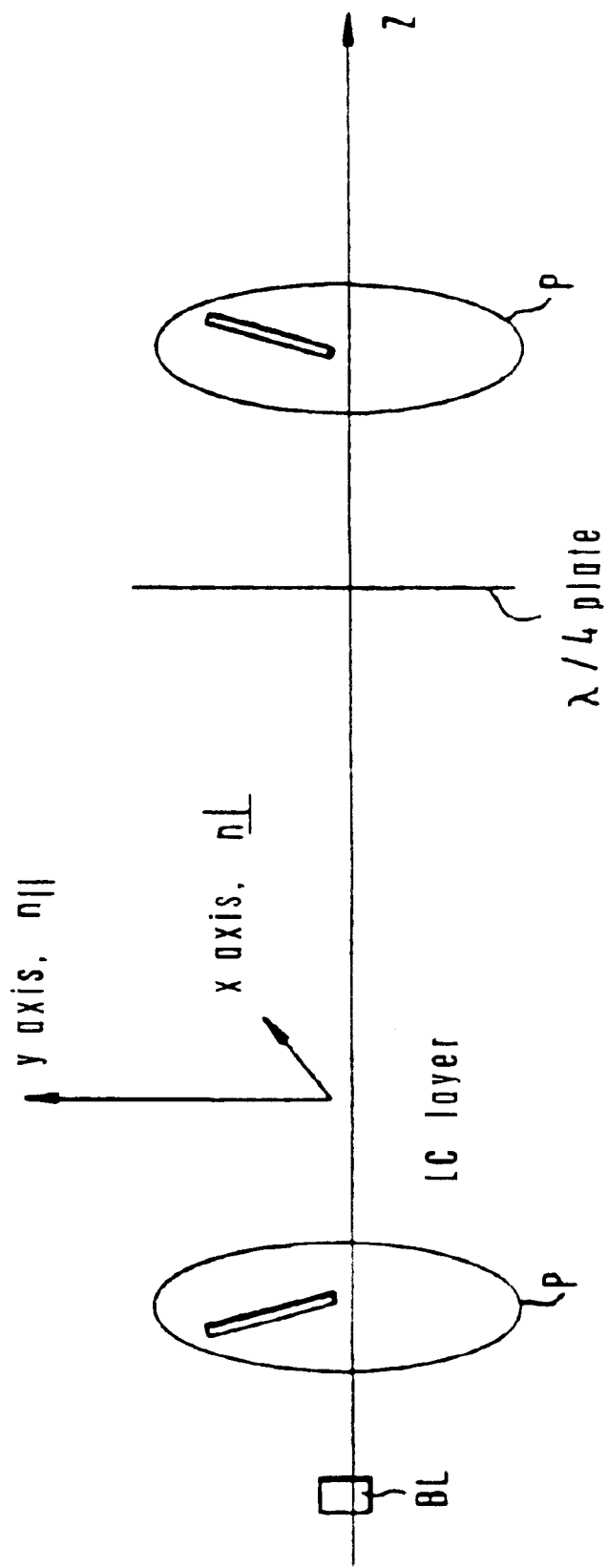
Figure 1B:
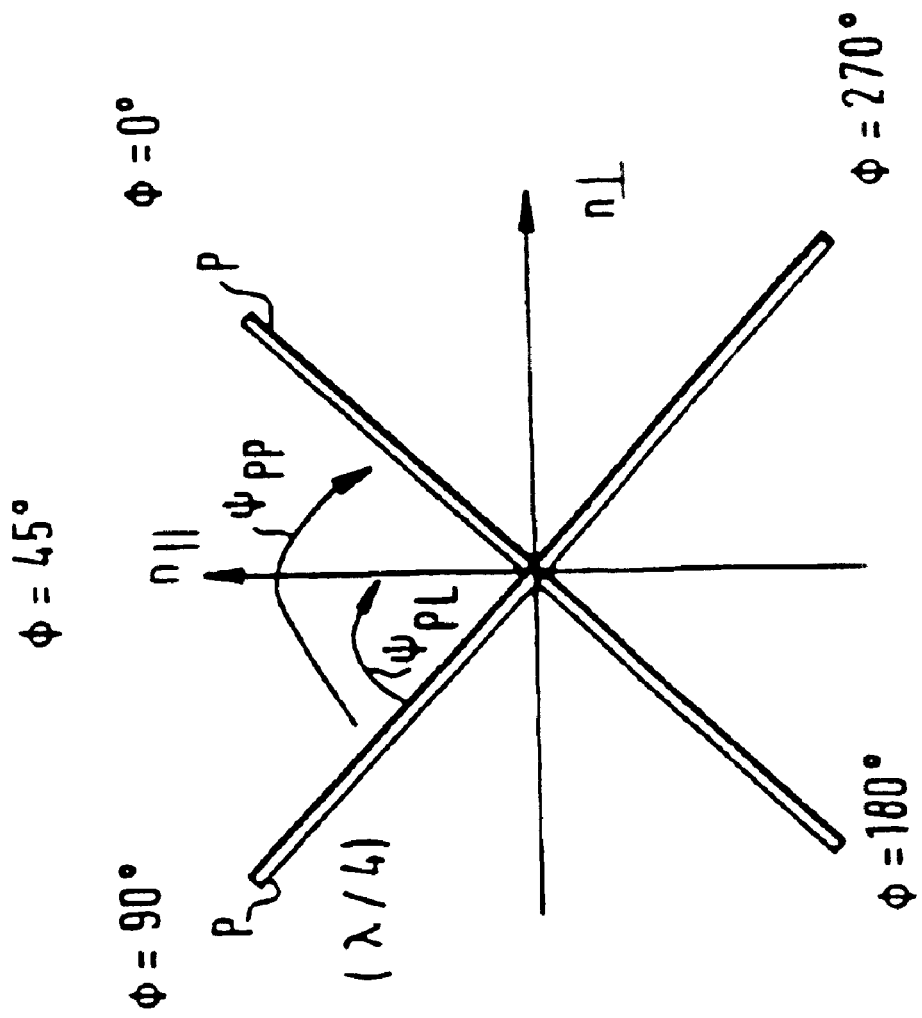
Figure 2:
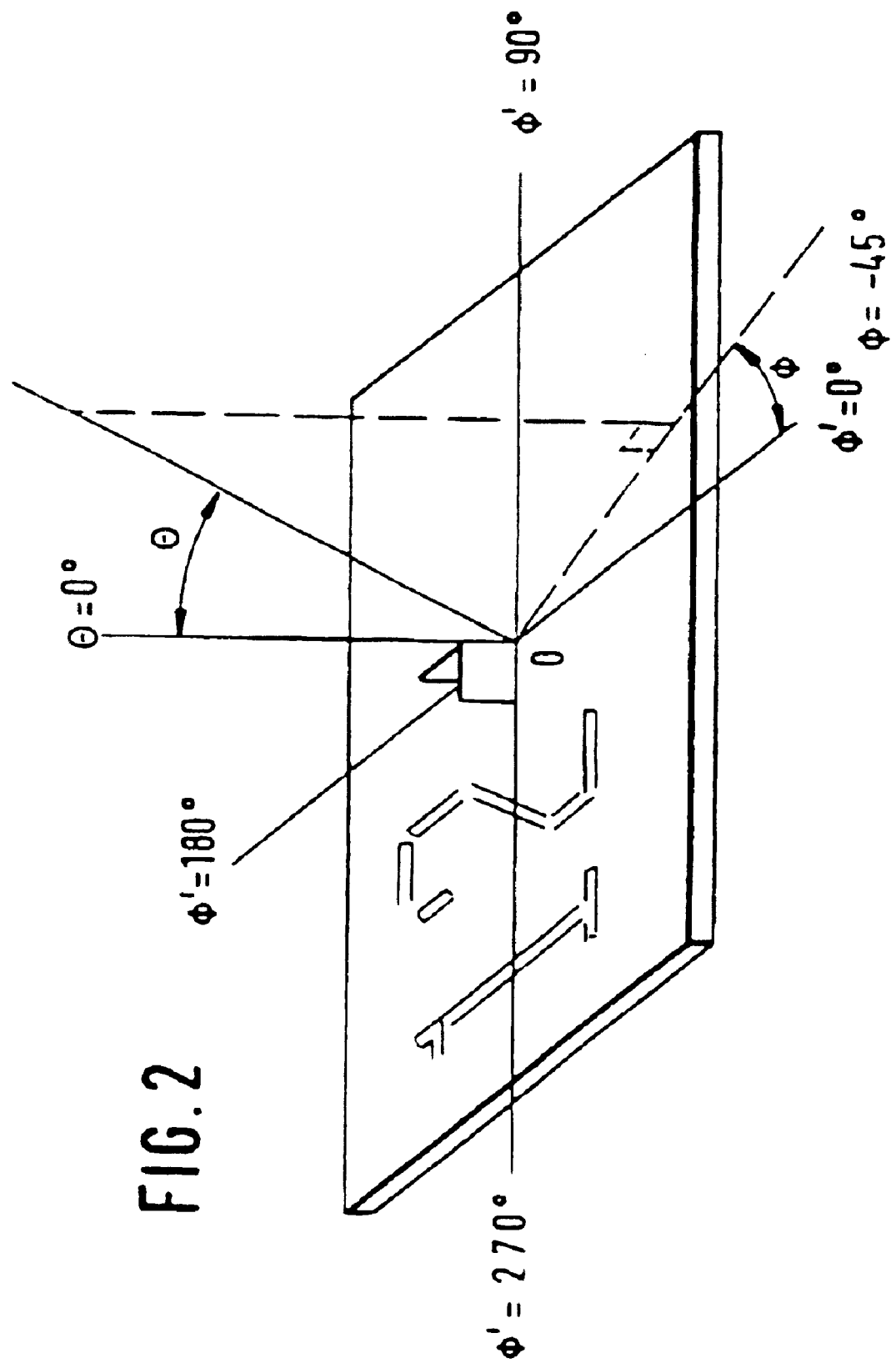
FIG. 2 shows the definition of the observation angles in the plane of the display (Φ and Φ') and perpendicular to the normal (Θ).
Figure 3:
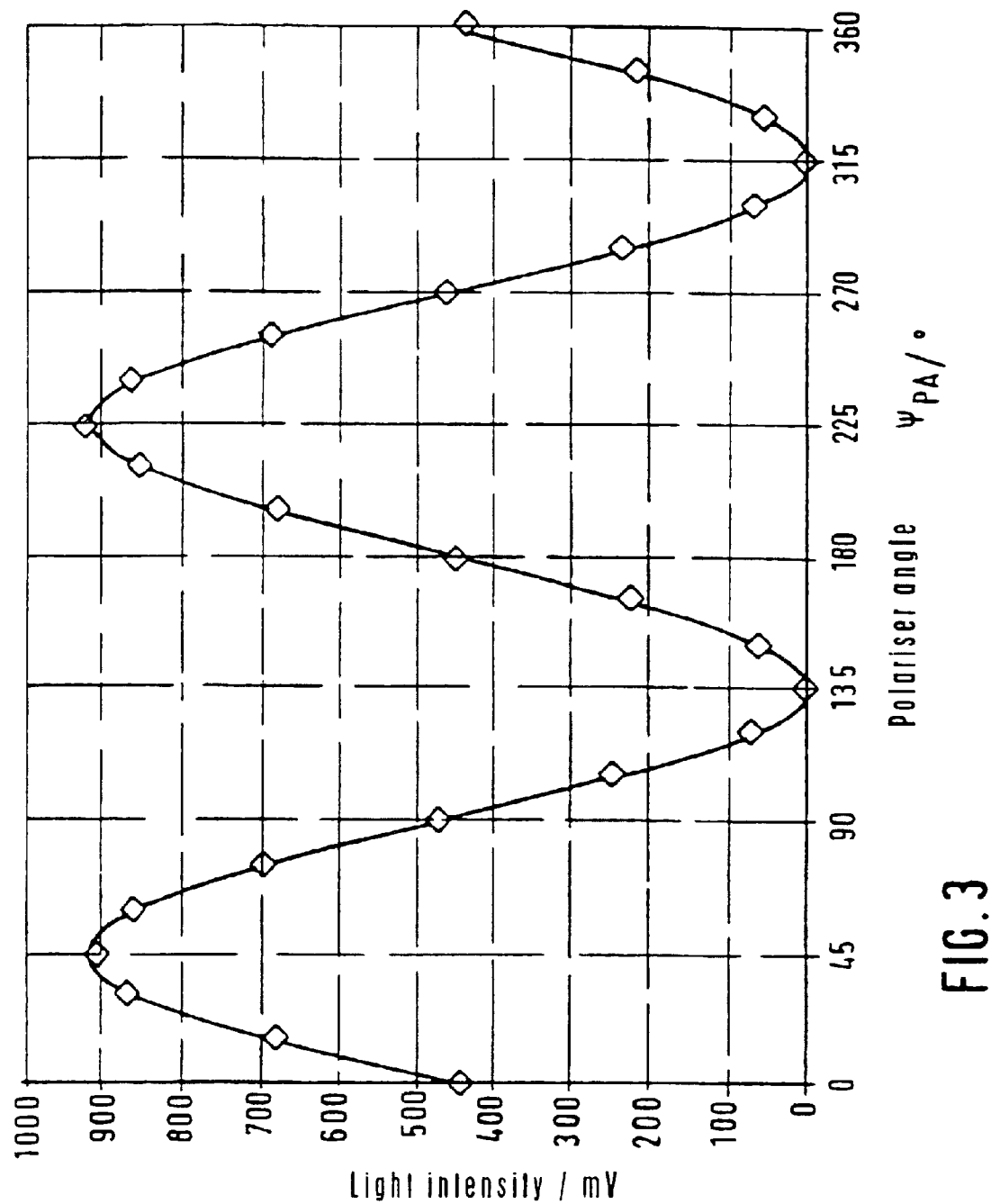
FIG. 3 shows the transmission through the arrangement shown in FIG. 1, but with the angle of the polariser to the 2nd polariser $\Psi_{PP}$ being varied. The optical retardation $(d \cdot \Delta n)_{LC}$ was 277 nm.

FIG. 8 shows in two parts the isocontransmission curves of two liquid-crystal switching elements. The display in polar coordinates was selected here, as defined in FIG. 2. The transmission was determined for each point in the hemisphere above the liquid-crystal switching element with a fixed addressing voltage which results in a minimum transmission of 10%. Points of equal transmission are connected by isotransmission lines. The isotransmission lines are staggered at separations of 10% absolute in each case. Areas having a transmission in the region of the same multiple of 10% are characterised by the same grey shade. The darkest region corresponds to a transmission of from 0% to 10%, inclusive, the next grey region from more than 10% to 20% inclusive, the pale grey region from more than 20% to 30% inclusive, and so on. The other regions are not shaded in grey.

Figure 8A:
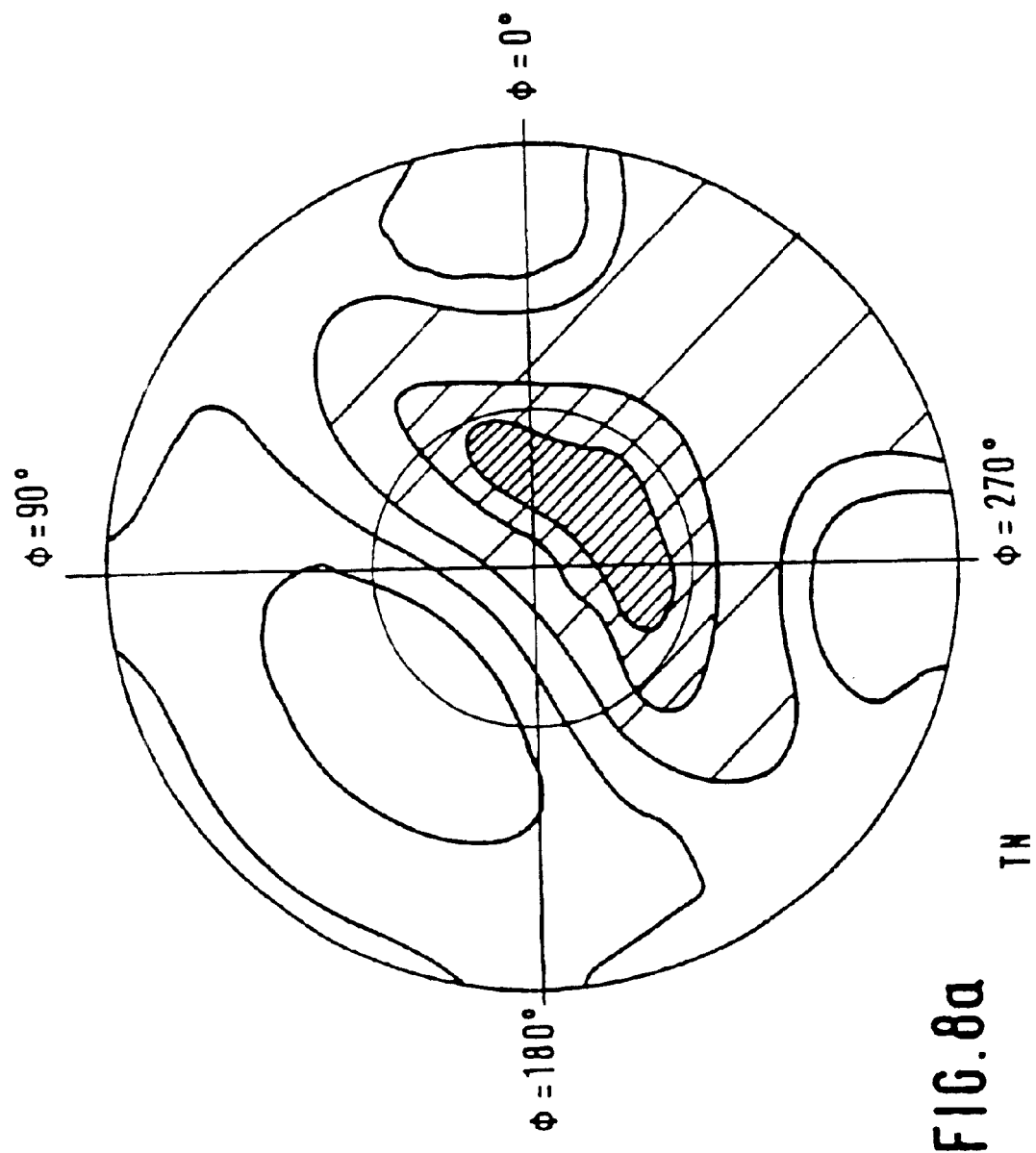

FIG. 8a) shows the results for Comparative Example 1.

FIG. 8b) shows the results for the liquid-crystal switching element according to the invention from Example 1.

FIG. 9 shows in three parts the isocontrast curves for three different switching elements. As in FIG. 8, polar coordinates were used. All three sets of isocontrast curves were obtained for addressing with two voltages which correspond to the two characteristic voltages $V_{10}$ and $V_{90}$ for the respective switching element. The curves connect points of the same contrast ratio. The contrast ratios decrease successively toward the outside, starting with the shortest, closed curve. The preferred quadrant having the highest contrast ratio at $\Phi=45°$ (corresponds to 315°) is at bottom right in the figure.

Figure 9A:
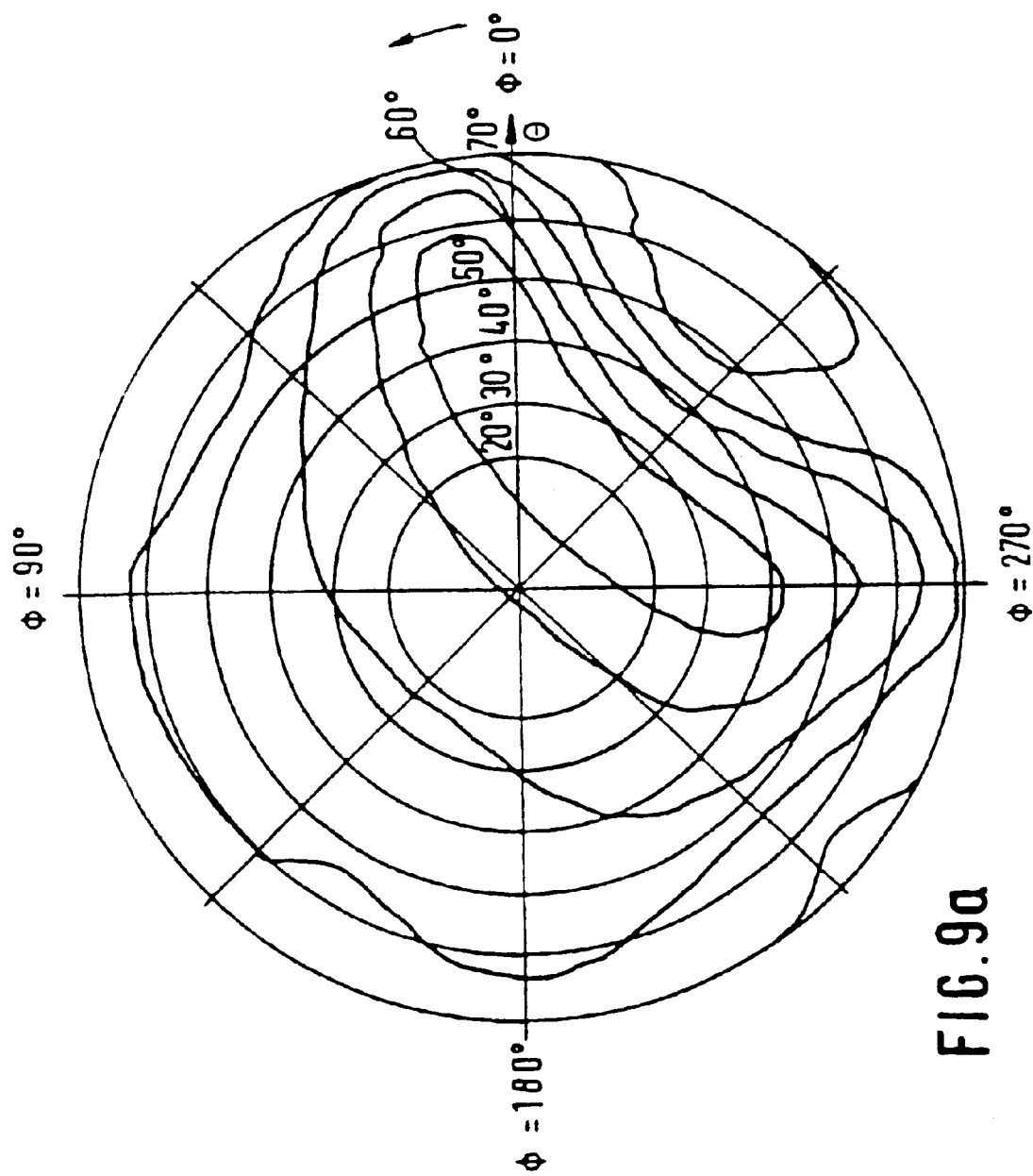

FIG. 9a) shows the results for the switching element according to the invention from Example 1. The individual curves stand from the inside outward successively for contrast ratios of 7, 5, 3, 2 and 1.

Figure 9B:
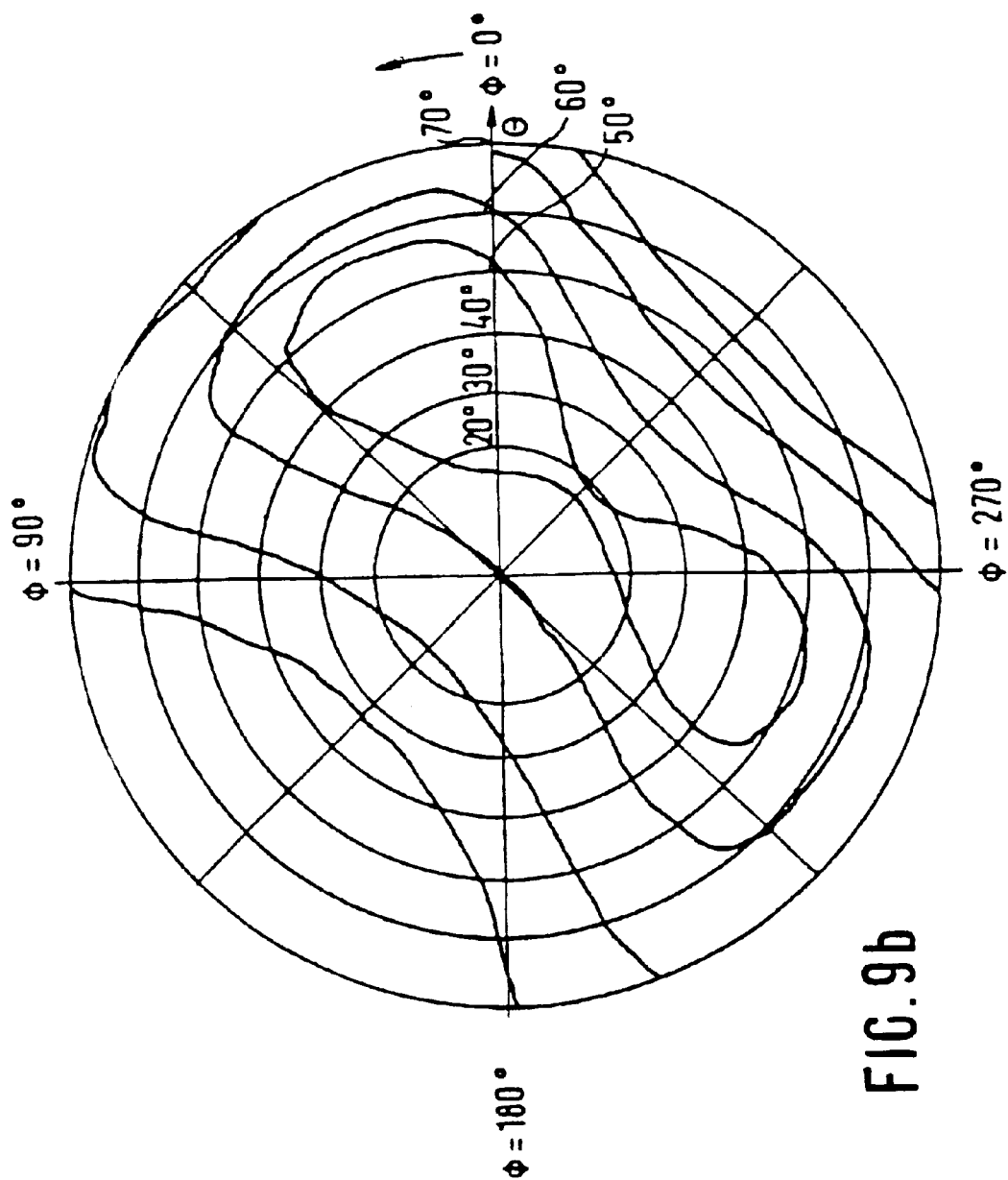

FIG. 9b) shows the results for the switching element according to the invention from Example 2. The individual curves stand from the inside outward successively for contrast ratios of 7, 5, 3 and 2.

Figure 9C:
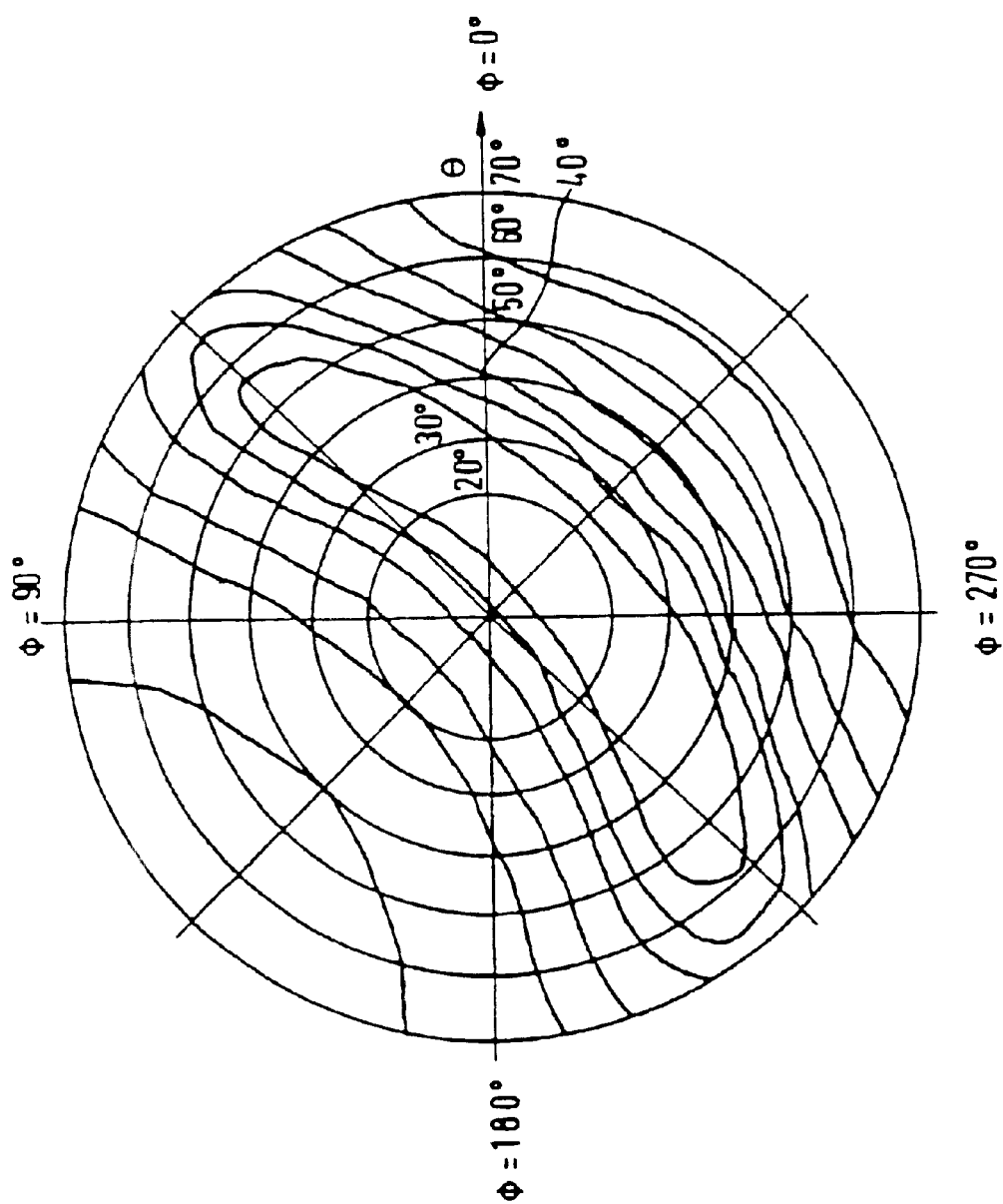

FIG. 9c) shows the results for the TN switching element from Comparative Example 1. The individual curves stand from the inside outward successively for contrast ratios of 10, 7, 5, 3, 2 and 1.

What is claimed is:

1. A liquid-crystal switching element comprising:
   a liquid-crystal layer, between two parallel substrates, having an initial alignment which is essentially parallel to the substrates and is essentially untwisted, wherein the layer has an optical retardation $[(d·\Delta n)_{LC}]$ of from 0.07 μm to 0.17 μm.
   at least one polarizer,
   a device for generating an electric field, which is aligned essentially parallel to the substrates in the case of a liquid-crystal layer of negative dielectric anisotropy and is aligned essentially perpendicular to the substrates in the case of a liquid-crystal layer of positive dielectric anisotropy, and,
   at least one birefringent layer, which is either a λ/2 saver or two λ/4 layers, wherein the optical retardation of the birefringent layer or of the birefringent layers $[(d·\Delta n)_{BL}]$ is either essentially half or essentially twice the optical retardation of the liquid-crystal layer.

2. A liquid-crystal switching element according to claim 1, which comprises at least one linear polarizer.

3. A liquid-crystal switching element according to claim 1, wherein the liquid-crystal layer has a twist angle (φ) in the range from −25° to +25°.

4. A liquid-crystal switching element according to claim 1, wherein the optical retardation of the liquid-crystal layer is or can be switched from its initial value to essentially 0 nm.

5. A liquid-crystal switching element according to claim 1, which is a transmissive or transflective liquid-crystal switching element.

6. A liquid-crystal switching element according to claim 1, wherein the optical retardation of the liquid-crystal layer is from 0.12 μm to 0.16 μm.

7. A liquid-crystal switching element according to claim 1, wherein the liquid-crystal layer has a twist angle (φ) of from −10° to +10°.

8. A liquid-crystal switching element according to claim 1, wherein the optical retardation of the liquid-crystal layer in the fully switched state is from 0 nm to 80 nm.

9. A liquid-crystal switching element according to claim 1, wherein the liquid-crystal layer has positive dielectric anisotropy.

10. A liquid-crystal switching element according to claim 1, wherein the element is capable of operating in normally white mode.

11. A liquid-crystal switching element according to claim 1, which is a reflective liquid-crystal switching element.

12. A liquid-crystal switching element according to claim 1, which is a transmissive liquid-crystal switching element.

13. A liquid-crystal switching element according to claim 1, wherein the liquid-crystal layer has negative dielectric anisotropy.

14. Electro-optical liquid-crystal device, which comprises a liquid-crystal switching element or a plurality of liquid-crystal switching elements according to claim 1.

15. Electro-optical liquid-crystal display device according to claim 14, which contains a multiplicity of liquid-crystal switching elements, and these are arranged in matrix form.

16. Electro-optical liquid-crystal display device according to claim 14, wherein the liquid-crystal switching elements are addressed by means of a matrix of active electrical switching elements.

17. A liquid-crystal switching element according to claim 1, wherein the birefringence of the liquid-crystal layer is from 0.02 to 0.09.

18. A liquid-crystal switching element according to claim 1, wherein the layer thickness of the liquid-crystal layer is from 0.05 to 7 μm.

19. A liquid-crystal switching element according to claim 1, wherein the layer thickness of the liquid-crystal layer is from 1.5 to 4 μm.

20. A liquid-crystal switching element according to claim 1, wherein the liquid-crystal layer has a temperature range of the nematic phase at least encompassing −20° C. to 60° C.

21. A liquid-crystal switching element according to claim 1, wherein the switching element has a sum response time for switching between $V_{10}$ and $V_{90}$ and back of at most 100 milliseconds.

22. A liquid-crystal switching element according to claim 1, wherein the switching element has a sum response time for switching between $V_{10}$ and $V_{90}$ and back of at most 80 milliseconds.

23. A liquid-crystal switching element according to claim 1, wherein the switching element has a sum response time for switching between $V_{10}$ and $V_{90}$ and back of at most 50 milliseconds.

* * * * *

UNITED STATES PATENT AND TRADEMARK OFFICE
CERTIFICATE OF CORRECTION

PATENT NO. : 6,781,664 B1
DATED : August 24, 2004
INVENTOR(S) : Michael Heckmeier et al.

It is certified that error appears in the above-identified patent and that said Letters Patent is hereby corrected as shown below:

Column 72,
Line 15, "saver" should read -- layer --.

Signed and Sealed this

First Day of March, 2005

JON W. DUDAS
*Director of the United States Patent and Trademark Office*